(12) United States Patent
Kanno

(10) Patent No.: US 7,103,536 B1
(45) Date of Patent: Sep. 5, 2006

(54) SYMBOL DICTIONARY COMPILING METHOD AND SYMBOL DICTIONARY RETRIEVING METHOD

(75) Inventor: Yuji Kanno, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/451,047

(22) Filed: Nov. 30, 1999

(51) Int. Cl.
*G06F 17/21* (2006.01)

(52) U.S. Cl. .................. 704/10; 707/3; 707/2; 707/6; 707/101; 704/7; 341/51; 341/79; 341/106

(58) Field of Classification Search ........... 704/7, 704/10; 707/2, 3, 6, 101, 103; 715/532; 341/51, 341/79, 106
See application file for complete search history.

(56) References Cited

U.S. PATENT DOCUMENTS

| | | | | |
|---|---|---|---|---|
| 3,670,310 A | * | 6/1972 | Bharwani et al. ............... 707/3 |
| 5,058,144 A | * | 10/1991 | Fiala et al. ................. 375/240 |
| 5,136,289 A | | 8/1992 | Yoshida et al. |
| 5,412,384 A | * | 5/1995 | Chang et al. .................. 341/79 |
| 5,442,350 A | * | 8/1995 | Iyer et al. .................... 341/106 |
| 5,469,354 A | | 11/1995 | Hatakeyama et al. |
| 5,627,748 A | * | 5/1997 | Baker et al. ................. 715/531 |
| 5,642,518 A | | 6/1997 | Kiyama et al. |
| 5,646,617 A | * | 7/1997 | Ohmoto et al. ............... 341/51 |
| 5,778,371 A | * | 7/1998 | Fujihara ..................... 707/100 |
| 5,870,750 A | | 2/1999 | Oyama et al. |
| 6,047,298 A | * | 4/2000 | Morishita .................... 715/532 |

FOREIGN PATENT DOCUMENTS

| | | |
|---|---|---|
| JP | 06274701 | 9/1994 |
| JP | 07325830 | 12/1995 |
| JP | 08314948 | 11/1996 |
| JP | 10334118 | 12/1998 |

\* cited by examiner

*Primary Examiner*—Richemond Dorvil
*Assistant Examiner*—Lamont M. Spooner
(74) *Attorney, Agent, or Firm*—RatnerPrestia

(57) ABSTRACT

If the character string is long, and when retrieving symbols containing characters of high frequency of appearance or character chain, high speed retrieval is possible up to infix matching, and a symbol dictionary of small capacity can be compiled. In the symbol dictionary compiling method of the invention, each symbol in symbol data is covered with shorter symbols called "meta-symbols" for covering the symbol in the symbol data, and the information showing how each symbol is covered is obtained by preparing meta-symbol appearance information recorded in each meta-symbol, and therefore high speed retrieval including up to infix matching is possible, and a symbol dictionary of small capacity can be compiled.

7 Claims, 39 Drawing Sheets

Fig. 15

```
1998-JAN-01/AM0200/KAWAYASU
1998-JAN-01/AM0815/WADA
1998-JAN-01/PM0615/NODA
1998-JAN-01/PM1045/KAWADA
1998-JAN-01/PM1130/KAWADA
1998-JAN-01/PM1215/KAWAYASU
1998-JAN-03/AM0615/WADA
1998-JAN-03/AM0745/YASUDA
1998-JAN-04/AM0615/SUKAWA
1998-JAN-04/AM1000/SUWA
1998-JAN-05/AM0100/SUKAWA
1998-JAN-05/PM0700/YASUDA
1998-JAN-06/AM0430/YASUKAWA
1998-JAN-06/AM0645/KAWAYASU
1998-JAN-07/AM0130/WADA
1998-JAN-08/AM1115/NODA
1998-JAN-08/PM0315/SUWA
1998-JAN-09/PM0730/SUWA
1998-JAN-09/PM0845/NODA
1998-JAN-10/AM1100/KAWAYASU
1998-JAN-10/PM0245/YASUDA
1998-JAN-11/PM0945/WADA
1998-JAN-11/PM1145/NODA
1998-JAN-12/AM0715/WADA
1998-JAN-12/PM0730/SUDA
1998-JAN-13/AM0345/SUKAWA
1998-JAN-13/PM0145/SUWA
1998-JAN-13/PM0930/SUKAWA
1998-JAN-14/AM0645/YASUKAWA
    .
    .
    .
1998-JAN-29/PM1015/SUKAWA
1998-JAN-29/PM1045/SUWA
1998-JAN-30/AM0915/KAWAYASU
1998-JAN-30/AM1130/YASUDA
1998-JAN-30/PM0945/KAWADA
1998-JAN-30/PM1045/KAWADA
1998-JAN-31/AM0330/SUWA
1998-JAN-31/AM0530/SUKAWA
1998-JAN-31/PM0445/KAWADA
1998-JAN-31/PM0800/SUDA
1998-FEB-01/PM0300/SUKAWA
1998-FEB-01/PM1230/YASUKAWA
1998-FEB-01/PM1245/KAWAYASU
1998-FEB-02/AM0645/KAWADA
1998-FEB-02/PM1215/SUDA
1998-FEB-03/AM0130/WADA
1998-FEB-03/AM0145/YASUKAWA
1998-FEB-04/AM0545/SUKAWA
1998-FEB-04/AM1215/KAWADA
```

```
1998-FEB-04/PM0115/NOKAWA
1998-FEB-05/AM0315/SUDA
1998-FEB-05/AM0930/KAWADA
1998-FEB-05/PM0130/NOKAWA
1998-FEB-05/PM1045/SUWA
1998-FEB-06/AM0715/NOKAWA
1998-FEB-06/AM0815/KAWANO
1998-FEB-06/AM0830/SUDA
1998-FEB-06/AM1130/NOKAWA
1998-FEB-07/AM0500/KAWANO
1998-FEB-07/AM0715/SUWA
1998-FEB-07/AM0745/YASUDA
1998-FEB-07/AM0845/SUWA
1998-FEB-07/PM0345/KAWADA
1998-FEB-07/PM1200/SUKAWA
1998-FEB-08/AM0445/SUWA
1998-FEB-08/AM1015/KAWADA
1998-FEB-08/AM1100/NODA
1998-FEB-09/AM0300/KAWAYASU
    .
    .
    .
1998-DEC-25/AM1100/YASUDA
1998-DEC-25/AM1230/SUDA
1998-DEC-25/PM0915/KAWAYASU
1998-DEC-26/AM0145/NOKAWA
1998-DEC-26/AM1000/KAWANO
1998-DEC-27/AM0100/WADA
1998-DEC-27/AM1100/KAWADA
1998-DEC-27/AM1145/SUDA
1998-DEC-27/AM1200/SUKAWA
1998-DEC-27/PM0215/SUWA
1998-DEC-27/PM0415/NOKAWA
1998-DEC-27/PM0800/KAWANO
1998-DEC-27/PM0900/YASUKAWA
1998-DEC-27/PM0945/YASUDA
1998-DEC-28/AM1245/SUDA
1998-DEC-28/PM0630/YASUDA
1998-DEC-28/PM0730/NOKAWA
1998-DEC-29/AM0315/KAWADA
1998-DEC-29/AM0330/SUWA
1998-DEC-29/AM0845/KAWANO
1998-DEC-29/PM1030/NODA
1998-DEC-30/AM0845/KAWAYASU
1998-DEC-30/AM1030/KAWAYASU
1998-DEC-30/AM1100/SUKAWA
1998-DEC-31/AM1115/YASUDA
1998-DEC-31/AM1200/NOKAWA
1998-DEC-31/PM0400/SUKAWA
```

Fig. 17

| Metasymbol | Frequency |
|---|---|
| - | 2000 |
| / | 2000 |
| 0 | 1996 |
| 1 | 2130 |
| 2 | 584 |
| 3 | 491 |
| 4 | 432 |
| 5 | 677 |
| 6 | 168 |
| 7 | 191 |
| 8 | 1167 |
| 9 | 2164 |
| A | 2917 |
| B | 88 |
| C | 181 |
| D | 532 |
| E | 266 |
| F | 88 |
| G | 99 |
| H | 0 |
| I | 0 |
| J | 224 |
| K | 559 |
| L | 78 |
| M | 1145 |
| N | 505 |
| O | 443 |
| P | 636 |
| Q | 0 |
| R | 134 |
| S | 640 |
| T | 84 |
| U | 800 |
| V | 107 |
| W | 754 |
| X | 0 |
| Y | 334 |
| Z | 0 |

Fig. 18

| Metasymbol | Frequency |
|---|---|
| - | 2000 |
| / | 2000 |
| 0 | 1996 |
| 1 | 2130 |
| 2 | 584 |
| 3 | 491 |
| 4 | 432 |
| 5 | 677 |
| 6 | 168 |
| 7 | 191 |
| 8 | 1167 |
| 9 | 2164 |
| A | 2917 |
| B | 88 |
| C | 181 |
| D | 532 |
| E | 266 |
| F | 88 |
| G | 99 |
| J | 224 |
| K | 559 |
| L | 78 |
| M | 1145 |
| N | 505 |
| O | 443 |
| P | 636 |
| R | 134 |
| S | 640 |
| T | 84 |
| U | 800 |
| V | 107 |
| W | 754 |
| Y | 334 |

Fig. 19

| | | |
|---|---|---|
| - | /B | OS |
| -- | /C | OT |
| -/ | /D | OU |
| -0 | /E | OY |
| -1 | /F | OW |
| -2 | /G | OY |
| -3 | /J | 1 |
| -4 | /K | 1- |
| -5 | /L | 1/ |
| -6 | /M | 10 |
| -7 | /N | 11 |
| -8 | /O | . |
| -9 | /P | . |
| -A | /R | . |
| -B | /S | Y |
| -C | /T | Y- |
| -D | /U | Y/ |
| -E | /V | Y0 |
| -F | /W | Y1 |
| -G | /Y | Y2 |
| -J | 0 | Y3 |
| -K | 0- | Y4 |
| -L | 0/ | Y5 |
| -M | 00 | Y6 |
| -N | 01 | Y7 |
| -O | 02 | Y8 |
| -P | 03 | Y9 |
| -R | 04 | YA |
| -S | 05 | YB |
| -T | 06 | YC |
| -U | 07 | YD |
| -V | 08 | YE |
| -W | 09 | YF |
| -Y | 0A | YG |
| / | 0B | YJ |
| /- | 0C | YK |
| // | 0D | YL |
| /0 | 0E | YM |
| /1 | 0F | YN |
| /2 | 0G | YO |
| /3 | 0J | YP |
| /4 | 0K | YR |
| /5 | 0L | YS |
| /6 | 0M | YT |
| /7 | 0N | YU |
| /8 | 0U | YV |
| /9 | 0P | YW |
| /A | 0R | YY |

Fig. 20

| Metasymbol | Frequency |
|---|---|
| -0 | 294 |
| -1 | 309 |
| -2 | 328 |
| -3 | 69 |
| -A | 174 |
| -D | 97 |
| -F | 88 |
| -J | 224 |
| -M | 145 |
| -N | 107 |
| -O | 84 |
| -S | 81 |
| /A | 520 |
| /K | 273 |
| /N | 169 |
| /P | 480 |
| /S | 311 |
| /W | 95 |
| /Y | 152 |
| 0/ | 608 |
| 00 | 281 |
| 01 | 157 |
| 02 | 108 |
| 03 | 132 |
| 04 | 144 |
| 05 | 124 |
| 06 | 113 |
| 07 | 121 |
| 08 | 106 |
| 09 | 102 |
| 1/ | 145 |
| 10 | 169 |
| 11 | 156 |
| 12 | 114 |
| 13 | 80 |
| 14 | 79 |
| 15 | 265 |
| 16 | 27 |
| 17 | 30 |
| 18 | 35 |
| 19 | 1030 |
| 2/ | 101 |
| 20 | 61 |
| 21 | 83 |
| 22 | 34 |
| 23 | 71 |

| Metasymbol | Frequency |
|---|---|
| 24 | 70 |
| 25 | 38 |
| 26 | 28 |
| 27 | 40 |
| 28 | 26 |
| 29 | 32 |
| 3/ | 93 |
| 30 | 309 |
| 31 | 53 |
| 33 | 16 |
| 34 | 20 |
| 4/ | 96 |
| 40 | 21 |
| 41 | 18 |
| 43 | 24 |
| 44 | 23 |
| 45 | 250 |
| 5/ | 590 |
| 50 | 24 |
| 51 | 21 |
| 53 | 23 |
| 54 | 19 |
| 6/ | 82 |
| 60 | 23 |
| 61 | 23 |
| 63 | 24 |
| 64 | 16 |
| 7/ | 105 |
| 70 | 18 |
| 71 | 24 |
| 73 | 18 |
| 74 | 26 |
| 8- | 1000 |
| 8/ | 88 |
| 80 | 21 |
| 81 | 22 |
| 83 | 18 |
| 84 | 18 |
| 9/ | 92 |
| 90 | 26 |
| 91 | 13 |
| 93 | 16 |
| 94 | 17 |
| 98 | 1000 |
| 99 | 1000 |
| AD | 189 |

| Metasymbol | Frequency |
|---|---|
| AM | 520 |
| AN | 165 |
| AP | 75 |
| AR | 59 |
| AS | 248 |
| AU | 99 |
| AW | 559 |
| AY | 182 |
| B- | 88 |
| C- | 97 |
| CT | 84 |
| DA | 435 |
| DE | 97 |
| EB | 88 |
| EC | 97 |
| EP | 81 |
| FE | 83 |
| G- | 93 |
| JA | 82 |
| JU | 142 |
| KA | 559 |
| L- | 78 |
| MO | 749 |
| MI | 251 |
| MA | 145 |
| N- | 146 |
| NO | 359 |
| OC | 84 |
| OD | 70 |
| OK | 99 |
| OV | 107 |
| P- | 81 |
| PM | 480 |
| PR | 75 |
| R- | 134 |
| SE | 81 |
| SU | 559 |
| T- | 84 |
| UD | 176 |
| UG | 99 |
| UK | 187 |
| UL | 78 |
| UN | 64 |
| UW | 100 |
| V- | 107 |
| WA | 754 |

| Metasymbol | Frequency |
|---|---|
| Y- | 86 |
| YA | 248 |

Fig. 21

| Metasymbol | Frequency | Metasymbol | Frequency | Metasymbol | Frequency | Metasymbol | Frequency | Metasymbol | Frequency |
|---|---|---|---|---|---|---|---|---|---|
| -01 | 41 | 000 | 19 | 10/ | 37 | AMO | 388 | R-1 | 41 |
| -02 | 32 | 01/ | 41 | 100 | 68 | AM1 | 132 | R-2 | 40 |
| -03 | 32 | 010 | 24 | 101 | 19 | AN- | 82 | R-3 | 11 |
| -04 | 33 | 011 | 24 | 103 | 20 | ANO | 83 | SE | 81 |
| -05 | 37 | 013 | 26 | 104 | 25 | ASU | 248 | SUD | 176 |
| -06 | 27 | 014 | 23 | 11/ | 27 | AWA | 559 | SUK | 187 |
| -07 | 35 | 015 | 19 | 110 | 25 | AY- | 86 | SUW | 100 |
| -08 | 27 | 02/ | 32 | 111 | 16 | AYA | 96 | T- | 84 |
| -09 | 30 | 020 | 17 | 113 | 23 | B- | 88 | UDA | 176 |
| -10 | 37 | 021 | 16 | 114 | 25 | C- | 97 | UG | 99 |
| -11 | 27 | 023 | 21 | 115 | 40 | CT | 84 | UKA | 187 |
| -12 | 35 | 024 | 22 | 12/ | 35 | DA | 70 | UWA | 100 |
| -13 | 31 | 03/ | 32 | 120 | 17 | DE | 97 | V-0 | 32 |
| 14 | 31 | 030 | 47 | 121 | 26 | EB | 88 | V-1 | 28 |
| -15 | 26 | 031 | 17 | 123 | 20 | EC | 97 | V-2 | 41 |
| -16 | 27 | 033 | 16 | 124 | 16 | EP | 81 | V-3 | 6 |
| -17 | 30 | 034 | 20 | 15/ | 265 | FE | 88 | WAD | 189 |
| -18 | 35 | 04/ | 33 | 19/ | 30 | G- | 99 | WAN | 83 |
| -19 | 30 | 040 | 21 | 199 | 1000 | JUL | 78 | WAY | 96 |
| -20 | 27 | 041 | 18 | 2/A | 57 | JUN | 64 | YAS | 248 |
| -21 | 41 | 043 | 24 | 2/P | 44 | KAW | 559 | | |
| -22 | 34 | 044 | 23 | 3/ | 61 | L- | 78 | | |
| -23 | 30 | 045 | 25 | 30/ | 282 | M01 | 97 | | |
| -24 | 32 | 05/ | 37 | 300 | 27 | M02 | 76 | | |
| -25 | 38 | 050 | 24 | 31 | 36 | M03 | 80 | | |
| -26 | 28 | 051 | 21 | 4/ | 63 | M04 | 86 | | |
| -27 | 40 | 053 | 23 | 45/ | 250 | M05 | 87 | | |
| -28 | 26 | 054 | 19 | 5/A | 54 | M06 | 86 | | |
| -29 | 32 | 06/ | 27 | 5/E | 130 | M07 | 86 | | |
| -3 | 40 | 060 | 23 | 5/N | 88 | M08 | 79 | | |
| -AP | 75 | 061 | 23 | 5/P | 47 | M09 | 72 | | |
| -AU | 99 | 063 | 24 | 5/S | 156 | M10 | 83 | | |
| -JA | 82 | 064 | 16 | 5/W | 48 | M11 | 89 | | |
| -JU | 142 | 07/ | 35 | 5/Y | 67 | M12 | 79 | | |
| -MA | 145 | 070 | 18 | 6/ | 55 | MAR | 59 | | |
| -NO | 107 | 071 | 24 | 7/A | 50 | MAY | 86 | | |
| /AM | 520 | 073 | 18 | 7/P | 55 | N-0 | 39 | | |
| /KA | 273 | 074 | 26 | 8-A | 174 | N-1 | 40 | | |
| /NO | 169 | 08/ | 27 | 8-D | 97 | N-2 | 55 | | |
| /PM | 480 | 080 | 21 | 8-F | 88 | N-3 | 12 | | |
| /SU | 311 | 081 | 22 | 8-J | 224 | NOD | 70 | | |
| /YA | 152 | 083 | 18 | 8-M | 145 | NOK | 99 | | |
| 0/A | 47 | 084 | 18 | 8-N | 107 | NOY | 107 | | |
| 0/K | 143 | 09/ | 30 | 8-O | 84 | OC | 84 | | |
| 0/N | 81 | 090 | 26 | 8-S | 81 | OY- | 107 | | |
| 0/P | 50 | 091 | 13 | 8/ | 61 | P- | 81 | | |
| 0/S | 155 | 093 | 16 | 9/ | 32 | PMO | 361 | | |
| 0/W | 47 | 094 | 17 | 98- | 1000 | PM1 | 119 | | |
| 0/Y | 85 | 1/A | 68 | 998 | 1000 | PR | 75 | | |
| 00/ | 262 | 1/P | 77 | ADA | 189 | R-0 | 42 | | |

Fig. 22

| Metasymbol | Frequency | Metasymbol | Frequency | Metasymbol | Frequency | Metasymbol | Frequency | Metasymbol | Frequency |
|---|---|---|---|---|---|---|---|---|---|
| -01 | 41 | 00/K | 84 | 091 | 13 | 5/P | 34 | EP | 81 |
| -02 | 32 | 00/N | 31 | 093 | 16 | 5/SU | 156 | FE | 88 |
| -03 | 32 | 00/S | 81 | 094 | 17 | 6/ | 55 | G- | 99 |
| -04 | 33 | 00/W | 24 | 1/A | 68 | 7/A | 50 | KAWA | 559 |
| -05 | 37 | 00/Y | 42 | 1/P | 77 | 7/P | 55 | L- | 78 |
| -06 | 27 | 000 | 19 | 10/ | 37 | 8-AP | 75 | N-0 | 39 |
| -07 | 35 | 01/ | 41 | 100 | 68 | 8-AU | 99 | N-1 | 40 |
| -08 | 27 | 010 | 24 | 101 | 19 | 8-JA | 82 | N-2 | 55 |
| -09 | 30 | 011 | 24 | 103 | 20 | 8-JU | 142 | N-3 | 12 |
| -10 | 37 | 013 | 26 | 104 | 25 | 8-MA | 145 | NOV- | 107 |
| -11 | 27 | 014 | 23 | 11/ | 27 | 8-NO | 107 | OC | 84 |
| -12 | 35 | 015 | 19 | 110 | 25 | 8/ | 61 | OV-0 | 32 |
| -13 | 31 | 02/ | 32 | 111 | 16 | 9/ | 32 | OV-1 | 28 |
| -14 | 31 | 020 | 17 | 113 | 23 | 98-A | 174 | OV-2 | 41 |
| -15 | 26 | 021 | 16 | 114 | 25 | 98-D | 97 | OV-3 | 6 |
| -16 | 27 | 023 | 21 | 115 | 40 | 98-F | 88 | P- | 81 |
| -17 | 30 | 024 | 22 | 12/ | 35 | 98-J | 224 | PM01 | 40 |
| -18 | 35 | 03/ | 32 | 120 | 17 | 98-M | 145 | PM02 | 38 |
| -19 | 30 | 030 | 47 | 121 | 25 | 98-N | 107 | PM03 | 40 |
| -20 | 27 | 031 | 17 | 123 | 20 | 98-O | 84 | PM04 | 42 |
| -21 | 41 | 033 | 16 | 124 | 16 | 98-S | 81 | PM05 | 45 |
| -22 | 34 | 034 | 20 | 15/A | 13 | 998- | 1000 | PM06 | 40 |
| -23 | 30 | 04/ | 33 | 15/K | 59 | AM01 | 57 | PM07 | 46 |
| -24 | 32 | 040 | 21 | 15/N | 49 | AM02 | 38 | PM08 | 30 |
| -25 | 38 | 041 | 18 | 15/P | 13 | AM03 | 40 | PM09 | 40 |
| -26 | 28 | 043 | 24 | 15/S | 82 | AM04 | 44 | PM10 | 43 |
| -27 | 40 | 044 | 23 | 15/W | 27 | AM05 | 42 | PM11 | 37 |
| -28 | 26 | 045 | 25 | 15/Y | 22 | AM06 | 46 | PM12 | 39 |
| -29 | 32 | 05/ | 37 | 19/ | 30 | AM07 | 40 | PR | 75 |
| -3 | 40 | 050 | 24 | 1998 | 1000 | AM08 | 49 | R-0 | 42 |
| -JUL | 78 | 051 | 21 | 2/A | 57 | AM09 | 32 | R-1 | 41 |
| -JUN | 64 | 053 | 23 | 2/P | 44 | AM10 | 40 | R-2 | 40 |
| -MAR | 59 | 054 | 19 | 3/ | 61 | AM11 | 52 | R-3 | 11 |
| -MAY | 86 | 06/ | 27 | 30/A | 21 | AM12 | 40 | SE | 81 |
| -NOV | 107 | 060 | 23 | 30/K | 59 | AN- | 82 | SUDA | 176 |
| /AM0 | 388 | 061 | 23 | 30/N | 50 | ANO | 83 | SUKA | 187 |
| /AM1 | 132 | 063 | 24 | 30/P | 12 | ASUD | 71 | SUWA | 100 |
| /KAW | 273 | 064 | 16 | 30/S | 74 | ASUK | 81 | T- | 84 |
| /NOD | 70 | 07/ | 35 | 30/W | 23 | AWAD | 94 | UG | 99 |
| /NOK | 99 | 070 | 18 | 30/Y | 43 | AWAN | 83 | UKAW | 187 |
| /PM0 | 361 | 071 | 24 | 300 | 27 | AWAY | 96 | WADA | 189 |
| /PM1 | 119 | 073 | 18 | 31 | 36 | AY- | 86 | YASU | 243 |
| /SUD | 105 | 074 | 26 | 4/ | 63 | AYA | 96 | | |
| /SUK | 106 | 08/ | 27 | 45/K | 71 | B- | 88 | | |
| /SUW | 100 | 080 | 21 | 45/N | 39 | C- | 97 | | |
| /YAS | 152 | 081 | 22 | 45/S | 74 | CT | 84 | | |
| 0/A | 26 | 083 | 18 | 45/W | 21 | DA | 70 | | |
| 0/KA | 143 | 084 | 18 | 45/Y | 45 | DE | 97 | | |
| 0/P | 38 | 09/ | 30 | 5/A | 41 | EB | 88 | | |
| 0/SU | 155 | 090 | 26 | 5/KA | 130 | EC | 97 | | |

Fig. 23

| Metasymbol | Frequency | Metasymbol | Frequency | Metasymbol | Frequency | Metasymbol | Frequency | Metasymbol | Frequency |
|---|---|---|---|---|---|---|---|---|---|
| -01 | 41 | /PM05 | 45 | 054 | 19 | 3/ | 61 | B- | 88 |
| -02 | 32 | /PM06 | 40 | 06/ | 27 | 30/A | 21 | C- | 97 |
| -03 | 32 | /PM07 | 46 | 060 | 23 | 30/K | 59 | CT | 84 |
| -04 | 33 | /PM08 | 30 | 061 | 23 | 30/N | 50 | DA | 70 |
| -05 | 37 | /PM09 | 40 | 063 | 24 | 30/P | 12 | DE | 97 |
| -06 | 27 | /PM10 | 43 | 064 | 16 | 30/S | 74 | EB | 88 |
| -07 | 35 | /PM11 | 37 | 07/ | 35 | 30/W | 23 | EC | 97 |
| -08 | 27 | /PM12 | 39 | 070 | 18 | 30/Y | 43 | EP | 81 |
| -09 | 30 | /SUDA | 105 | 071 | 24 | 300 | 27 | FE | 88 |
| -10 | 37 | /SUKA | 106 | 073 | 18 | 31 | 36 | G- | 99 |
| -11 | 27 | /SUWA | 100 | 074 | 26 | 4/ | 63 | KAWA | 99 |
| -12 | 35 | /YASU | 152 | 08/ | 27 | 45/K | 71 | KAWAD | 94 |
| -13 | 31 | 0/A | 26 | 080 | 21 | 45/N | 39 | KAWAN | 83 |
| -14 | 31 | 0/KAW | 143 | 081 | 22 | 45/S | 74 | KAWAY | 96 |
| -15 | 26 | 0/P | 38 | 083 | 18 | 45/W | 21 | L- | 78 |
| -16 | 27 | 0/SUD | 46 | 084 | 18 | 45/Y | 45 | N-0 | 39 |
| -17 | 30 | 0/SUK | 71 | 09/ | 30 | 5/A | 41 | N-1 | 40 |
| -18 | 35 | 0/SUW | 38 | 090 | 26 | 5/KAW | 130 | N-2 | 55 |
| -19 | 30 | 00/K | 84 | 091 | 13 | 5/P | 34 | N-3 | 12 |
| -20 | 27 | 00/N | 31 | 093 | 16 | 5/SUD | 59 | NOV-0 | 32 |
| -21 | 41 | 00/S | 81 | 094 | 17 | 5/SUK | 35 | NOV-1 | 28 |
| -22 | 34 | 00/W | 24 | 1/A | 68 | 5/SUW | 62 | NOV-2 | 41 |
| -23 | 30 | 00/Y | 42 | 1/P | 77 | 6/ | 65 | NOV-3 | 6 |
| -24 | 32 | 000 | 19 | 10/ | 37 | 7/A | 50 | OC | 84 |
| -25 | 38 | 01/ | 41 | 100 | 68 | 7/P | 55 | P- | 81 |
| -26 | 28 | 010 | 24 | 101 | 19 | 8-JUL | 78 | PR | 75 |
| -27 | 40 | 011 | 24 | 103 | 20 | 8-JUN | 64 | R-0 | 42 |
| -28 | 26 | 013 | 26 | 104 | 23 | 8-MAR | 59 | R-1 | 41 |
| -29 | 32 | 014 | 23 | 11/ | 27 | 8-MAY | 86 | R-2 | 40 |
| -3 | 40 | 015 | 19 | 110 | 25 | 8-NOV | 107 | R-3 | 11 |
| -NOV- | 107 | 02/ | 32 | 111 | 18 | 8/ | 61 | SE | 81 |
| /AM01 | 57 | 020 | 17 | 113 | 23 | 9/ | 32 | SUDA | 71 |
| /AM02 | 38 | 021 | 16 | 114 | 25 | 98-AP | 75 | SUKAW | 187 |
| /AM03 | 40 | 023 | 21 | 115 | 40 | 98 AU | 99 | T- | 84 |
| /AM04 | 44 | 024 | 22 | 12/ | 35 | 98-JA | 82 | UG | 99 |
| /AM05 | 42 | 03/ | 32 | 120 | 17 | 98-JU | 142 | UKAWA | 187 |
| /AM06 | 46 | 030 | 47 | 121 | 26 | 98-MA | 145 | WADA | 189 |
| /AM07 | 40 | 031 | 17 | 123 | 20 | 98-NO | 107 | YASU | 96 |
| /AM08 | 49 | 033 | 16 | 124 | 16 | 998-A | 174 | YASUD | 71 |
| /AM09 | 32 | 034 | 20 | 13/A | 13 | 998-D | 97 | YASUK | 81 |
| /AM10 | 40 | 04/ | 33 | 15/K | 59 | 998-F | 88 | | |
| /AM11 | 52 | 040 | 21 | 15/N | 49 | 998-J | 224 | | |
| /AM12 | 40 | 041 | 18 | 15/P | 13 | 998-M | 145 | | |
| /KAWA | 273 | 043 | 24 | 15/S | 82 | 998-N | 107 | | |
| /NOD | 70 | 044 | 23 | 15/W | 27 | 998-O | 84 | | |
| /NOK | 99 | 045 | 25 | 15/Y | 22 | 998-S | 81 | | |
| /PM01 | 40 | 05/ | 37 | 19/ | 30 | AN- | 82 | | |
| /PM02 | 38 | 050 | 24 | 1998- | 1000 | ANO | 83 | | |
| /PM03 | 40 | 051 | 21 | 2/A | 57 | AY | 86 | | |
| /PM04 | 42 | 053 | 23 | 2/P | 44 | AYA | 96 | | |

Fig. 24

| Metasymbol | Frequency | Metasymbol | Frequency | Metasymbol | Frequency | Metasymbol | Frequency | Metasymbol | Frequency |
|---|---|---|---|---|---|---|---|---|---|
| -01 | 41 | /NOK | 99 | 044 | 23 | 15/W | 27 | 998-MA | 145 |
| -02 | 32 | /PM01 | 40 | 045 | 25 | 15/Y | 22 | 998 NO | 107 |
| -03 | 32 | /PM02 | 38 | 05/ | 37 | 19/ | 30 | AN- | 82 |
| -04 | 33 | /PM03 | 40 | 050 | 24 | 1998-A | 174 | ANO | 83 |
| -05 | 37 | /PM04 | 42 | 051 | 21 | 1998-D | 97 | AY- | 86 |
| -06 | 27 | /PM05 | 45 | 053 | 23 | 1998-F | 88 | AYA | 96 |
| -07 | 35 | /PM06 | 40 | 054 | 19 | 1998-J | 224 | B- | 88 |
| -08 | 27 | /PM07 | 46 | 06/ | 27 | 1998-M | 145 | C- | 97 |
| -09 | 30 | /PM08 | 30 | 060 | 23 | 1998-N | 107 | CT | 84 |
| -10 | 37 | /PM09 | 40 | 061 | 23 | 1998-O | 84 | DA | 70 |
| -11 | 27 | /PM10 | 43 | 063 | 24 | 1998-S | 81 | DE | 97 |
| -12 | 35 | /PM11 | 37 | 064 | 16 | 2/A | 57 | EB | 88 |
| -13 | 31 | /PM12 | 39 | 07/ | 35 | 2/P | 44 | EC | 97 |
| -14 | 31 | /SUDA | 105 | 070 | 18 | 3/ | 61 | EP | 81 |
| -15 | 26 | /SUKAW | 106 | 071 | 24 | 30/A | 21 | FE | 88 |
| -16 | 27 | /SUWA | 100 | 073 | 18 | 30/K | 59 | G- | 99 |
| -17 | 30 | /YASUD | 71 | 074 | 26 | 30/N | 50 | KAWA | 99 |
| -18 | 35 | /YASUK | 81 | 08/ | 27 | 30/P | 12 | L- | 78 |
| -19 | 30 | 0/A | 26 | 080 | 21 | 30/S | 74 | N-0 | 39 |
| -20 | 27 | 0/KAWA | 143 | 081 | 22 | 30/W | 23 | N-1 | 40 |
| -21 | 41 | 0/P | 38 | 083 | 18 | 30/Y | 43 | N-2 | 55 |
| -22 | 34 | 0/SUD | 46 | 084 | 18 | 300 | 27 | N-3 | 12 |
| -23 | 30 | 0/SUK | 71 | 09/ | 30 | 31 | 36 | OC | 84 |
| -24 | 32 | 0/SUW | 38 | 090 | 25 | 4/ | 63 | P- | 81 |
| -25 | 38 | 00/K | 84 | 091 | 13 | 45/K | 71 | PR | 75 |
| 26 | 28 | 00/N | 31 | 093 | 16 | 45/N | 39 | R-0 | 42 |
| -27 | 40 | 00/S | 81 | 094 | 17 | 45/S | 74 | R-1 | 41 |
| -28 | 26 | 00/W | 24 | 1/A | 68 | 45/W | 21 | R-2 | 40 |
| -29 | 32 | 00/Y | 42 | 1/P | 77 | 45/Y | 45 | R-3 | 11 |
| -3 | 40 | 000 | 19 | 10/ | 37 | 5/A | 41 | SE | 81 |
| -NOV-0 | 32 | 01/ | 41 | 100 | 68 | 5/KAWA | 130 | SUDA | 71 |
| -NOV-1 | 28 | 010 | 24 | 101 | 19 | 5/P | 34 | SUKAWA | 187 |
| -NOV-2 | 41 | 011 | 24 | 103 | 20 | 5/SUD | 59 | T- | 84 |
| -NOV-3 | 6 | 013 | 26 | 104 | 25 | 5/SUK | 35 | UG | 99 |
| /AM01 | 57 | 014 | 23 | 11/ | 27 | 5/SUW | 62 | WADA | 189 |
| /AM02 | 38 | 015 | 19 | 110 | 25 | 6/ | 55 | YASU | 96 |
| /AM03 | 40 | 02/ | 32 | 111 | 16 | 7/A | 50 | | |
| /AM04 | 44 | 020 | 17 | 113 | 23 | 7/P | 55 | | |
| /AM05 | 42 | 021 | 16 | 114 | 25 | 8-NOV | 107 | | |
| /AM06 | 46 | 023 | 21 | 115 | 40 | 8/ | 61 | | |
| /AM07 | 40 | 024 | 22 | 12/ | 35 | 9/ | 32 | | |
| /AM08 | 49 | 03/ | 32 | 120 | 17 | 98-JUL | 78 | | |
| /AM09 | 32 | 030 | 47 | 121 | 26 | 98-JUN | 64 | | |
| /AM10 | 40 | 031 | 17 | 123 | 20 | 98-MAR | 59 | | |
| /AM11 | 52 | 033 | 16 | 124 | 16 | 98-MAY | 86 | | |
| /AM12 | 40 | 034 | 20 | 15/A | 13 | 98-NOV | 107 | | |
| /KAWAD | 94 | 04/ | 33 | 15/K | 59 | 998-AP | 75 | | |
| /KAWAN | 83 | 040 | 21 | 15/N | 49 | 998-AU | 99 | | |
| /KAWAY | 96 | 041 | 18 | 15/P | 13 | 998-JA | 82 | | |
| /NOD | 70 | 043 | 24 | 15/S | 82 | 998-JU | 142 | | |

Fig. 25

| Metasymbol | Frequency | Metasymbol | Frequency | Metasymbol | Frequency | Metasymbol | Frequency | Metasymbol | Frequency |
|---|---|---|---|---|---|---|---|---|---|
| -01 | 41 | /PM07 | 46 | 053 | 23 | 1998-D | 97 | ANO | 83 |
| -02 | 32 | /PM08 | 30 | 054 | 19 | 1998-F | 88 | AY- | 86 |
| -03 | 32 | /PM09 | 40 | 06/ | 27 | 1998-JA | 82 | AYA | 96 |
| -04 | 33 | /PM10 | 43 | 060 | 23 | 1998-JU | 142 | B- | 88 |
| -05 | 37 | /PM11 | 37 | 061 | 23 | 1998-MA | 145 | C- | 97 |
| -06 | 27 | /PM12 | 39 | 063 | 24 | 1998 NO | 107 | CT | 84 |
| -07 | 35 | /SUDA | 105 | 064 | 16 | 1998-O | 84 | DA | 70 |
| -08 | 27 | /SUKAWA | 106 | 07/ | 35 | 1998-S | 81 | DE | 97 |
| -09 | 30 | /SUWA | 100 | 070 | 18 | 2/A | 57 | EB | 88 |
| -10 | 37 | /YASUD | 71 | 071 | 24 | 2/P | 44 | EC | 97 |
| -11 | 27 | /YASUK | 81 | 073 | 18 | 3/ | 61 | EP | 81 |
| -12 | 35 | 0/A | 26 | 074 | 26 | 30/A | 21 | FE | 88 |
| -13 | 31 | 0/KAWAD | 47 | 08/ | 37 | 30/K | 59 | G- | 99 |
| -14 | 31 | 0/KAWAN | 47 | 080 | 21 | 30/N | 50 | KAWA | 99 |
| -15 | 26 | 0/KAWAY | 49 | 081 | 22 | 30/P | 12 | L | 78 |
| -16 | 27 | 0/P | 38 | 083 | 18 | 30/S | 74 | N-0 | 39 |
| -17 | 30 | 0/SUD | 46 | 084 | 18 | 30/W | 23 | N-1 | 40 |
| -18 | 35 | 0/SUK | 71 | 09/ | 30 | 30/Y | 43 | N-2 | 55 |
| -19 | 30 | 0/SUW | 38 | 090 | 26 | 300 | 27 | N-3 | 12 |
| -20 | 27 | 00/K | 84 | 091 | 13 | 31 | 36 | OC | 84 |
| -21 | 41 | 00/N | 31 | 093 | 16 | 4/ | 63 | P- | 81 |
| -22 | 34 | 00/S | 81 | 094 | 17 | 45/K | 71 | PR | 75 |
| -23 | 30 | 00/W | 24 | 1/A | 68 | 45/N | 39 | R-0 | 42 |
| -24 | 32 | 00/Y | 42 | 1/P | 77 | 45/S | 74 | R-1 | 41 |
| -25 | 38 | 000 | 19 | 10/ | 37 | 45/W | 21 | R-2 | 40 |
| -26 | 28 | 01/ | 41 | 100 | 68 | 45/Y | 45 | R-3 | 11 |
| -27 | 40 | 010 | 24 | 101 | 19 | 5/A | 41 | SE | 81 |
| -28 | 26 | 011 | 24 | 103 | 20 | 5/KAWAD | 47 | SUDA | 71 |
| -29 | 32 | 013 | 26 | 104 | 25 | 5/KAWAN | 36 | SUKAWA | 81 |
| -3 | 40 | 014 | 23 | 11/ | 27 | 5/KAWAY | 47 | T- | 84 |
| /AM01 | 57 | 015 | 19 | 110 | 25 | 5/P | 34 | UG | 99 |
| /AM02 | 38 | 02/ | 32 | 111 | 16 | 5/SUD | 59 | WADA | 189 |
| /AM03 | 40 | 020 | 17 | 113 | 23 | 5/SUK | 35 | YASU | 96 |
| /AM04 | 44 | 021 | 16 | 114 | 25 | 5/SUW | 62 | | |
| /AM05 | 42 | 023 | 21 | 115 | 40 | 6/ | 55 | | |
| /AM06 | 46 | 024 | 22 | 12/ | 35 | 7/A | 50 | | |
| /AM07 | 40 | 03/ | 32 | 120 | 17 | 7/P | 55 | | |
| /AM08 | 49 | 030 | 47 | 121 | 26 | 8-NOV-0 | 32 | | |
| /AM09 | 32 | 031 | 17 | 123 | 20 | 8-NOV-1 | 28 | | |
| /AM10 | 40 | 033 | 16 | 124 | 16 | 8-NOV-2 | 41 | | |
| /AM11 | 52 | 034 | 20 | 15/A | 13 | 8-NOV-3 | 6 | | |
| /AM12 | 40 | 04/ | 33 | 15/K | 59 | 8/ | 61 | | |
| /NOD | 70 | 040 | 21 | 15/N | 49 | 9/ | 32 | | |
| /NOK | 99 | 041 | 18 | 15/P | 13 | 98-NOV | 107 | | |
| /PM01 | 40 | 043 | 24 | 15/S | 82 | 998 JUL | 78 | | |
| /PM02 | 38 | 044 | 23 | 15/W | 27 | 998-JUN | 64 | | |
| /PM03 | 40 | 045 | 25 | 15/Y | 22 | 998-MAR | 59 | | |
| /PM04 | 42 | 05/ | 37 | 19/ | 30 | 998 MAY | 86 | | |
| /PM05 | 45 | 050 | 24 | 1998-AP | 75 | 998-NOV | 107 | | |
| /PM06 | 40 | 051 | 21 | 1998-AU | 99 | AN- | 82 | | |

Fig. 26

| Metasymbol | Frequency | Metasymbol | Frequency | Metasymbol | Frequency | Metasymbol | Frequency | Metasymbol | Frequency |
|---|---|---|---|---|---|---|---|---|---|
| -01 | 41 | /PM07 | 46 | 053 | 23 | 1998-D | 97 | C- | 97 |
| -02 | 32 | /PM08 | 30 | 054 | 19 | 1998-F | 88 | CT | 84 |
| -03 | 32 | /PM09 | 40 | 06/ | 27 | 1998-JUL. | 78 | DA | 70 |
| -04 | 33 | /PM10 | 43 | 060 | 23 | 1998-JUN | 64 | DE | 97 |
| -05 | 37 | /PM11 | 37 | 061 | 23 | 1998-MAR | 59 | EB | 88 |
| -06 | 27 | /PM12 | 39 | 063 | 24 | 1998-MAY | 86 | EC | 97 |
| -07 | 35 | /SUDA | 105 | 064 | 16 | 1998-NOV | 107 | EP | 81 |
| -08 | 27 | /SUKAWA | 106 | 07/ | 35 | 1998-O | 84 | FE | 88 |
| -09 | 30 | /SUWA | 100 | 070 | 18 | 1998-S | 81 | G- | 99 |
| -10 | 37 | /YASUD | 71 | 071 | 24 | 2/A | 57 | KAWA | 99 |
| -11 | 27 | /YASUK | 81 | 073 | 18 | 2/P | 44 | L- | 78 |
| -12 | 35 | 0/A | 26 | 074 | 26 | 3/ | 61 | N-0 | 39 |
| -13 | 31 | 0/KAWAD | 47 | 08/ | 27 | 30/A | 21 | N-1 | 40 |
| -14 | 31 | 0/KAWAN | 47 | 080 | 21 | 30/K | 59 | N-2 | 55 |
| -15 | 26 | 0/KAWAY | 49 | 081 | 22 | 30/N | 50 | N-3 | 12 |
| -16 | 27 | 0/P | 38 | 083 | 18 | 30/P | 12 | OC | 84 |
| -17 | 30 | 0/SUD | 46 | 084 | 18 | 30/S | 74 | P- | 81 |
| 18 | 35 | 0/SUK | 71 | 09/ | 30 | 30/W | 23 | PR | 75 |
| -19 | 30 | 0/SUW | 38 | 090 | 26 | 30/Y | 43 | R-0 | 42 |
| -20 | 27 | 00/K | 84 | 091 | 13 | 300 | 27 | R-1 | 41 |
| -21 | 41 | 00/N | 31 | 093 | 16 | 31 | 36 | R-2 | 40 |
| -22 | 34 | 00/S | 81 | 094 | 17 | 4/ | 63 | R-3 | 11 |
| -23 | 30 | 00/W | 24 | 1/A | 68 | 45/K | 71 | SE | 81 |
| -24 | 32 | 00/Y | 42 | 1/P | 77 | 45/N | 39 | SUDA | 71 |
| -25 | 38 | 000 | 19 | 10/ | 37 | 45/S | 74 | SUKAWA | 81 |
| -26 | 28 | 01/ | 41 | 100 | 68 | 45/W | 21 | T- | 84 |
| -27 | 40 | 010 | 24 | 101 | 19 | 45/Y | 45 | UG | 99 |
| -28 | 26 | 011 | 24 | 103 | 20 | 5/A | 41 | WADA | 189 |
| -29 | 32 | 013 | 26 | 104 | 25 | 5/KAWAD | 47 | YASU | 96 |
| 3 | 40 | 014 | 23 | 11/ | 27 | 5/KAWAN | 36 | | |
| /AM01 | 57 | 015 | 19 | 110 | 25 | 5/KAWAY | 47 | | |
| /AM02 | 38 | 02/ | 32 | 111 | 16 | 5/P | 34 | | |
| /AM03 | 40 | 020 | 17 | 113 | 23 | 5/SUD | 59 | | |
| /AM04 | 44 | 021 | 16 | 114 | 25 | 5/SUK | 35 | | |
| /AM05 | 42 | 023 | 21 | 115 | 40 | 5/SUW | 62 | | |
| /AM06 | 46 | 024 | 22 | 12/ | 35 | 6/ | 55 | | |
| /AM07 | 40 | 03/ | 32 | 120 | 17 | 7/A | 50 | | |
| /AM08 | 49 | 030 | 47 | 121 | 26 | 7/P | 55 | | |
| /AM09 | 32 | 031 | 17 | 123 | 20 | 8/ | 61 | | |
| /AM10 | 40 | 033 | 16 | 124 | 16 | 9/ | 32 | | |
| /AM11 | 52 | 034 | 20 | 15/A | 13 | 98-NOV-0 | 32 | | |
| /AM12 | 40 | 04/ | 33 | 15/K | 59 | 98-NOV-1 | 28 | | |
| /NOD | 70 | 040 | 21 | 15/N | 49 | 98-NOV-2 | 41 | | |
| /NOK | 99 | 041 | 18 | 15/P | 13 | 98-NOV 3 | 6 | | |
| /PM01 | 40 | 043 | 24 | 15/S | 82 | 998-NOV | 107 | | |
| /PM02 | 38 | 044 | 23 | 15/W | 27 | AN- | 82 | | |
| /PM03 | 40 | 045 | 25 | 15/Y | 22 | ANO | 83 | | |
| /PM04 | 42 | 05/ | 37 | 19/ | 30 | AY- | 86 | | |
| /PM05 | 45 | 050 | 24 | 1998-AP | 75 | AYA | 96 | | |
| /PM06 | 40 | 051 | 21 | 1998-AU | 99 | B- | 88 | | |

Fig. 27

| Metasymbol | Frequency | Metasymbol | Frequency | Metasymbol | Frequency | Metasymbol | Frequency | Metasymbol | Frequency |
|---|---|---|---|---|---|---|---|---|---|
| -01 | 41 | /PM07 | 46 | 053 | 23 | 1998-D | 97 | CT | 84 |
| -02 | 32 | /PM08 | 30 | 054 | 19 | 1998-F | 88 | DA | 70 |
| -03 | 32 | /PM09 | 40 | 06/ | 27 | 1998-JUL | 78 | DE | 97 |
| -04 | 33 | /PM10 | 43 | 060 | 23 | 1998-JUN | 64 | EB | 88 |
| -05 | 37 | /PM11 | 37 | 061 | 23 | 1998-MAR | 59 | EC | 97 |
| -06 | 27 | /PM12 | 39 | 063 | 24 | 1998-MAY | 86 | EP | 81 |
| -07 | 35 | /SUDA | 105 | 064 | 16 | 1998-NOV- | 107 | FE | 88 |
| -08 | 27 | /SUKAWA | 106 | 07/ | 35 | 1998-O | 84 | G- | 99 |
| -09 | 30 | /SUWA | 100 | 070 | 18 | 1998-S | 81 | KAWA | 99 |
| -10 | 37 | /YASUD | 71 | 071 | 24 | 2/A | 57 | L- | 78 |
| -11 | 27 | /YASUK | 81 | 073 | 18 | 2/P | 44 | N-0 | 39 |
| -12 | 35 | 0/A | 26 | 074 | 26 | 3/ | 61 | N-1 | 40 |
| -13 | 31 | 0/KAWAD | 47 | 08/ | 27 | 30/A | 21 | N-2 | 55 |
| -14 | 31 | 0/KAWAN | 47 | 080 | 21 | 30/K | 59 | N-3 | 12 |
| -15 | 26 | 0/KAWAY | 49 | 081 | 22 | 30/N | 50 | OC | 84 |
| -16 | 27 | 0/P | 38 | 083 | 18 | 30/P | 12 | P- | 81 |
| -17 | 30 | 0/SUD | 46 | 084 | 18 | 30/S | 74 | PR | 75 |
| -18 | 35 | 0/SUK | 71 | 09/ | 30 | 30/W | 23 | R-0 | 42 |
| -19 | 30 | 0/SUW | 38 | 090 | 26 | 30/Y | 43 | R-1 | 41 |
| -20 | 27 | 00/K | 84 | 091 | 13 | 300 | 27 | R-2 | 40 |
| 21 | 41 | 00/N | 31 | 093 | 16 | 31 | 36 | R-3 | 11 |
| -22 | 34 | 00/S | 81 | 094 | 17 | 4/ | 63 | SE | 81 |
| -23 | 30 | 00/W | 24 | 1/A | 68 | 45/K | 71 | SUDA | 71 |
| -24 | 32 | 00/Y | 42 | 1/P | 77 | 45/N | 39 | SUKAWA | 81 |
| -25 | 38 | 000 | 19 | 10/ | 37 | 45/S | 74 | T- | 84 |
| -26 | 28 | 01/ | 41 | 100 | 68 | 45/W | 21 | UG | 99 |
| -27 | 40 | 010 | 24 | 101 | 19 | 45/Y | 45 | WADA | 189 |
| -28 | 26 | 011 | 24 | 103 | 20 | 5/A | 41 | YASU | 96 |
| -29 | 32 | 013 | 28 | 104 | 25 | 5/KAWAD | 47 | | |
| -3 | 40 | 014 | 23 | 11/ | 27 | 5/KAWAN | 36 | | |
| /AM01 | 57 | 015 | 19 | 110 | 25 | 5/KAWAY | 47 | | |
| /AM02 | 38 | 02/ | 32 | 111 | 16 | 5/P | 34 | | |
| /AM03 | 40 | 020 | 17 | 113 | 23 | 5/SUD | 59 | | |
| /AM04 | 44 | 021 | 16 | 114 | 25 | 5/SUK | 35 | | |
| /AM05 | 42 | 023 | 21 | 115 | 40 | 5/SUW | 62 | | |
| /AM06 | 46 | 024 | 22 | 12/ | 35 | 6/ | 55 | | |
| /AM07 | 40 | 03/ | 32 | 120 | 17 | 7/A | 50 | | |
| /AM08 | 49 | 030 | 47 | 121 | 26 | 7/P | 55 | | |
| /AM09 | 32 | 031 | 17 | 123 | 20 | 8/ | 61 | | |
| /AM10 | 40 | 033 | 16 | 124 | 16 | 9/ | 32 | | |
| /AM11 | 52 | 034 | 20 | 15/A | 13 | 998-NOV-0 | 32 | | |
| /AM12 | 40 | 04/ | 33 | 15/K | 59 | 998-NOV-1 | 28 | | |
| /NOD | 70 | 040 | 21 | 15/N | 49 | 998-NOV-2 | 41 | | |
| /NOK | 99 | 041 | 18 | 15/P | 13 | 998-NOV-3 | 6 | | |
| /PM01 | 40 | 043 | 24 | 15/S | 82 | AN- | 82 | | |
| /PM02 | 38 | 044 | 23 | 15/W | 27 | ANO | 83 | | |
| /PM03 | 40 | 045 | 25 | 15/Y | 22 | AY- | 86 | | |
| /PM04 | 42 | 05/ | 37 | 19/ | 30 | AYA | 96 | | |
| /PM05 | 45 | 050 | 24 | 1998-AP | 75 | B- | 88 | | |
| /PM06 | 40 | 051 | 21 | 1998-AU | 99 | C- | 97 | | |

Fig. 28

| Metasymbol | Frequency | Metasymbol | Frequency | Metasymbol | Frequency | Metasymbol | Frequency | Metasymbol | Frequency |
|---|---|---|---|---|---|---|---|---|---|
| -01 | 41 | /PM07 | 46 | 053 | 23 | 1998-D | 97 | D4 | 70 |
| -02 | 32 | /PM08 | 30 | 054 | 19 | 1998-F | 88 | DE | 97 |
| -03 | 32 | /PM09 | 40 | 05/ | 27 | 1998-JUL | 73 | EB | 88 |
| -04 | 33 | /PM10 | 43 | 050 | 23 | 1998-JUN | 64 | EC | 97 |
| -05 | 37 | /PM11 | 37 | 051 | 23 | 1998-MAR | 59 | EP | 81 |
| -06 | 27 | /PM12 | 39 | 053 | 24 | 1998-MAY | 86 | FE | 88 |
| -07 | 35 | /SUDA | 103 | 054 | 16 | 1998-NOV-0 | 32 | G- | 99 |
| -08 | 27 | /SUKAWA | 106 | 07/ | 35 | 1998-NOV-1 | 28 | KAWA | 99 |
| -09 | 30 | /SUWA | 100 | 070 | 18 | 1998-NOV-2 | 41 | L- | 78 |
| -10 | 37 | /YASUD | 71 | 071 | 24 | 1998-NOV-3 | 6 | N-0 | 39 |
| -11 | 27 | /YASUK | 81 | 073 | 18 | 1998-O | 84 | N-1 | 40 |
| -12 | 35 | 0/A | 26 | 074 | 26 | 1998-S | 81 | N-2 | 55 |
| -13 | 31 | 0/KAWAD | 47 | 08/ | 27 | 2/A | 57 | N-3 | 12 |
| -14 | 31 | 0/KAWAN | 47 | 080 | 21 | 2/P | 44 | OC | 84 |
| -15 | 26 | 0/KAWAY | 49 | 081 | 22 | 3/ | 61 | P- | 81 |
| -16 | 27 | 0/P | 38 | 083 | 18 | 30/A | 21 | PR | 75 |
| -17 | 30 | 0/SUD | 46 | 084 | 18 | 30/K | 59 | R-0 | 42 |
| -18 | 35 | 0/SUK | 71 | 09/ | 30 | 30/N | 50 | R-1 | 41 |
| -19 | 30 | 0/SUW | 38 | 090 | 26 | 30/P | 12 | R-2 | 40 |
| -20 | 27 | 00/K | 84 | 091 | 13 | 30/S | 74 | R-3 | 11 |
| -21 | 41 | 00/N | 31 | 093 | 16 | 30/W | 23 | SE | 81 |
| -22 | 34 | 00/S | 81 | 094 | 17 | 30/Y | 43 | SUDA | 71 |
| -23 | 30 | 00/W | 24 | 1/A | 68 | 300 | 27 | SUKAWA | 81 |
| -24 | 32 | 00/Y | 42 | 1/P | 77 | 31 | 36 | T- | 84 |
| -25 | 38 | 000 | 19 | 10/ | 37 | 4/ | 63 | UG | 99 |
| -26 | 28 | 01/ | 41 | 100 | 68 | 45/K | 71 | WADA | 189 |
| -27 | 40 | 010 | 24 | 101 | 19 | 45/N | 39 | YASU | 96 |
| -28 | 26 | 011 | 24 | 103 | 20 | 45/S | 74 | | |
| -29 | 32 | 013 | 26 | 104 | 25 | 45/W | 21 | | |
| -3 | 40 | 014 | 23 | 11/ | 27 | 45/Y | 45 | | |
| /AM01 | 57 | 015 | 19 | 110 | 25 | 5/A | 41 | | |
| /AM02 | 38 | 02/ | 32 | 111 | 16 | 5/KAWAD | 47 | | |
| /AM03 | 40 | 020 | 17 | 113 | 23 | 5/KAWAN | 36 | | |
| /AM04 | 44 | 021 | 16 | 114 | 25 | 5/KAWAY | 47 | | |
| /AM05 | 42 | 023 | 21 | 115 | 40 | 5/P | 34 | | |
| /AM06 | 46 | 024 | 22 | 12/ | 35 | 5/SUD | 59 | | |
| /AM07 | 40 | 03/ | 32 | 120 | 17 | 5/SUK | 35 | | |
| /AM08 | 49 | 030 | 47 | 121 | 26 | 5/SUW | 62 | | |
| /AM09 | 32 | 031 | 17 | 123 | 20 | 6/ | 55 | | |
| /AM10 | 40 | 033 | 16 | 124 | 16 | 7/A | 50 | | |
| /AM11 | 52 | 034 | 20 | 15/A | 13 | 7/P | 55 | | |
| /AM12 | 40 | 04/ | 33 | 15/K | 59 | 8/ | 61 | | |
| /NOD | 70 | 040 | 21 | 15/N | 49 | 9/ | 32 | | |
| /NOK | 99 | 041 | 18 | 15/P | 13 | AN- | 82 | | |
| /PM01 | 40 | 043 | 24 | 15/S | 82 | ANO | 83 | | |
| /PM02 | 38 | 044 | 23 | 15/W | 27 | AY- | 86 | | |
| /PM03 | 40 | 045 | 25 | 15/Y | 22 | AYA | 96 | | |
| /PM04 | 42 | 05/ | 37 | 19/ | 30 | B- | 88 | | |
| /PM05 | 45 | 050 | 24 | 1998-AP | 75 | C- | 97 | | |
| /PM06 | 40 | 051 | 21 | 1998-AU | 99 | CT | 84 | | |

Fig. 29

| Metasymbol (symbol, number of left characters, number of right characters) | | Metasymbol (symbol, number of left characters, number of right characters) | |
|---|---|---|---|
| 01 | (1998-JAN-01/AM0200/KAWAYASU, 8, 16) | 100 | (1998-JAN-04/AM1000/SUWA, 14, 6) |
|  | (1998-JAN-01/AM0815/WADA, 8, 12) |  | (1998-JAN-05/AM0100/SUKAWA, 15, 7) |
|  | (1998-JAN-01/PM0615/NODA, 8, 12) |  | (1998-JAN-10/AM1100/KAWAYASU, 15, 9) |
|  | (1998-JAN-01/PM1045/KAWADA, 8, 14) |  | . |
|  | (1998-JAN-01/PM1130/KAWADA, 8, 14) |  | . |
|  | (1998-JAN-01/PM1215/KAWAYASU, 8, 16) |  | . |
|  | (1998-FEB-01/PM0300/SUKAWA, 8, 14) |  | (1998-DEC-25/AM1100/YASUDA, 15, 7) |
|  | (1998-FEB-01/PM1230/YASUKAWA, 8, 16) |  | (1998-DEC-26/AM1000/KAWANO, 14, 8) |
|  | (1998-FEB-01/PM1245/KAWAYASU, 8, 16) |  | (1998-DEC-27/AM0100/WADA, 15, 5) |
|  | . |  | (1998-DEC-27/AM1100/KAWADA, 15, 7) |
|  | . |  | (1998-DEC-30/AM1100/SUKAWA, 15, 7) |
|  | (1998-DEC-01/AM0100/YASUDA, 8, 14) |  |  |
|  | (1998-DEC-01/AM0115/NOKAWA, 8, 14) |  | . |
|  | (1998-DEC-01/PM0400/SUDA, 8, 12) |  | . |
|  | (1998-DEC-01/PM1000/YASUKAWA, 8, 16) | DA | (1998-JAN-01/PM0615/NODA, 21, 0) |
| 02 | (1998-FEB-02/AM0645/KAWADA, 8, 14) |  | (1998-JAN-08/AM1115/NODA, 21, 0) |
|  | (1998-FEB-02/PM1215/SUDA, 8, 12) |  | . |
|  | . |  | . |
|  | . |  | (1998-DEC-25/AM0800/NODA, 21, 0) |
|  | (1998-DEC-02/PM1030/SUKAWA, 8, 14) |  | (1998-DEC-29/PM1030/NODA, 21, 0) |
|  | (1998-DEC-02/PM1045/YASUKAWA, 8, 16) |  |  |
|  | . |  | . |
|  | . |  | . |
|  | . | WADA | (1998-JAN-01/AM0815/WADA, 19, 0) |
| 29 | (1998-JAN-29/AM0800/WADA, 8, 12) |  | (1998-JAN-01/PM1045/KAWADA, 21, 0) |
|  | (1998-JAN-29/AM0845/KAWADA, 8, 14) |  | (1998-JAN-01/PM1130/KAWADA, 21, 0) |
|  | . |  | (1998-JAN-03/AM0615/WADA, 19, 0) |
|  | (1998-DEC-29/PM1030/NODA, 8, 12) |  | . |
|  |  |  | (1998-DEC-23/PM0530/KAWADA, 21, 0) |
| 3 | (1998-JAN-30/AM0915/KAWAYASU, 8, 17) |  | (1998-DEC-27/AM0100/WADA, 19, 0) |
|  | (1998-JAN-30/AM1130/YASUDA, 8, 15) |  | (1998-DEC-27/AM1100/KAWADA, 21, 0) |
|  | (1998-JAN-30/PM0945/KAWADA, 8, 15) |  | (1998-DEC-29/AM0315/KAWADA, 21, 0) |
|  | . | YASU | (1998-JAN-01/AM0200/KAWAYASU, 23, 0) |
|  | . |  | (1998-JAN-01/PM1215/KAWAYASU, 23, 0) |
|  | (1998-DEC-30/AM1100/SUKAWA, 8, 15) |  | (1998-JAN-06/AM0645/KAWAYASU, 23, 0) |
|  | (1998-DEC-31/AM1115/YASUDA, 8, 15) |  | . |
|  | (1998-DEC-31/AM1200/NOKAWA, 8, 15) |  | . |
|  | (1998-DEC-31/PM0400/SUKAWA, 8, 15) |  | (1998-DEC-25/PM0915/KAWAYASU, 23, 0) |
|  | . |  | (1998-DEC-30/AM0845/KAWAYASU, 23, 0) |
|  | . |  | (1998-DEC-30/AM1030/KAWAYASU, 23, 0) |

Fig. 33

| Metasymbol | (extended metasymbol, number of left characters, number of right characters) | Metasymbol | (extended metasymbol, number of left characters, number of right characters) |
|---|---|---|---|
| - | (-,0,0), (-01,0,2), ..., (-29,0,2), (-3,0,1), (1998-AP,4,2), (1998-AU,4,2), (1998-D,4,1), ..., (1998-NOV-3,4,5), (1998-NOV-3,8,1), (1998-O,4,1), (1998-S,4,1), (AN,2,0), (AY-,2,0), (C-,1,0), (N-0,1,1), ..., (N-3,1,1), (P-,1,0), (R-0,1,1), ..., (R-3,1,1) | . . . | |
| | | SUDA | (SUDA,0,0), (/SUDA,1,0) |
| | | SUKAWA | (SUKAWA,0,0), (/SUKAWA,1,0) |
| -01 | (-01,0,0) | T | (T,0,0), (T-,0,1) |
| . . . | | T- | (T-,0,0) |
| | | U | (U,0,0), (/SUDA,2,2), (/SUKAWA,2,4), (/SUWA,2,2), (/YASUD,4,1), (/YASUK,4,1), (0/SUD,3,1), (0/SUK,3,1), (0/SUW,3,1), (1998-AU,6,0), (1998-JU,6,0), (5/SUD,3,1), (5/SUK,3,1), (5/SUW,3,1), (998-JUL,5,1), (998-JUN,5,1), (SUDA,1,2), (SUKAWA,1,4), (UG,0,1), (YASU,3,0) |
| -29 | (-29,0,0) | | |
| -3 | (-3,0,0), (1998-NOV-3,8,0), (N-3,2,0), (R-3,2,0) | | |
| / | (/,0,0), (/AM01,0,4), ..., (/AM12,0,4), (/NOD,0,3), (/NOK,0,3), (/PM01,0,4), ..., (/PM12,0,4), (/SUDA,0,4), ..., (9/,1,0) | UG | (UG,0,0) |
| /AM01 | (/AM01,0,0) | V | (8-NOV-0,4,2), (8-NOV-1,4,2), (8-NOV-2,4,2), (8-NOV-3,4,2), (998-NOV,6,0) |
| . . . | | W | (W,0,0), (/SUKAWA,5,1), (/SUWA,3,1), (0/KAWAD,4,2), (0/KAWAN,4,2), (0/KAWAY,4,2), (0/SUW,3,0), (00/W,3,0), (15/W,3,0), (30/W,3,0), (45/W,3,0), (5/KAWAD,4,2), (5/KAWAN,4,2), (5/KAWAY,4,2), (5/SUW,3,0), (KAWA,2,1), (SUKAWA,4,1), (WADA,0,3) |
| /AM12 | (/AM12,0,0) | | |
| /NOD | (/NOD,0,0) | | |
| /NOK | (/NOK,0,0) | | |
| /PM01 | (/PM01,0,0) | WADA | (WADA,0,0) |
| . . . | | Y | (Y,0,0), (/YASUD,1,4), (/YASUK,1,4), (0/KAWAY,6,0), (00/Y,3,0), (15/Y,3,0), (30/Y,3,0), (45/Y,3,0), (5/KAWAY,6,0), (998-MAY,6,0), (AY-,1,1), (AYA,1,1), (YASU,0,3) |
| /PM12 | (/PM12,0,0) | | |
| /SUDA | (/SUDA,0,0) | | |
| /SUKAWA | (/SUKAWA,0,0) | YASU | (YASU,0,0), (/YASUD,1,1), (/YASUK,1,1) |
| /SUWA | (/SUWA,0,0) | | |

Fig. 34

```
Question
character string=1998-NOV-01/PM1030/KAWAYASU    (Complete coincidence collating)

*STEP 1
C={ (1998-NOV-0,1,11), (1/P,11,14), (/PM10,12,17), (30/K,17,21),
    (O/KAWAY,18,25), (YASU,24,28) }

*STEP 2
(M, s, e)=(1998-NOV-0,1,11)
A={ 1998-NOV-01/AM0830/NODA, 1998-NOV-01/AM1115/SUDA, 1998-NOV-01/PM1030/KAWAYASU,
    1998-NOV-01/PM1130/SUWA, 1998-NOV-01/PM1145/KAWADA, 1998-NOV-02/AM0300/KAWADA,
    ·················· , 1998/NOV-09/AM0945/SUDA, 1998-NOV-09/PM0515/KAWAYASU }
C={ (1/P,11,14), (/PM10,12,17), (30/K,17,21), (O/KAWAY,18,25), (YASU,24,28) }

*STEP 3
(M, s, e)=(1/P,11,14)
B={ 1998-JAN-01/PM0615/NODA, 1998-JAN-01/PM1045/KAWADA, 1998-JAN-11/PM0945/WADA, ·····,
    1998-NOV-01/PM1030/KAWAYASU, 1998-NOV-01/PM1130/SUWA, 1998-NOV-01/PM1145/KAWADA,
    1998-NOV-11/PM0230/NODA, 1998-NOV-21/PM0330/SUWA, ····· , 1998-DEC-31/PM0400/SUAKWA }
A={ 1998-NOV-01/PM1030/KAWAYASU, 1998-NOV 01/PM1130/SUWA, 1998-NOV-01/PM1145/KAWADA }
C={ (/PM10,12,17), (30/K,17,21), (O/KAWAY,18,25), (YASU,24,28) }

*STEP 4
(M, s, e)=(/PM10,12,17)
B={ 1998-JAN-01/PM1045/KAWADA, 1998-JAN-29/PM1015/SUKAWA, 1998-JAN-29/PM1045/SUWA, ···,
    1998-NOV-01/PM1030/KAWAYASU, 1998-NOV-06/PM1045/YASUKAWA, 1998-NOV-17/PM1045/SUWA,
    1998-NOV-20/PM1045/SUWA, 1998-NOV-23/PM1045/WADA, ····· , 1998-DEC-21/PM1045/SUDA }
A={ 1998-NOV-01/PM1030/KAWAYASU }
C={ (30/K,17,21), (O/KAWAY,18,25), (YASU,24,28) }

*STEP 5
(M, s, e)=(30/K,17,21)
B={1998-JAN-01/PM1130/KAWADA, 1998-JAN-17/PM0330/KAWADA, 1998-JAN-22/AM0530/KAWAYASU, ···,
    1998-NOV-01/PM1030/KAWAYASU, 1998-NOV-03/AM0930/KAWADA, 1998-NOV-04/PM0630/KAWAYASU,
    ···, 1998-DEC-23/PM0530/KAWADA, 1998-DEC-30/AM1030/KAWAYASU }
A={ 1998-NOV-01/PM1030/KAWAYASU }
C={ (O/KAWAY,18,25), (YASU,24,28) }

*STEP 6
(M, s, e)=(O/KAWAY,18,25)
B={1998-JAN-01/AM0200/KAWAYASU, 1998-JAN 10/AM1100/KAWAYASU, ···,
    1998-NOV-01/PM1030/KAWAYASU, 1998-NOV-03/AM0200/KAWAYASU, ···,
    1998-DEC-17/AM0230/KAWAYASU, 1998-DEC-30/AM1030/KAWAYASU }
A={ 1998-NOV-01/PM1030/KAWAYASU }
C={ (YASU,24,28) }

*STEP 7
(M, s, e)=(YASU,24,28)
B={1998-JAN-01/AM0200/KAWAYASU, 1998-JAN-01/PM1215/KAWAYASU, ···,
    1998-NOV-01/PM1030/KAWAYASU, 1998-NOV-03/AM0200/KAWAYASU,
    1998-NOV-03/AM0415/KAWAYASU, 1998-NOV-04/PM0630/KAWAYASU, ···,
    1998-DEC-30/AM0845/KAWAYASU, 1998-DEC-30/AM1030/KAWAYASU }
A={ 1998-NOV-01/PM1030/KAWAYASU }
C={ }
```

Fig. 35

```
Question
character string = 1998-NOV-01/PM   (Forward coincidence collating)

*STEP 1
C={ (1998-NOV-0,1,11), (1/P,11,14), (M,14,15) }

*STEP 2
C={ (1998-NOV-0,1,11), (1/P,11,14), (M,14,15), (/PM01,12,17), (/PM02,12,17),
    (/PM03,12,17), (/PM04,12,17), (/PM05,12,17), (/PM06,12,17), (/PM07,12,17),
    (/PM08,12,17), (/PM09,12,17), (/PM10,12,17), (/PM11,12,17), (/PM12,12,17) }

*STEP 3
n=14
```
$D=\{ (1998\text{-}NOV\text{-}0,1,11) \}$
$S_c=\{ \}$

*STEP 4
(M, p, q)=(1998-NOV-0,1,11)
A={ 1998-NOV-01/AM0830/NODA, 1998-NOV-01/AM1115/SUDA, 1998-NOV-01/PM1030/KAWAYASU,
    1998-NOV-01/PM1130/SUWA, 1998-NOV-01/PM1145/KAWADA, 1998-NOV-02/AM0300/KAWADA,
    ·················· , 1998/NOV-09/AM0945/SUDA, 1998-NOV-09/PM0515/KAWAYASU }
D={ }

*STEP 5
$D_1=\{ (1/P,11,14) \}$

*STEP 6
(M, t, u)=(1/P,11,14)
$A_1=\{$ 1998-NOV-01/PM1030/KAWAYASU, 1998-NOV-01/PM1130/SUWA, 1998-NOV-01/PM1145/KAWADA $\}$
$D_1=\{ \}$

*STEP 7
$D_{11}=\{$ (M,14,15), (/PM01,12,17), (/PM02,12,17), (/PM03,12,17), (/PM04,12,17),
         (/PM05,12,17), (/PM06,12,17), (/PM07,12,17), (/PM08,12,17), (/PM09,12,17),
         (/PM10,12,17), (/PM11,12,17), (/PM12,12,17) $\}$

*STEP 8
(M, t, u)=(M,14,15)
$A_{11}=\{ \}$
$D_{11}=\{$ (/PM01,12,17), (/PM02,12,17), (/PM03,12,17), (/PM04,12,17), (/PM05,12,17), (/PM06,12,17),
         (/PM07,12,17), (/PM08,12,17), (/PM09,12,17), (/PM10,12,17), (/PM11,12,17), (/PM12,12,17) $\}$

*STEP 9
(M, t, u)=(/PM01,12,17)
$A_{11}=\{ \}$
$D_{11}=\{$ (/PM02,12,17), (/PM03,12,17), (/PM04,12,17), (/PM05,12,17), (/PM06,12,17), (/PM07,12,17),
         (/PM08,12,17), (/PM09,12,17), (/PM10,12,17), (/PM11,12,17), (/PM12,12,17) $\}$

*STEP 10
(M, t, u)=(/PM02,12,17)
$A_{11}=\{ \}$
$D_{11}=\{$ (/PM03,12,17), (/PM04,12,17), (/PM05,12,17), (/PM06,12,17), (/PM07,12,17),
         (/PM08,12,17), (/PM09,12,17), (/PM11,12,17), (/PM12,12,17) $\}$

Fig. 36

```
*STEP 11
(M, t, u)=(/PM03,12,17)
A₁₁={ }
D₁₁={ (/PM04,12,17), (/PM05,12,17), (/PM06,12,17), (/PM07,12,17), (/PM08,12,17),
      (/PM09,12,17), (/PM10,12,17), (/PM11,12,17), (/PM12,12,17) }

*STEP 12
(M, t, u)=(/PM04,12,17)
A₁₁={ }
D₁₁={ (/PM05,12,17), (/PM06,12,17), (/PM07,12,17), (/PM08,12,17), (/PM09,12,17),
      (/PM10,12,17), (/PM11,12,17), (/PM12,12,17) }

*STEP 13
(M, t, u)=(/PM05,12,17)
A₁₁={ }
D₁₁={ (/PM06,12,17), (/PM07,12,17), (/PM08,12,17), (/PM09,12,17), (/PM10,12,17),
      (/PM11,12,17), (/PM12,12,17) }

*STEP 14
(M, t, u)=(/PM06,12,17)
A₁₁={ }
D₁₁={(/PM07,12,17), (/PM08,12,17), (/PM09,12,17), (/PM10,12,17), (/PM11,12,17), (/PM12,12,17) }

*STEP 15
(M, t, u)=(/PM07,12,17)
A₁₁={ }
D₁₁={ (/PM08,12,17), (/PM09,12,17), (/PM10,12,17), (/PM11,12,17), (/PM12,12,17) }

*STEP 16
(M, t, u)=(/PM08,12,17)
A₁₁={ }
D₁₁={ (/PM09,12,17), (/PM10,12,17), (/PM11,12,17), (/PM12,12,17) }

*STEP 17
(M, t, u)=(/PM09,12,17)
A₁₁={ }
D₁₁={ (/PM10,12,17), (/PM11,12,17), (/PM12,12,17) }

*STEP 18
(M, t, u)=(/PM10,12,17)
A₁₁={ 1998-NOV-01/PM1030/KAWAYASU }
D₁₁={(/PM11,12,17), (/PM12,12,17) }
S_c={ } ∩ A₁₁={ 1998-NOV-01/PM1030/KAWAYASU }

*STEP 19
(M, t, u)=(/PM11,12,17)
A₁₁={ 1998-NOV-01/PM1030/KAWAYASU }
D₁₁={(/PM12,12,17) }
S_c={ 1998-NOV-01/PM1030/KAWAYASU, 1998-NOV-01/PM1130/SUWA, 1998-NOV-01/PM1145/KAWADA }

*STEP 20
(M, t, u)=(/PM12,12,17)
A₁₁={ }
D₁₁={ }
```

Fig. 37

```
Question
character string = KAWA    (Backward coincidence collating)

*STEP 1
C={ (KAWA,1,5) }

*STEP 2
C={ (KAWA,1,5), (/SUKAWA,-2,5), (SUKAWA,-1,5) }

*STEP 3
n=5
D={ (KAWA,1,5), (/SUKAWA,-2,5), (SUKAWA,-1,5) }
S_C={ }

*STEP 4
(M, p, q)=(KAWA,1,5)
A={ 1998-JAN-17/PM0930/NOKAWA, 1998-JAN-18/PM0300/NOKAWA, 1998-JAN-19/AM1200/NOKAWA,
    1998-JAN-20/AM0930/NOKAWA, ·················, 1998-DEC-26/AM0145/NOKAWA,
    1998-DEC-27/PM0415/NOKAWA, 1998-DEC-28/PM0730/NOKAWA, 1998-DEC-31/AM1200/NOKAWA }
D={ (/SUKAWA,-2,5), (SUKAWA,-1,5) }
S_C={ 1998-JAN-17/PM0930/NOKAWA, 1998-JAN-18/PM0300/NOKAWA, 1998-JAN-19/AM1200/NOKAWA,
      1998-JAN-20/AM0930/NOKAWA, ·················, 1998-DEC-26/AM0145/NOKAWA,
      1998-DEC-27/PM0415/NOKAWA, 1998-DEC-28/PM0730/NOKAWA, 1998-DEC-31/AM1200/NOKAWA }

*STEP 5
(M, p, q)=(/SUKAWA,-2,5)
A={ 1998-JAN-04/AM0615/SUKAWA, 1998-JAN-05/AM0100/SUKAWA, 1998-JAN-13/AM0345/SUKAWA,
    1998-JAN-13/PM0930/SUKAWA, ·················, 1998-DEC-21/PM0530/SUKAWA,
    1998-DEC-27/AM1200/SUKAWA, 1998-DEC-30/AM1100/SUKAWA, 1998-DEC-31/PM0400/SUKAWA }
D={ (SUKAWA,-1,5) }
S_C={ 1998-JAN-17/PM0930/NOKAWA, 1998-JAN-18/PM0300/NOKAWA, 1998-JAN-19/AM1200/NOKAWA,
      1998-JAN-20/AM0930/NOKAWA, ·················, 1998-DEC-26/AM0145/NOKAWA,
      1998-DEC-27/PM0415/NOKAWA, 1998-DEC-28/PM0730/NOKAWA, 1998-DEC-31/AM1200/NOKAWA,
      1998-JAN-04/AM0615/SUKAWA, 1998-JAN-05/AM0100/SUKAWA, 1998-JAN-13/AM0345/SUKAWA,
      1998-JAN-13/PM0930/SUKAWA, ·················, 1998-DEC-21/PM0530/SUKAWA,
      1998-DEC-27/AM1200/SUKAWA, 1998-DEC-30/AM1100/SUKAWA, 1998-DEC-31/PM0400/SUKAWA }

*STEP 6
(M, p, q)=(SUKAWA,-1,5)
D={ }
A={ 1998-JAN-05/AM0100/YASUKAWA, 1998-JAN-14/0645/YASUKAWA, 1998-JAN-18/AM0130/YASUKAWA,
    ·················, 1998-DEC-27/PM0900/YASUKAWA, 1998-DEC-29/PM1130/YASUKAWA }
S_C={ 1998-JAN-17/PM0930/NOKAWA, 1998-JAN-18/PM0300/NOKAWA, 1998-JAN-19/AM1200/NOKAWA,
      1998-JAN-20/AM0930/NOKAWA, ·················, 1998-DEC-26/AM0145/NOKAWA,
      1998-DEC-27/PM0415/NOKAWA, 1998-DEC-28/PM0730/NOKAWA, 1998-DEC-31/AM1200/NOKAWA,
      1998-JAN-04/AM0615/SUKAWA, 1998-JAN-05/AM0100/SUKAWA, 1998-JAN-13/AM0345/SUKAWA,
      1998-JAN-13/PM0930/SUKAWA, ·················, 1998-DEC-21/PM0530/SUKAWA,
      1998-DEC-27/AM1200/SUKAWA, 1998-DEC-30/AM1100/SUKAWA, 1998-DEC-31/PM0400/SUKAWA,
      1998-JAN-05/AM0100/YASUKAWA, 1998-JAN-14/0645/YASUKAWA, 1998-JAN-18/AM0130/YASUKAWA,
      ·················, 1998-DEC-27/PM0900/YASUKAWA, 1998-DEC-29/PM1130/YASUKAWA }
```

Fig. 38

```
Question
character string = KAWADA    (Intermediate coincidence collating)

*STEP 1
C={ (KAWA,1,5), (WADA,3,7) }

*STEP 2
C={ (KAWA,1,5), (WADA,3,7) }

*STEP 3
C={ (KAWA,1,5), (WADA,3,7), (/SUKAWA,-2,5), (0/KAWAD,-1,6), (5/KAWAD,-1,6), (SUKAWA,-1,5) }

*STEP 4
C={ (KAWA,1,5), (WADA,3,7), (/SUKAWA,-2,5), (0/KAWAD,-1,6), (5/KAWAD,-1,6), (SUKAWA,-1,5) }

*STEP 5
n=6
D={ (KAWA,1,5), (/SUKAWA,-2,5), (0/KAWAD,-1,6), (5/KAWAD,-1,6), (SUKAWA,-1,5) }
S_c={ }

*STEP 6
(M,p,q)=(KAWA,1,5)
A={ (1998-JAN-17/PM0930/NOKAWA,21), (1998-JAN-18/PM0300/NOKAWA,21),
    (1998-JAN-19/AM1200/NOKAWA,21), (1998-JAN-20/AM0930/NOKAWA,21),............,
    (1998-DEC-26/AM0145/NOKAWA,21), (1998-DEC-27/PM0415/NOKAWA,21),
    (1998-DEC-28/PM0730/NOKAWA,21), (1998-DEC-31/AM1200/NOKAWA,21) }
D={ (/SUKAWA,-1,5), (0/KAWAD,-1,6), (5/KAWAD,-1,6), (SUKAWA,-1,5) }

*STEP 7
D_1={ (WADA,3,7) }

*STEP 8
(M,t,u)=(WADA,3,7)
B={ (1998-JAN-01/AM0815/WADA,17), (1998-JAN-01/PM1045/KAWADA,19),
    (1998-JAN-01/PM1130/KAWADA,19), (1998-JAN-03/AM0615/WADA,17), ........
    (1998-DEC-23/PM0530/KAWADA,19), (1998-DEC-27/AM0100/WADA,17),
    (1998-DEC-27/AM1100/KAWADA,19), (1998-DEC-29/AM0315/KAWADA,19) }
A_1={ }
D_1={ }

*STEP 9
(M,p,q)=(/SUKAWA,-2,5)
A={ (1998-JAN-04/AM0615/SUKAWA,21), (1998-JAN-05/AM0100/SUKAWA,21),............,
    (1998-DEC-30/AM1100/SUKAWA,21), (1998-DEC-31/PM0400/SUKAWA,21) }
D={ (0/KAWAD,-1,6), (5/KAWAD,-1,6), (SUKAWA,-1,5) }

*STEP 10
D_1={ (WADA,3,7) }

*STEP 11
(M,t,u)=(WADA,3,7)
B={ (1998-JAN-01/AM0815/WADA,17), ...... , (1998-DEC-29/AM0315/KAWADA,19) }
A_1={ }
D_1={ }
```

Fig. 39

```
*STEP 12
(M, p, q) = (0/KAWAD, -1, 6)
A = { (1998-JAN-01/PM1130/KAWADA, 19), (1998-JAN-17/PM0330/KAWADA, 19), ········
      (1998-DEC-23/PM0530/KAWADA, 19), (1998-DEC-27/AM1100/KAWADA, 19) }
D = { (5/KAWAD, -1, 6), (SUKAWA, -1, 5) }

*STEP 13
D₁ = { (WADA, 3, 7) }

*STEP 14
(M, t, u) = (WADA, 3, 7)
B = { (1998-JAN-01/AM0815/WADA, 17), ······ , (1998-DEC-29/AM0315/KAWADA, 19) }
A₁ = { (1998-JAN-01/PM1130/KAWADA, 19), (1998-JAN-17/PM0330/KAWADA, 19), ········
       (1998-DEC-23/PM0530/KAWADA, 19), (1998-DEC-27/AM1100/KAWADA, 19) }
D₁ = { }
S_C = { (1998-JAN-01/PM1130/KAWADA, 19), (1998-JAN-17/PM0330/KAWADA, 19), ········
        (1998-DEC-23/PM0530/KAWADA, 19), (1998-DEC-27/AM1100/KAWADA, 19) }

*STEP 15
(M, p, q) = (5/KAWAD, -1, 6)
A = { (1998-JAN-01/PM1045/KAWADA, 19), (1998-JAN-21/AM0915/KAWADA, 19), ········
      (1998-DEC-22/PM0945/KAWADA, 19), (1998-DEC-29/AM0315/KAWADA, 19) }
D = { (SUKAWA, -1, 5) }

*STEP 16
D₁ = { (WADA, 3, 7) }

*STEP 17
(M, t, u) = (WADA, 3, 7)
B = { (1998-JAN-01/AM0815/WADA, 17), ······ , (1998-DEC-29/AM0315/KAWADA, 19) }
A₁ = { (1998-JAN-01/PM1045/KAWADA, 19), (1998-JAN-21/AM0915/KAWADA, 19), ········
       (1998-DEC-22/PM0945/KAWADA, 19), (1998-DEC-29/AM0315/KAWADA, 19) }
D₁ = { }
S_C = { (1998-JAN-01/PM1130/KAWADA, 19), (1998-JAN-17/PM0330/KAWADA, 19), ········
        (1998-DEC-23/PM0530/KAWADA, 19), (1998-DEC-27/AM1100/KAWADA, 19),
        (1998-JAN-01/PM1045/KAWADA, 19), (1998-JAN-21/AM0915/KAWADA, 19), ········
        (1998-DEC-22/PM0945/KAWADA, 19), (1998-DEC-29/AM0315/KAWADA, 19) }

*STEP 18
(M, p, q) = (SUKAWA, -1, 5)
A = { (1998-JAN-04/AM0615/SUKAWA, 21), (1998-JAN-05/AM0100/SUKAWA, 21), ···············,
      (1998-DEC-30/AM1100/SUKAWA, 21), (1998-DEC-31/PM0400/SUKAWA, 21) }
D = { }

*STEP 19
D₁ = { (WADA, 3, 7) }

*STEP 20
(M, t, u) = (WADA, 3, 7)
B = { (1998-JAN-01/AM0815/WADA, 17), ······ , (1998-DEC-29/AM0315/KAWADA, 19) }
A₁ = { }
D₁ = { }
```

SYMBOL DICTIONARY COMPILING METHOD AND SYMBOL DICTIONARY RETRIEVING METHOD

FIELD OF THE INVENTION

The present invention relates to compilation and retrieval of a symbol dictionary for use in a database device or a document retrieval device for controlling and retrieving accumulated electronic symbol information by using a computer.

BACKGROUND OF THE INVENTION

With the wide spread use of word processors and personal computers, development of large capacity and low price memory media such as CD-ROM, and advancement of Ethernet networking, database systems such as relational databases and full text retrieval databases have come to be widely used.

Databases handle a relatively short character string of several characters to hundreds of characters, such as a person's name, place name, organization name, address, classification code or part code as a symbol, storing a CSV list of symbols (a string of symbols connected by the comma "," such as "MorishitaElectricIndustries, MorishitaCommunicationsIndustries, KyushuMorishitaElectric" as a field of trading partner company names) in one item (field) of the database and search for records which contain a complete match, a prefix match, a postfix match or an infix match to the query symbols and retrieve the record at high speed (retrieving the condition, for example, in the case of prefix matching, "retrieve the record containing a symbol starting with "Morishita" in the trading partner company names field").

Of these four methods of matching an efficient retrieval method for complete matching and prefix matching is realized by using the data structure called TRIE (also known as radix searching tree) as mentioned in publications such as "Algorithm Vol. 2 (R. Seziwick, tr. by Kohei Noshita, et al., Kindai Kagakusha, 1992, ISBN 4-7649-0189-7, pp. 52–72) and "Algorithm and Data Structure Handbook (G. H. Gonnet, tr. Mitsuo Gen, et al., Keigaku Shuppan, 1987, ISBN 4-7665-0326-0, pp. 111–122). In addition, where postfix matching is needed, a TRIE may be constructed for data reversed in the symbol character sequence, and it may be retrieved.

If infix matching is desired, efficient retrieval processing is difficult by TRIE, and conventionally, for example, a method as disclosed Japanese Laid-open Patent No. Hei 3-42774 has been employed.

In the method disclosed in Japanese Laid-open Patent No. Hei 3-42774, when compiling a symbol dictionary, a symbol character string is divided character by character and dictionary information recording a pair of symbol number and appearance character position of corresponding character in symbol is created for every character, or when retrieving a symbol dictionary, a query character string is decomposed by character, dictionary information corresponding to each character is retrieved, and a set of symbol numbers identical in symbol numbers and consecutive in appearance character positions is issued a as retrieval result.

In this conventional compiling method of a symbol dictionary, however, when the types of symbols are more than tens of thousands, the symbol dictionary file to be compiled is more than twice as large as the symbol data to be retrieved, and it is difficult to utilize if the usable capacity of the memory device is limited.

Or in the conventional retrieving method of a symbol dictionary, if we retrieve a symbol which is long and contains many high-frequency characters, the quantity of intermediate data to be read out from the symbol dictionary is tremendous, and the retrieval speed is reduced due to such read operation and consecutive checking.

The disadvantage of a conventional retrieving method of a symbol dictionary may be somewhat alleviated by recording the symbol dictionary in every consecutive N characters or "N-gram" of plural characters, instead of the unit of creating and recording dictionary information for every characters, but in the case of retrieving a symbol such as "199800000123A" initialed by the year and followed by multiple digits of integers mostly composed of consecutive zeros, there are many symbols incidentally coinciding in the beginning 10 characters or more, and if N is about 2 to 4 in N-gram, the amount of data to be read out from the symbol dictionary is still large and the retrieval speed is reduced.

Further, by increasing the number N in the character chain, the types of appearing N character chains increase abruptly and it is hard to compile a symbol dictionary and the capacity of the compiled symbol dictionary increases due to the housekeeping information. In the conventional retrieval method of a symbol dictionary, when we retrieve a symbol which is long and contains many high-frequency characters, complete matching takes the longest processing time among the four matching modes, and in the application where complete matching occupies the majority of queries, the average retrieval speed is reduced.

Thus, in the conventional compiling method of a symbol dictionary, the symbol dictionary file to be compiled is more than twice as large as the symbol data to be retrieved, and it is difficult to utilize if the usable capacity of the memory device is limited.

Moreover, in the conventional retrieval method of a symbol dictionary, if we retrieve a symbol which is long and contains many high-frequency characters, the amount of data to be read out from the symbol dictionary is tremendous, and the retrieval speed is reduced.

If the number of character chains. N is increased, the types of appearing N character chains increase abruptly and it is hard to compile a symbol dictionary with small housekeeping information, and the capacity of the compiled symbol dictionary increases.

In a compiling method of a symbol dictionary of the invention, a meta-symbol dictionary gathering shorter symbols called "meta-symbols" for covering symbols in symbol data is compiled automatically, each symbol in the symbol data is covered with the meta-symbol in this meta-symbol dictionary, the information how each symbol is covered can be retrieved at high speed including up to infix matching by compiling the meta-symbol appearance information recorded in every meta-symbol, and the size of the compiled symbol dictionary can be reduced; and in a retrieving method of a symbol dictionary of the invention, a query string is covered with meta-symbols by retrieving the meta-symbol dictionary contained in the compiled symbol dictionary file, retrieval results of both right and left extension meta-symbols of the original covering meta-symbols are added to this covering result and high speed retrieval is possible for all matching modes including infix matching by seeking the symbol number set commonly contained in every element set in the query string or covering results covering the right and left extension character strings, and moreover in the application where complete matching occupies the majority of queries, symbol retrieval is possible without decreasing the average retrieval speed.

SUMMARY OF THE INVENTION

A compiling method of a symbol dictionary according to a first aspect of the invention comprises a symbol covering means for retrieving each symbol in symbol data by searching a meta-symbol dictionary and finding the covering result by extraction method such as maximal word extraction method, meta-symbol accumulating means for a accumulating covering results, a meta-symbol frequency table for accumulating the total appearance frequency of each meta-symbol in the symbol data, meta-symbol dictionary update judging means for adding or deleting of meta-symbols in the meta-symbol dictionary, and for deciding to stop the meta-symbol accumulation, by referring to the meta-symbol frequency table and conforming to the predetermined condition/parameters, meta-symbol appearance information compiling means for calculating the meta-symbol appearance information recording the number of the symbol containing each meta-symbol and the appearance character position from the recovering results, and symbol dictionary compiling means for compiling a machine-retrievable symbol dictionary from the meta-symbol dictionary and meta-symbol appearance information, if we retrieve a symbol which is long and contains many high-frequency characters, high speed retrieval is possible up to infix matching, and the size of compiled symbol dictionary can be reduced.

A retrieval method of a symbol dictionary for complete matching according to a second aspect of the invention comprises a query string covering means for retrieving a meta-symbol dictionary in a symbol dictionary, and finding the covering result from the query string by the duplicate longest match word extraction method, meta-symbol appearance information retrieval means for retrieving meta-symbol appearance information in the symbol dictionary, and finding a set of symbol numbers containing the desired meta-symbol at the corresponding position from each element in the covering result obtained at a first step, and a symbol number assessing means for finding a common portion of corresponding symbol number sets in all elements in the covering result, and, if the found common portion is not empty, issuing the symbol number of the element as retrieval result and terminating the retrieval process, or if the set is empty, terminating the retrieval processing assuming there is no retrieval result, in which if the character string is long and when retrieving a symbol containing characters or character chain of high frequency, high speed symbol dictionary retrieval is possible by complete matching.

A retrieving method of a symbol dictionary of prefix matching according to a third aspect of the invention comprises question character string covering means for retrieving a meta-symbol dictionary in a symbol dictionary and finding the covering from the question character string Q in the retrieval condition by the longest matchoverlapped longest match word extraction method, and, if there is no covering, terminating the retrieval processing assuming there is no retrieval result, or, if there is covering, recording the covering result, right extended meta-symbol assessing means for retrieving meta-symbol information in the symbol dictionary, retrieving, in the covering result, all meta-symbols x of right extended meta-symbols (that is, meta-symbols containing character string R in the beginning portion) of j-th rightmost portion character string of the question character string (that is, the partial character string from the j-th character ($1 \leq j \leq |Q|$) to the final character in the question character string) R, out of extended meta-symbols of meta-symbol Z of covering elements of which collating start character position is 1 (that is, meta-symbols containing Z), and adding elements (x, j, $|R|+j$) to the covering result and recording, and symbol number set assessing means for retrieving meta-symbol appearance information in the symbol dictionary while systematically compiling a set C of elements in the covering result covering the question character string or an arbitrary right extended character string, collecting a symbol number set SC commonly contained in all elements of C, recording as part of retrieval result, and issuing the sum set of all SCs as final retrieval result, in which if the character string is long and when retrieving a symbol containing characters or character chain of high frequency, high speed symbol dictionary retrieval is possible by prefix matching.

A retrieving method of a symbol dictionary of postfix matching according to a fourth aspect of the invention comprises question character string covering means for retrieving a meta-symbol dictionary in a symbol dictionary, and finding the covering from the question character string Q in the retrieval condition by the longest matchoverlapped longest match word extraction method, and, if there is no covering, terminating the retrieval processing assuming there is no retrieval result, or, if there is covering, recording the covering result, left extended meta-symbol assessing means for retrieving meta-symbol information in the symbol dictionary, retrieving, in the covering result, all meta-symbols x of left extended meta-symbols (that is, meta-symbols containing character string L in the end portion) of j-th leftmost portion character string of the question character string (that is, the partial character string from the first character to the j-th character ($1 \leq j \leq |Q|$) in the question character string) L, out of extended meta-symbols of meta-symbol Z of covering elements of which collating end character position is $|Q|+1$ (that is, meta-symbols containing Z), and adding elements (x, $j+1-|L|$, $j+1$) to the covering result and recording, and symbol number set assessing means for retrieving meta-symbol appearance information in the symbol dictionary while systematically compiling a set C of elements in the covering result covering the question character string or an arbitrary left extended character string, collecting a symbol number set SC commonly contained in all elements of C, recording as part of retrieval result, and issuing the sum set of all SCs as final retrieval result, in which if the character string is long and when retrieving a symbol containing characters or character chain of high frequency, high speed symbol dictionary retrieval is possible by postfix matching.

A retrieving method of a symbol dictionary of infix matching according to a fifth aspect of the invention comprises question character string covering means for retrieving a meta-symbol dictionary in a symbol dictionary, and finding the covering from the question character string Q in the retrieval condition by the longest matchoverlapped longest match word extraction method, and, if there is no covering, terminating the retrieval processing assuming there is no retrieval result, or, if there is covering, recording the covering result, right extended meta-symbol assessing means for retrieving meta-symbol information in the symbol dictionary, retrieving, in the covering result, all meta-symbols x of right extended meta-symbols (that is, meta-symbols containing character string R in the beginning portion) of j-th rightmost portion character string of the question character string (that is, the partial character string from the j-th character ($1 \leq j \leq |Q|$) to the final character in the question character string) R, out of extended meta-symbols of meta-symbol Z of covering elements of which collating start character position is 1 (that is, meta-symbols containing Z), and adding elements (x, j, |R|+j) to the covering result and recording, left extended meta-symbol assessing means for retrieving meta-symbol information in the symbol dictionary, retrieving, in the covering result, all meta-symbols x of left extended meta-symbols (that is, meta-symbols containing character string L in the end portion) of j-th leftmost portion character string of the question character string (that is, the partial character string from the first character to the j-th character ($1 \leq j \leq |Q|$) in the question character string) L, out of extended meta-symbols of meta-symbol Z of covering elements of which collating end character position is |Q|+1 (that is, meta-symbols containing Z), and adding elements (x, j+1−|L|, j+1) to the covering result and recording, both extended meta-symbol assessing means for retrieving the meta-symbol dictionary, retrieving all of both extended meta-symbols x of Q, adding elements (x, 1−j, 1−j+|x|) to the covering result and recording, and symbol number set assessing means for retrieving meta-symbol onset information in the symbol dictionary while systematically compiling a set C of elements in the covering result covering the question character string or an arbitrary extended character string, collecting a symbol number set SC commonly contained in all elements of C, recording as part of retrieval result, and issuing the sum set of all SCs as final retrieval result, in which if the character string is long and when retrieving a symbol containing characters or character chain of high frequency, high speed symbol dictionary retrieval is possible by infix matching.

BRIEF DESCRIPTION OF THE DRAWINGS

FIG. 11 is a flowchart describing the procedure of symbol number set assessing process by symbol number set assessing means in the fourth embodiment.

FIG. 12 is a flowchart describing the procedure of symbol number set assessing process by symbol number set assessing means in the fourth embodiment.

FIG. 15 is an example of symbol data in the first embodiment.

FIG. 17 is an example of content of meta-symbol frequency table in the first embodiment.

FIG. 18 is an example of content of meta-symbol frequency table in the first embodiment.

FIG. 19 is an example of meta-symbol dictionary in the first embodiment.

FIG. 20 is an example of part of meta-symbol dictionary in the first embodiment.

FIG. 21 is an example of content of meta-symbol frequency table in the first embodiment.

FIG. 22 is an example of content of meta-symbol frequency table in the first embodiment.

FIG. 23 is an example of content of meta-symbol frequency table in the first embodiment.

FIG. 24 is an example of content of meta-symbol frequency table in the first embodiment.

FIG. 25 is an example of content of meta-symbol frequency table in the first embodiment.

FIG. 26 is an example of content of meta-symbol frequency table in the first embodiment.

FIG. 27 is an example of content of meta-symbol frequency table in the first embodiment.

FIG. 28 is an example of content of meta-symbol frequency table in the first embodiment.

FIG. 29 is an example of content of meta-symbol onset information in the first embodiment.

FIG. 33 is an example of content of extended information of meta-symbol in the first embodiment.

FIG. 34 is a conceptual diagram describing principal intermediate data in a process of symbol dictionary retrieval in the second embodiment.

FIG. 35 is a conceptual diagram describing principal intermediate data in a process of symbol dictionary retrieval in the third embodiment.

FIG. 36 is a conceptual diagram describing principal intermediate data in a process of symbol dictionary retrieval in the third embodiment.

FIG. 37 is a conceptual diagram describing principal intermediate data in a process of symbol dictionary retrieval in the fourth embodiment.

FIG. 38 is a conceptual diagram describing principal intermediate data in a process of symbol dictionary retrieval in the fifth embodiment.

FIG. 39 is a conceptual diagram describing principal intermediate data in a process of symbol dictionary retrieval in the fifth embodiment.

REFERENCE NUMERALS

Figure 1:
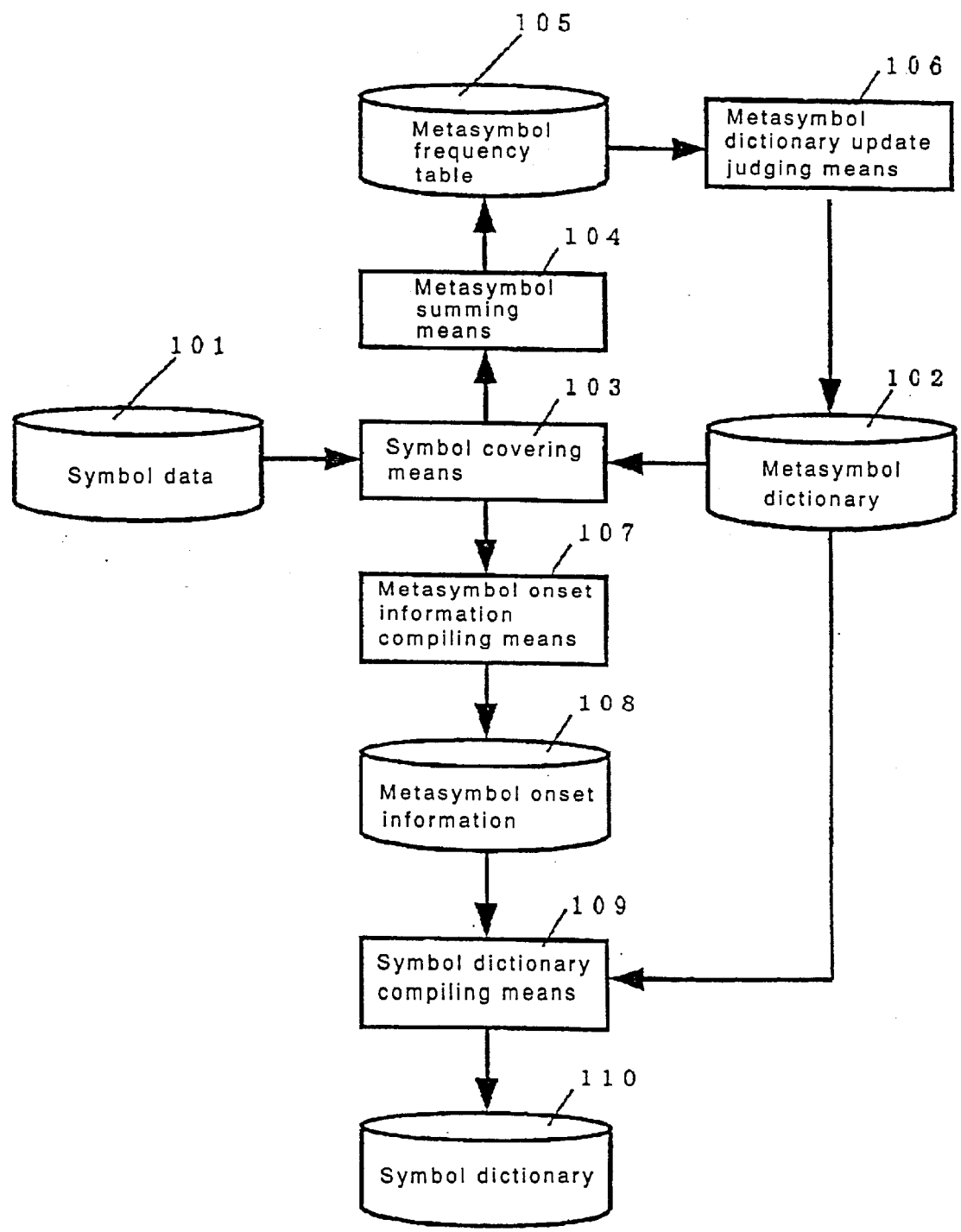
FIG. 1 is a block diagram showing a general constitution of a symbol dictionary compiling apparatus in a first embodiment of the invention.

101 Symbol data
102 Meta-symbol dictionary
103 Symbol covering means
104 Meta-symbol summing means
105 Meta-symbol frequency table
106 Meta-symbol dictionary update judging means
107 Meta-symbol appearance information compiling means
108 Meta-symbol appearance information
109 Symbol dictionary compiling means
110 Symbol dictionary
201 Symbol dictionary
202 Retrieval condition input means
203 Question character string covering means
204 Covering result
205 Symbol number assessing means
206 Retrieval result output means
301 Symbol dictionary
302 Retrieval condition input means
303 Question character string covering means
304 Covering result
305 Symbol number set assessing means
306 Retrieval result output means
307 Right extended meta-symbol assessing means
401 Symbol dictionary
402 Retrieval condition input means
403 Question character string covering means
404 Covering result
405 Symbol number set assessing means
406 Retrieval result output means
408 Left extended meta-symbol assessing means
501 Symbol dictionary
502 Retrieval condition input means
503 Question character string covering means
504 Covering result
505 Symbol number set assessing means
506 Retrieval result output means
507 Right extended meta-symbol assessing means
508 Left extended meta-symbol assessing means
509 Both extended meta-symbol assessing means

DESCRIPTION OF THE PREFERRED EMBODIMENTS

An exemplary embodiment of the present invention relates to a compiling of a symbol dictionary, being a method of compiling a machine-retrievable symbol dictionary for symbol data, registering a finite number of symbols mutually different out of an array of not more than N (a specific number of) characters contained in a certain determined character set, comprising a first step of symbol dictionary compilation in which symbol covering means retrieves each symbol in the symbol data in a prepared meta-symbol dictionary in initial state, and searches covering (that is, relating to a pair of a meta-symbol for collating with a partial character string in the symbols to be covered and collating start character position, a set containing any character in the symbols to be covered in at least one of pair of meta-symbols), meta-symbol summing means sums up covering results, total appearance frequency of each meta-symbol in the symbol data is accumulated in a meta-symbol frequency table, meta-symbol dictionary update judging means refers to the meta-symbol frequency table, and after deleting the meta-symbol from the meta-symbol dictionary according to a predetermined standard, adds the meta-symbol to the meta-symbol dictionary according to a predetermined standard, a second step of symbol dictionary compilation in which the symbol covering means retrieves each symbol in the symbol data in the meta-symbol dictionary at the present to search the covering, the meta-symbol summing means sums up the covering results, the total appearance frequency in the symbol data in each meta-symbol is accumulated in the meta-symbol frequency table, the meta-symbol dictionary update judging means refers to the meta-symbol frequency table, adds the meta-symbol to the meta-symbol dictionary according to a predetermined standard, judges if the predetermined stopping condition is satisfied or not, and repeats the second step until satisfying the stopping condition, a third step of symbol dictionary compilation in which the meta-symbol dictionary update judging means refers to the meta-symbol frequency table, and deletes the meta-symbol from the meta-symbol dictionary according to a predetermined standard, a fourth step of symbol dictionary compilation in which the symbol covering means covers the symbol data by using the meta-symbol dictionary calculated at the third step, and the meta-symbol appearance information compiling means calculates the meta-symbol appearance information recording the symbol number for showing each meta-symbol and the appearance character position from the covering result, and a fifth step of symbol dictionary compilation in which the symbol dictionary compiling means compiles a machine-retrievable symbol dictionary storing meta-symbol information and meta-symbol appearance information from the meta-symbol dictionary and meta-symbol appearance information, and therefore if the character string is long and when retrieving a symbol containing characters or character chain of high frequency, high speed symbol dictionary. retrieval is possible including up to infix matching, and a symbol dictionary of small capacity can be compiled.

The invention further relates to the compiling method of symbol dictionary in which covering of symbol is determined by maximal word extraction method in the symbol covering means.

The invention further relates to the compiling method of symbol dictionary in which a symbol composed of one character only, about each character in a predetermined character set, and zero or more character string known as part of the symbol in the symbol data are registered in the prepared meta-symbol dictionary in initial state.

The invention further relates to the compiling method of symbol dictionary in which the deletion of a meta-symbol in the first step is done on the basis of deleting the meta-symbol of which frequency in the meta-symbol frequency table is 0, and the addition of a meta-symbol in the first step is done on the basis of adding the meta-symbol by adding one arbitrary character in the meta-symbol dictionary at the end, as for a meta-symbol less than N characters in the meta-symbol frequency table of which frequency is frequency C1 or more determined by the symbol data content.

The invention further relates to the compiling method of symbol dictionary in which the addition of a meta-symbol in the second step is done on the basis of adding the meta-symbol by adding one arbitrary character in the predetermined character set at the end, as for a meta-symbol less than N characters in the meta-symbol frequency table of which frequency is frequency Ck or more determined by the symbol data content and the number of times of repetition of the second step, and the deletion of a meta-symbol in the third step is done on the basis of deleting a meta-symbol of which frequency in the meta-symbol frequency table is less than E and two characters or more.

The invention further relates to the compiling method of a symbol dictionary in which the stopping condition in the second step is the condition of stopping when there is no addition or deletion of a meta-symbol in the meta-symbol dictionary update judging means.

The invention further relates to the compiling method of symbol dictionary, in which the sequence number of the corresponding symbol in the symbol data is used as the symbol number in the third step.

The invention further relates to a retrieving method of a symbol dictionary, being a method of retrieving complete coincidence (that is, retrieving a same symbol as question character string) of an arbitrary character string using a symbol dictionary storing meta-symbol information and meta-symbol appearance information, comprising a first step of symbol dictionary retrieval in which question character string covering means retrieves meta-symbol information in the symbol dictionary, and searches covering in the question character string Q of retrieval condition by longest matchoverlapped longest match word extraction method (that is, covering elements of pair (m, s, e) of meta-symbol m collating with partial character string, collating character start position s, and collating end character position e ($1 \leq s < e \leq |Q|+1$) in the character string to be covered, and a set containing any character of Q in at least one covering element), if there is no covering (that is, covering elements of pair (m, s, e) of meta-symbol m collating with partial character string, collating character start position s, and collating end character position e ($1 \leq s < e \leq |Q|+1$) in the character string to be covered, and there is no set containing any character of Q in at least one covering element), the retrieval process is terminated as being no retrieval result, and if there is covering, the covering result is stored in the working range, and a second step of symbol dictionary retrieval in which symbol number set assessing means retrieves the meta-symbol onset information in the symbol dictionary, and if there is (only one) symbol number contained commonly in all elements in the covering result, it is issued as the retrieval result and the retrieval process is terminated, and if there is no symbol number contained commonly in all elements in the covering result, the retrieval process is terminated as being no retrieval result, and therefore if the character string is long and when retrieving a symbol containing characters of high frequency or character chain, high speed symbol dictionary retrieval is possible by complete matching.

The invention further relates to a retrieving method of a symbol dictionary, being a method of retrieving forward coincidence (that is, retrieving all symbols having a question character string in the beginning portion) by an arbitrary character string using a symbol dictionary storing meta-symbol information and meta-symbol appearance information, comprising a first step of symbol dictionary retrieval in which a question character string covering means retrieves meta-symbol information in the symbol dictionary, and searches covering in the question character string Q of retrieval condition by longest matchoverlapped longest match word extraction method (that is, covering elements of pair (m, s, e) of meta-symbol m collating with partial character string, collating character start position s, and collating end character position e ($1 \leq s < e < |Q|+1$) in the character string to be covered, and a set containing any character of Q in at least one covering element), if there is no covering (that is, covering elements of pair (m, s, e) of meta-symbol m collating with partial character string, collating character start position s, and collating end character position e ($1 \leq s < e \leq |Q|+1$) in the character string to be covered, and there is no set containing any character of Q in at least one covering element), the retrieval process is terminated as being no retrieval result, and if there is covering, the covering result is recorded, a second step of symbol dictionary retrieval in which right extended meta-symbol assessing means retrieves meta-symbol information in the symbol dictionary, retrieves, in the covering result, all meta-symbols x of right extended meta-symbols (that is, meta-symbols containing character string R in the beginning portion) of j-th rightmost portion character string of the question character string (that is, the partial character string from the j-th character ($1 \leq j \leq |Q|$) to the final character in the question character string) R, out of extended meta-symbols of meta-symbol Z of covering elements of which collating start character position is 1 (that is, meta-symbols containing Z), and adds elements (x, j, $|R|+j$) to the covering result and records, and a third step of symbol dictionary retrieval in which symbol number set assessing means retrieves meta-symbol appearance information in the symbol dictionary while systematically compiling a set C of elements in the covering result covering the question character string or an arbitrary right extended character string, collects a symbol number set SC commonly contained in all elements of C, records as part of retrieval result, and issues the sum set of all SCs as final retrieval result, and therefore if the character string is long and when retrieving a symbol containing characters or character chain of high frequency, high speed symbol dictionary retrieval is possible by prefix matching.

The invention further relates to a retrieving method of a symbol dictionary, being a method of retrieving backward coincidence (that is, retrieving all symbols having a question character string in the end portion) by an arbitrary character string using a symbol dictionary storing meta-symbol information and meta-symbol appearance information, comprising a first step of symbol dictionary retrieval in which question character string covering means retrieves meta-symbol information in the symbol dictionary, and searches covering in the question character string Q of retrieval condition by longest matchoverlapped longest match word extraction method (that is, covering elements of pair (m, s, e) of meta-symbol m collating with partial character string, collating character start position s, and collating end character position e ($1 \leq s < e \leq |Q|+1$) in the character string to be covered, and a set containing any character of Q in at least one covering element), if there is no covering (that is, covering elements of pair (m, s, e) of meta-symbol m collating with partial character string, collating character start position s, and collating end character position e ($1 \leq s < e \leq |Q|+1$) in the character string to be covered, and there is no set containing any character of Q in at least one covering element), the retrieval process is terminated as being no retrieval result, and if there is covering, the covering result is recorded, a second step of symbol dictionary retrieval in which left extended meta-symbol assessing means retrieves meta-symbol information in the symbol dictionary, retrieves, in the covering result, all meta-symbols x of left extended meta-symbols (that is, meta-symbols containing character string L in the end portion) of j-th leftmost portion character string of the question character string (that is, the partial character string from the first character to the j-th character ($1 \leq j \leq |Q|$) in the question character string) L, out of extended meta-symbols of meta-symbol Z of covering elements of which collating end character position is $|Q|+1$ (that is, meta-symbols containing Z), and adds elements (x, $j+1-|L|$, $j+1$) to the covering result and records, and a third step of symbol dictionary retrieval in which symbol number set assessing means retrieves meta-symbol appearance information in the symbol dictionary while systematically compiling a set C of elements in the covering result covering the question character string or an arbitrary left extended character string, collects a symbol number set SC commonly contained in all elements of C, records as part of retrieval result, and issues the sum set of all SCs as final retrieval result, and therefore if the character string is long and when retrieving a symbol containing characters or character chain of high frequency, high speed symbol dictionary retrieval is possible by postfix matching.

The invention further relates to a retrieving method of a symbol dictionary, being a method of retrieving intermediate coincidence (that is, retrieving all symbols having a question character string) by an arbitrary character string using a symbol dictionary storing meta-symbol information and meta-symbol appearance information, comprising a first step of symbol dictionary retrieval in which question character string covering means retrieves meta-symbol information in the symbol dictionary, and searches covering in the question character string Q of retrieval condition by longest matchoverlapped longest match word extraction method (that is, covering elements of pair (m, s, e) of meta-symbol m collating with partial character string, collating character start position s, and collating end character position e ($1 \leq s < e \leq |Q|+1$) in the character string to be covered, and a set containing any character of Q in at least one covering element), if there is no covering (that is, covering elements of pair (m, s, e) of meta-symbol m collating with partial character string, collating character start position s, and collating end character position e ($1 \leq s < e \leq |Q|+1$) in the character string to be covered, and there is no set containing any character of Q in at least one covering element), the retrieval process is terminated as being no retrieval result, and if there is covering, the covering result is recorded, a second step of symbol dictionary retrieval in which right extended meta-symbol assessing means retrieves meta-symbol information in the symbol dictionary, retrieves, in the covering result, all meta-symbols x of right extended meta-symbols (that is, meta-symbols containing character string R in the beginning portion) of j-th rightmost portion character string of the question character string (that is, the partial character string from the j-th character ($1 \leq j \leq |Q|$) to the final character in the question character string) R, out of extended meta-symbols of meta-symbol Z of covering elements of which collating start character position is 1 (that is, meta-symbols containing Z), and adds elements (x, j, $|R|+j$) to the covering result and records, a third step of symbol dictionary retrieval in which left extended meta-symbol assessing means retrieves meta-symbol information in the symbol dictionary, retrieves, in the covering result, all meta-symbols x of left extended meta-symbols (that is, meta-symbols containing character string L in the end portion) of j-th leftmost portion character string of the question character string (that is, the partial character string from the first character to the j-th character ($1 \leq j \leq |Q|$) in the question character string) L, out of extended meta-symbols of meta-symbol Z of covering elements of which collating end character position is $|Q|+1$ (that is, meta-symbols containing Z), and adds elements (x, $j+1-|L|$, $j+1$) to the covering result and records, a fourth step of symbol dictionary retrieval in which both extended meta-symbol assessing means retrieves the meta-symbol information, retrieves all of both extended meta-symbols of Q (that is, meta-symbols containing character string Q in the portion from the j-th character to the $j+|Q|$-th character, where $1<j$) X, adds elements (X, $1-j$, $1-j+|X|$) to the covering result and records, and a fifth step of symbol dictionary retrieval in which symbol number set assessing means retrieves meta-symbol appearance information in the symbol dictionary while systematically compiling a set C of elements in the covering result covering the question character string or an arbitrary extended character string, collects a symbol number set SC commonly contained in all elements of C, records as part of retrieval result, and issues the sum set of all SCs as final retrieval result, and therefore if the character string is long and when retrieving a symbol containing characters or character chain of high frequency, high speed symbol dictionary retrieval is possible by infix matching.

(Embodiment 1)

Figure 6:
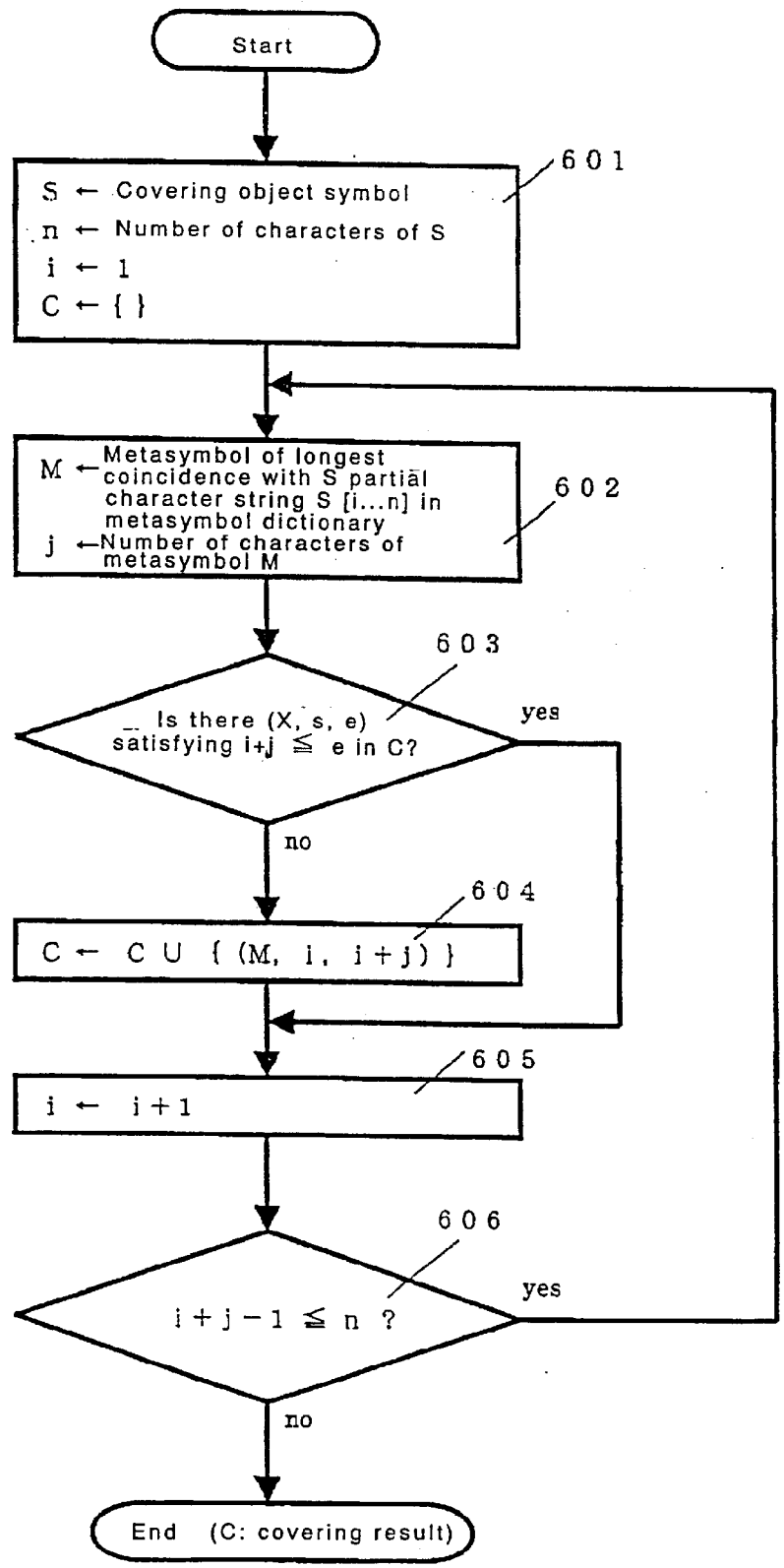
FIG. 6 is a flowchart describing the procedure of covering process by symbol covering means in the first embodiment.

A first embodiment of the invention is described below while referring to the drawings. FIG. 1 is a block diagram showing a general constitution of an embodiment of a symbol dictionary compiling apparatus. In FIG. 1, reference numeral 101 is symbol data as the object of compilation of dictionary, 102 is a meta-symbol dictionary, 103 is symbol covering means for retrieving the meta-symbol dictionary 102 and seeking the retrieval result of each symbol in the symbol data by maximal word extraction method, 104 is meta-symbol summing means for receiving the covering result issued by the symbol covering means 103 and summing up meta-symbols extracted as covering elements, 105 is a meta-symbol frequency table for storing the summing result of the meta-symbol summing means 104, 106 is meta-symbol dictionary update judging means for judging addition of meta-symbol to the meta-symbol dictionary 102, deletion of meta-symbol from the meta-symbol dictionary 102, and stopping condition of meta-symbol dictionary update process on the basis of the summing result of the meta-symbol frequency table 105, 107 is meta-symbol appearance information compiling means for receiving the covering result issued from the symbol covering means 103, and compiling a meta-symbol onset information recording the symbol number of the meta-symbol extracted as covering element and extracted character position in every meta-symbol, 108 is meta-symbol appearance information compiled by the meta-symbol appearance information compiling means 107, 109 is symbol dictionary compiling means for compiling a retrievable symbol dictionary from the meta-symbol dictionary 102 and meta-symbol appearance information 108, and 110 is a retrievable symbol dictionary compiled by the symbol dictionary compiling means 109. FIG. 6 is a flowchart showing the procedure of the process of finding the covering result by the maximal word extraction method, by using the meta-symbol dictionary 102, from each symbol to be covered in the symbol data 101 in the symbol covering means 103.

Figure 16:
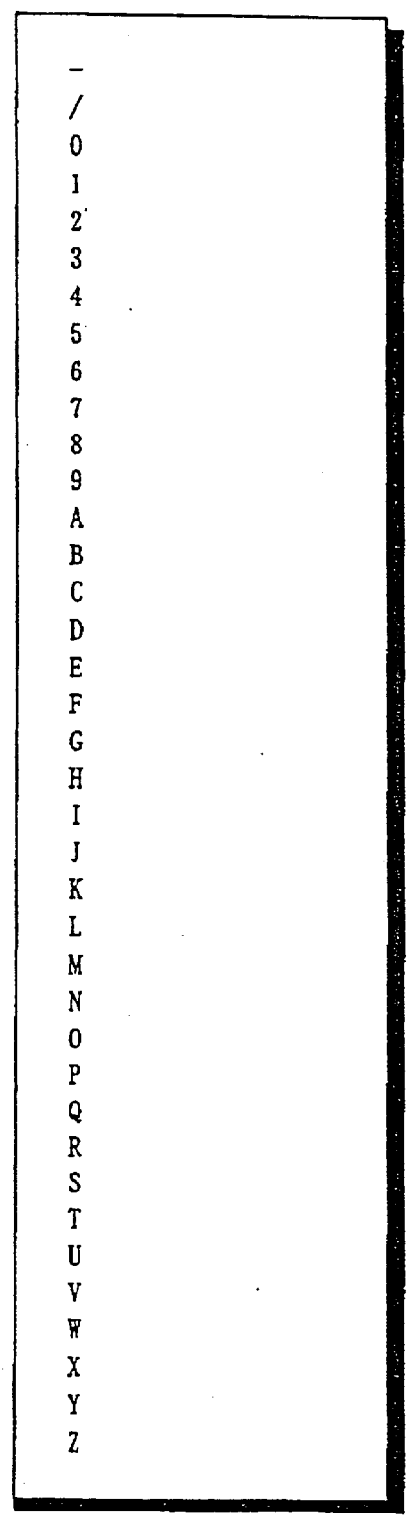
FIG. 16 is an example of registered content of meta-symbol dictionary in initial stage in the first embodiment.
Figure 30:
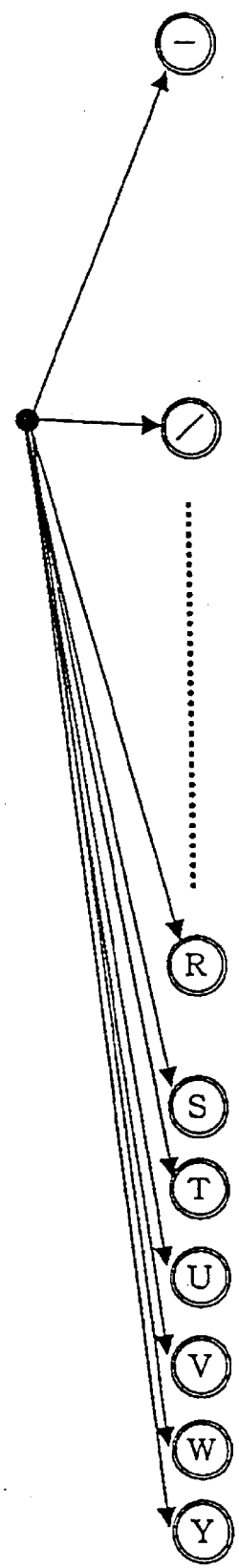
FIG. 30 is a conceptual diagram showing an example of data structure of meta-symbol dictionary in the first embodiment.

In thus constituted symbol dictionary compiling apparatus, its operation is explained below by referring to an example of compiling a symbol dictionary that can be retrieved from symbol data linking the date, 15-minute time increments, and surnames in Roman alphabet. FIG. 15 shows an example of symbol data. In this diagram, certain symbols are omitted, but actually a total of 1000 different symbols are stored as symbol data in the sequence of date and time. The maximum number of characters of each symbol is 1000 characters. At a first step, the additional threshold C1 of meta-symbol is ½0 of the number of symbols. In this example, since the number of symbols is 1000, C1=50. At a second step, the additional threshold Ck of meta-symbol in k-th repetition is ⅒ of the number of symbols as far as k<10, and ⅕ of the number of symbols if 10<k. In this example, Ck=100 if k<10, and Ck=200 if 10<k. At a third step, the value of threshold E is determined as 5. Herein, in the symbol data, only two symbols "-" and "/", numerals "0" to "9", and letters "A" to "Z" of alphabet are used, and other characters are not used. As the meta-symbol dictionary for covering such symbols, prior to compilation of symbol dictionary, a meta-symbol dictionary consisting of one character only possible to appear in the symbol is prepared as shown in FIG. 16. In order to cover efficiently in the symbol covering means, the meta-symbol dictionary has a digital tree data structure (that is, TRIE) as shown in FIG. 30. The meta-symbol of the longest match with a certain character string can be retrieved efficiently by using TRIE, that is, from the root of TRIE (the left end bullet), tracing the tree structure by referring to the first character, second character and so forth of the character string as the clues, and issuing a partial character string up to the double circle node remotest from the root. In the first step of compiling the symbol dictionary, the symbol covering means 103 reads the symbol data in FIG. 15 stored in the symbol data 101 sequentially, retrieves the meta-symbol dictionary of the content as shown in FIG. 30 stored in the meta-symbol dictionary 102, and finds the covering result by the maximal word extraction method. The maximal word extraction method is a method of word extraction of taking out only the collation of collating character intervals not contained completely in any other collating character string, out of the meta-symbols in the meta-symbol dictionary for collating character. string with various partial character strings with a certain symbol S. For example, supposing a symbol "TOKYO METROPOLITAN COUNCIL," when the maximal word extraction is performed by retrieving the meta-symbol dictionary containing six meta-symbols (TO, TOKYO, TOKYO METRO, TOKYO METROPOLITAN, METROPOLITAN COUNCIL, COUNCIL), by covering process as shown in the flowchart in FIG. 6, the covering result is obtained as follows.

{(TOKYO METROPOLITAN, 1, 19), (METROPOLITAN COUNCIL, 17, 27)}

In (X, s, e), X denotes the meta-symbol, s shows the collating start character position, and e is the collating end character position (that is, the character position of the character immediately at the right side of the collated portion), and this set of three pieces is called the covering element. Meta-symbols, such as "TO", "TOKYO", and "TOKYO METRO" are to be collated with the partial character string of "TOKYO METROPOLITAN COUNCIL", but although they are contained in the meta-symbol dictionary, since they are completely included in the collating portion of "TOKYO METROPOLITAN" (in the first two words), they are not included in the covering result. The process of "removing the collation completely contained in other collating portion" is judged at step 603 in FIG. 6, and for the meta-symbol M to be collated from the i-th character to the (i+j−1)-th character of symbol S, of the already collated results from the first to the i−1-th character, if the collating end position (=character position at right side of collating portion) e is i+j or more, the collating character interval [s, e−1] of the collation (X, s, e) includes the character interval [i, i+j−1] completely, and in this case the judgement at step 603 is [yes], and the collated result is not added to the covering result set C.

Incidentally, since all meta-symbols in the meta-symbol dictionary in FIG. 16 are composed of one character only, in the covering process of symbol covering means at the first step, the extracted meta-symbol is always one character, and the judgement at step 603 in FIG. 6 is not [yes], and, for example, the symbol

1998-JAN-01/AM0200/KAWAYASU is covered as follows

Figure 31:
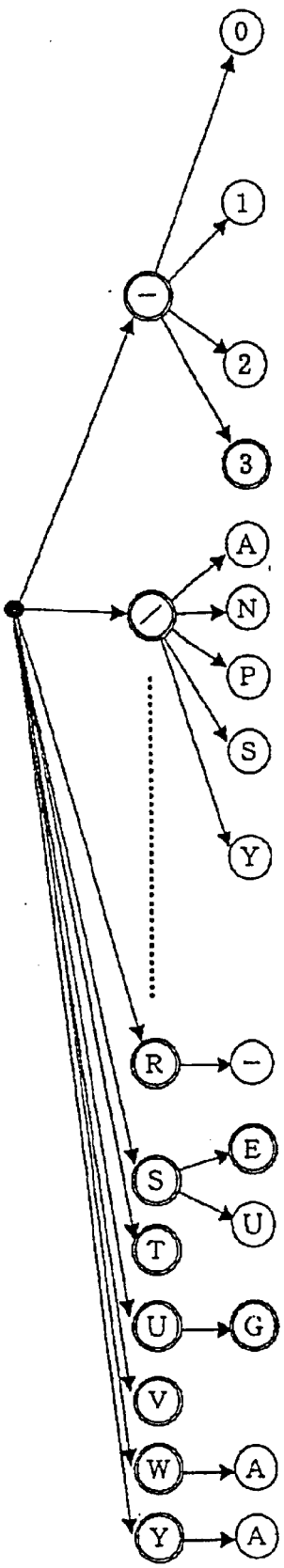
FIG. 31 is a conceptual diagram showing an example of data structure of meta-symbol dictionary in the first embodiment.

{(1, 1, 2), (9, 2, 3), . . . , (S, 26, 27), (U, 27 28)} in one character each. Since all characters possibly appearing in the symbol are included in the meta-symbol dictionary, a non-empty covering result is always obtained. The retrieval result of each symbol is transferred to the meta-symbol summing means 104, and the number of times of each meta-symbol extracted as covering element is recorded in the meta-symbol frequency table 105. For example, after processing of the first symbol "1998-JAN-01/AM0200/KAWAYASU" in the symbol data, the content of the meta-symbol frequency table contains "-" twice, "/" twice, "0" four times, "1" twice, "2" once, "8" once, "9" twice, "A" five times, "J" once, "K" once, "M" once, "N" once, "S" once, "U" once, "W" once, and "Y" once. The frequency of other characters is zero. After processing 1000 symbols in the symbol data 101, the content of the meta-symbol frequency table is as shown in FIG. 17. In this example, since all symbols are in the format of "yyyy-mmm-dd/XXhhmm/name," the frequency of "-" and "/" is 2000 times (twice×1000 symbols in every symbol). It is also clear that meta-symbols "H", "I", "Q", "X", "Z" do not appear at all in the symbol data in FIG. 15. At this moment, of the meta-symbol frequency table, five meta-symbols of which frequency is zero is deleted from the meta-symbol dictionary. FIG. 18 is a frequency table concerning each meta-symbol after deletion. The threshold C1 is 50, and all meta-symbols in FIG. 18 are in the number of characters of 1 and the maximum number of characters is less than 1000, and therefore the meta-symbol dictionary update judging means 106 adds two-character meta-symbols such as "—", "-/", and "-0" having each meta-symbol in FIG. 18 added to the end concerning all meta-symbols in FIG. 18, and updates to the meta-symbol dictionary including the meta-symbols as shown in FIG. 19. The actual structure of the meta-symbol dictionary is built and held as a digital tree structure (that is, TRIE) as shown in FIG. 31. This ends the first step of compiling the symbol dictionary.

In the second step of compiling the symbol dictionary, covering of each symbol at the first step and summing of frequency of. extracted meta-symbols are executed again by using the meta-symbol dictionary in FIG. 19. For example, the symbol

1998-JAN-01/AM0200/KAWAYASU is covered as follows

{(19, 1, 3), (99, 2, 4), . . . , (AS, 25, 27), (SU, 26, 28)} in two characters each. Since all characters possibly appearing in the symbol are included in the meta-symbol dictionary, a non-empty covering result is always obtained.

In the covering process at the second step, meanwhile, since meta-symbols different in the number of characters are mixed in the meta-symbol dictionary 102, unlike the first step, the judgement at step 603 may be possibly [yes] in the flowchart in FIG. 6, and all meta-symbols extracted in the longest match may not be always contained in the covering result (in the above example, since there is (SU, 26, 28), the end (U, 27, 28) is not included in the covering result). Of the meta-symbol frequency table after processing 1000 symbols in the symbol data 101, the portion of meta-symbols of which frequency is not zero is as shown in FIG. 20. Comparing it with FIG. 18, for example, the meta-symbol "-" which is 2000 times of frequency in FIG. 18 is known to be dispersed in FIG. 20, that is, the frequency is dispersed into a total of 23 types of meta-symbols, consisting of 12 types of two-character meta-symbols starting with "-" such as "-0" and "-S", and 11 types of meta-symbols ending with "-" such as "8-", "B-", "C-","G-", "L-", "N-", "P-", "R-", "T-", "V-", "Y-", The total of frequency of 12 types of two-character meta-symbols starting with and the total of frequency of 11 types of meta-symbols ending with "-" are both 2000, and it is known that the character "-" in the symbols is contained in tow meta-symbols sharing this character "-" of the meta-symbol starting with "-" and the meta-symbol ending with "-". Since the threshold C2 is 100, and all meta-symbols in FIG. 20 are 2 in the number of characters and the maximum number of characters is less than 1000, the meta-symbol dictionary update judging means 106 updates the meta-symbol dictionary by adding three-character meta-symbols such as "-0-", "-0/", "-00", adding each meta-symbol in FIG. 18 (that is, one-character meta-symbol) to the end, concerning 62 types of meta-symbols of which frequency is 100 or more, such as "-0", "-1", "-2", "-A" in FIG. 20. At the same time, the meta-symbol dictionary update judging means 106 does not terminate the second step because addition of meta-symbol has occurred once or more as shown above, but judges to continue similar covering, summing, and updating process by using the updated meta-symbol dictionary successively. Of the meta-symbol frequency table after similarly covering and summing by using the updated meta-symbol dictionary 102, the portion of meta-symbols of which frequency is 1 or more is as shown in FIG. 21. For example, the symbol

1998-JAN-01/AM0200/KAWAYASU is covered as follows

{(199, 1, 4), (998, 2, 5), (98-, 3, 6), (8-J, 4, 7), (-JA, 5, 8), (AN-, 7, 10), (N-0, 8, 11), . . . , (YAS, 24, 27), (ASU, 25, 28)} and it is known that the longest match meta-symbol "JA" from the character "J" is not included in the covering result. In FIG. 21, two-character meta-symbols and three-character meta-symbols are coexisting, and when covering, it is known that the symbols are covered by using the three-character meta-symbol in the portion large in the frequency of appearance, and by using two-character meta-symbol in the portion relatively small in frequency of appearance. Since the threshold C3 is 100, and all meta-symbols in FIG. 21 are 3 or less in the number of characters and the maximum number of characters is less than 1000, the meta-symbol dictionary update judging means 106 updates the meta-symbol dictionary by adding meta-symbols such as "-01-", "-01/", "-010", adding each meta-symbol in FIG. 18 (that is, one-character meta-symbol) to the end, concerning 42 types of meta-symbols of which frequency is 100 or more, such as "-01", "-02", "-03", "-04" in FIG. 21. At the same time, the meta-symbol dictionary update judging means 106 does not terminate the second step because addition of meta-symbol has occurred once or more as shown above, but judges to continue similar covering, summing, and updating process by using the updated meta-symbol dictionary successively. Of the meta-symbol frequency table after similarly covering and summing by using the updated meta-symbol dictionary 102, the portion of meta-symbols of which frequency is 1 or more is as shown in FIG. 22. Since the threshold C4 is 100, and all meta-symbols in FIG. 22 are 4 or less in the number of characters and the maximum number of characters is less than 1000, the meta-symbol dictionary update judging means 106 updates the meta-symbol dictionary by adding meta-symbols such as "-NOV-", "-NOV/", "-NOV0", adding each meta-symbol in FIG. 18 (that is, one-character meta-symbol) to the end, concerning 31 types of meta-symbols of which frequency is 100 or more, such as "-NOV", "/AM0", "/AM1", "/KAW" in FIG. 22.

At the same time, the meta-symbol dictionary update judging means 106 does not terminate the second step because addition of meta-symbol has occurred once or more as shown above, but judges to continue similar covering, summing, and updating process by using the updated meta-symbol dictionary successively. Of the meta-symbol frequency table after similarly covering and summing by using the updated meta-symbol dictionary 102, the portion of meta-symbols of which frequency is 1 or more is as shown in FIG. 23. Comparing FIG. 23 and FIG. 22, the number of types of meta-symbols with frequency of 1 or more is decreased by two types in spite of addition of meta-symbols, and it is confirmed that the meta-symbols smaller in the number of characters are "being shut out" from the extraction result by the maximal word extraction by meta-symbols with a large number of characters. Since the threshold C5 is 100, and all meta-symbols in FIG. 23 are 5 or less in the number of characters and the maximum number of characters is less than 1000, the meta-symbol dictionary update judging means 106 updates the meta-symbol dictionary by adding meta-symbols such as "-NOV—", "-NOV-/", "-NOV-0", adding each meta-symbol in FIG. 18 (that is, one-character meta-symbol) to the end, concerning 20 types of meta-symbols of which frequency is 100 or more, such as "-NOV-", "/KAWA", "/SUDA", "/SUKA" in FIG. 23.

At the same time, the meta-symbol dictionary update judging means 106 does not terminate the second step because addition of meta-symbol has occurred once or more as shown above, but judges to continue similar covering, summing, and updating process by using the updated meta-symbol dictionary successively. Of the meta-symbol frequency table after similarly covering and summing by using the updated meta-symbol dictionary 102, the portion of meta-symbols of which frequency is 1 or more is as shown in FIG. 24. Comparing FIG. 24 and FIG. 22, the number of types of meta-symbols with frequency of 1 or more is decreased further, and it is confirmed that the meta-symbols smaller in the number of characters are "being shut out" from the extraction result by the maximal word extraction by meta-symbols with a large number of characters. Since the threshold C6 is 100, and all meta-symbols in FIG. 24 are 6 or less in the number of characters and the maximum number of characters is less than 1000, the meta-symbol dictionary update judging means 106 updates the meta-symbol dictionary by adding meta-symbols, adding each meta-symbol in FIG. 18 (that is, one-character meta-symbol) to the end, concerning 16 types of meta-symbols of which frequency is 100 or more in FIG. 24.

At the same time, the meta-symbol dictionary update judging means 106 does not terminate the second step because addition of meta-symbol has occurred once or more as shown above, but judges to continue similar covering, summing, and updating process by using the updated meta-symbol dictionary successively. Of the meta-symbol frequency table after similarly covering and summing by using the updated meta-symbol dictionary 102, the portion of meta-symbols of which frequency is 1 or more is as shown in FIG. 25. Since the threshold C7 is 100, and all meta-symbols in FIG. 25 are 7 or less in the number of characters and the maximum number of characters is less than 1000, the meta-symbol dictionary update judging means 106 attempts to add meta-symbols, adding each meta-symbol in FIG. 18 (that is, one-character meta-symbol) to the end, concerning nine types of meta-symbols of which frequency is 100 or more in FIG. 25, but, as for five types of meta-symbols "/SUDA", "/SUKAWA", "ISUWA", "98NOV", "WADA", since the meta-symbol adding one character at the end is already included all in the meta-symbol dictionary, it updates the meta-symbol dictionary by adding to the remaining four types of meta-symbols. At the same time, the meta-symbol dictionary update judging means 106 does not terminate the second step because addition of meta-symbol has occurred once or more as shown above, but judges to continue similar covering, summing, and updating process by using the updated meta-symbol dictionary successively. Comparing FIG. 25 and FIG. 24, the frequency of meta-symbol "/SUKAWA" is decreased from 187 to 81. It is confirmed, due to the presence of meta-symbol "/SUKAWA" in FIG. 25, that "SUKAWA" of the symbol "1998 . . . /SUKAWA" is deleted from the covering result, and that only the frequency of "SUKAWA" of the symbol "1998 . . . YASUKAWA" is left over. Of the meta-symbol frequency table after similar covering and summing process by using the updated meta-symbol dictionary 102, the portion of meta-symbols of which frequency is 1 or more is as shown in FIG. 26. Since the threshold C8 is 100, and all meta-symbols in FIG. 26 are 8 or less in the number of characters and the maximum number of characters is less than 1000, the meta-symbol dictionary update judging means 106 attempts to add meta-symbols, adding each meta-symbol in FIG. 18 (that is, one-character meta-symbol) to the end, concerning six types of meta-symbols of which frequency is 100 or more in FIG. 26, but, as for five types of meta-symbols "/SUDA", "/SUKAWA", "/SUWA", "98-NOV", "WADA", since the meta-symbol adding one character at the end is already included all in the meta-symbol dictionary, it updates the meta-symbol dictionary by adding to the remaining meta-symbol "1998-NOV".

At the same time, the meta-symbol dictionary update judging means 106 does not terminate the second step because addition of meta-symbol has occurred once or more as shown above, but judges to continue similar covering, summing, and updating process by using the updated meta-symbol dictionary successively. Of the meta-symbol frequency table after similarly covering and summing by using the updated meta-symbol dictionary 102, the portion of meta-symbols of which frequency is 1 or more is as shown in FIG. 27. Since the threshold C9 is 100, and all meta-symbols in FIG. 27 are 9 or less in the number of characters and the maximum number of characters is less than 1000, the meta-symbol dictionary update judging means 106 attempts to add meta-symbols, adding each meta-symbol in FIG. 18 (that is, one-character meta-symbol) to the end, concerning five types of meta-symbols of which frequency is 100 or more in FIG. 27, but, as for four types of meta-symbols "/SUDA", "/SUKAWA", "/SUWA", "WADA", since the meta-symbol adding one character at the end is already included all in the meta-symbol dictionary, it updates the meta-symbol dictionary by adding to the remaining meta-symbol "1998-NOV-". At the same time, the meta-symbol dictionary update judging means 106 does not terminate the second step because addition of meta-symbol has occurred once or more as shown above, but judges to continue similar covering, summing, and updating process by using the updated meta-symbol dictionary successively. Of the meta-symbol frequency table after similar covering and summing process by using the updated meta-symbol dictionary 102, the portion of meta-symbols of which frequency is 1 or more is as shown in FIG. 28. Since the threshold C10 is 100, and all meta-symbols in FIG. 28 are 10 or less in the number of characters and the maximum number of characters is less than 1000, the meta-symbol dictionary update judging means 106 attempts to add meta-symbols, adding each meta-symbol in FIG. 18 (that is, one-character meta-symbol) to the end, concerning four types of meta-symbols of which frequency is 100 or more in FIG. 28, but, as for these four types of meta-symbols "/SUDA", "/SUKAWA", "/SUWA", "WADA", since the meta-symbol adding one character at the end is already included all in the meta-symbol dictionary, no additional processing is done and the meta-symbol dictionary is not updated. Thus, since addition of meta-symbol does not occur, the meta-symbol dictionary update judging means 106 terminate the second step.

Figure 32:
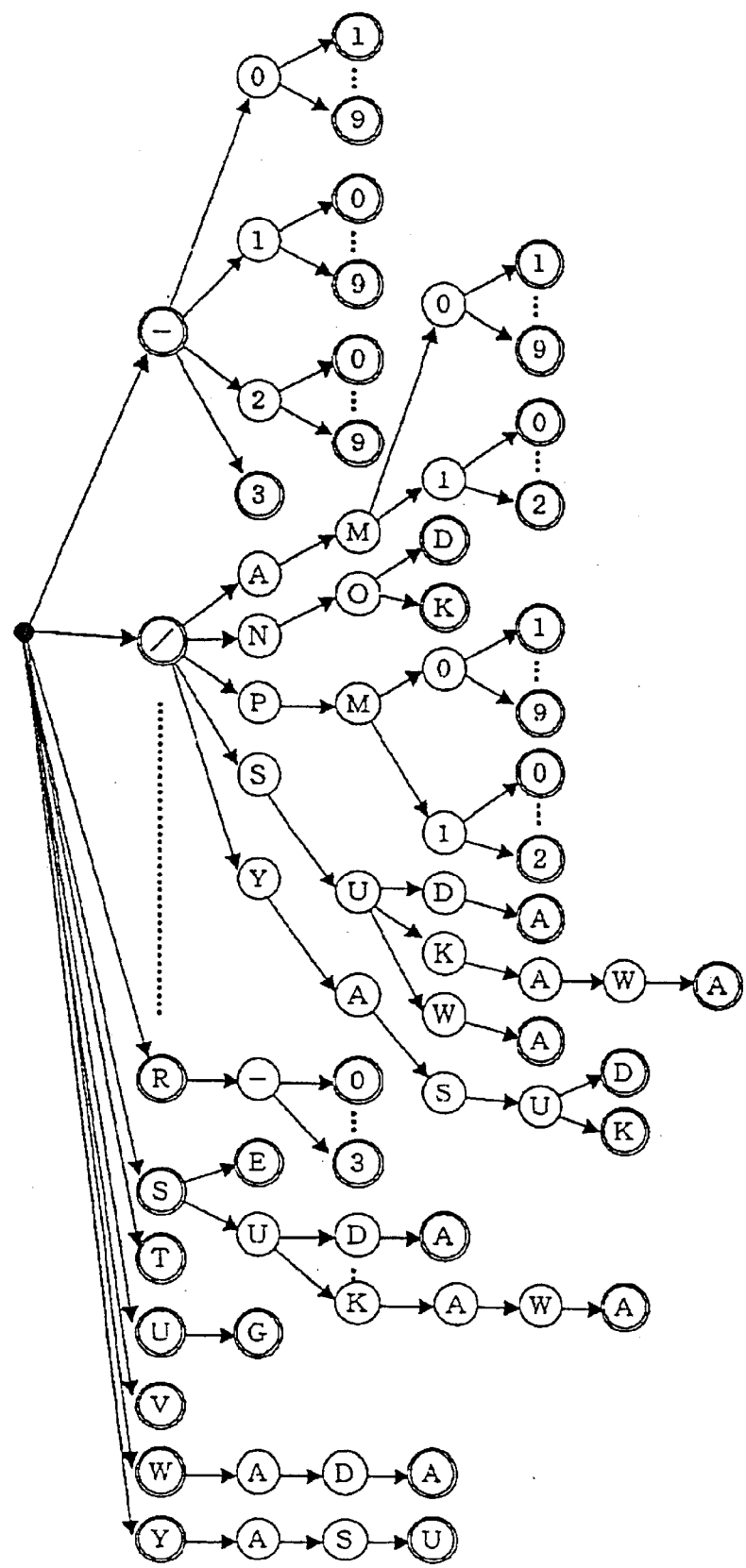
FIG. 32 is a conceptual diagram showing an example of data structure of meta-symbol dictionary in the first embodiment.

At a third step of compiling symbol dictionary, the meta-symbol dictionary update judging means 106 refers to the meta-symbol frequency table 105, and deletes meta-symbols of two characters or more having frequency of less than the threshold E (that is, 5) from the meta-symbol dictionary 102. In FIG. 28, of the meta-symbols with frequency of 1 or more, nothing is less than 5 in frequency, and in this case the frequency is 0, and all meta-symbols with two characters or more are deleted, and the content of the meta-symbol dictionary 102 is consequently the sum of the meta-symbols in FIG. 28 and meta-symbols in FIG. 18. The actual structure of meta-symbol dictionary is built and held as digital tree data structure as shown in FIG. 32 (that is, TRIE). This ends the third step of compiling symbol dictionary.

At a fourth step of compiling symbol dictionary, the symbol covering means 103 finds the covering result by covering each symbol data in the symbol data 101 by using the meta-symbol dictionary 102 in FIG. 32 calculated at the third step, and the meta-symbol appearance information compiling means 108 compiles meta-symbol appearance information 108 recording the symbol number of appearance of each meta-symbol from the covering result and the appearance character position. In this case, the meta-symbol appearance information as shown in FIG. 29 is compiled. In FIG. 29, however, for the ease of interpretation, the symbol character string is used instead of the symbol number. This compilation process is so-called inversion by nature, and it can be done efficiently by the technique generally employed in information retrieval system. The collating character position is expressed by the number of characters at the left side of the collating portion (the left character count in FIG. 29) and the number of characters at the right side of the collating portion (right character count in FIG. 29). The content as shown in FIG. 29 is recorded as a summary table in each meta-symbol, and by retrieving by using the meta-symbol and the collating character position as the clues, the string (set) of numbers of symbols including the designated meta-symbol at the designated character position can be obtained efficiently. This ends the fourth step of compiling symbol dictionary.

At a fifth step of compiling a symbol dictionary, the symbol dictionary compiling means 109 compiles a machine-retrievable symbol dictionary 110 from the meta-symbol dictionary 102 and meta-symbol appearance information 108. At this time, the meta-symbol appearance information 108 stores the table as shown in FIG. 29 directly in the symbol dictionary 110, but as for the meta-symbol dictionary 102, aside from the information in TRIE structure as shown in FIG. 32, the meta-symbol extension table adding extended information of meta-symbol as shown in FIG. 33 is also stored in the symbol dictionary 110 as meta-symbol information. The meta-symbol extension table in FIG. 33 is a table recording three sets of meta-symbol in the meta-symbol dictionary containing M as character string, and number of characters of right and left extended portions, in every meta-symbol M in the meta-symbol dictionary, and for example, the extended information of meta-symbol "-" is expressed as follows:

{(-, 0, 0), (-01, 0, 2), . . . , (-29, 0, 2), (-3, 0, 1), . . . , (R-0, 1, 1), (R-3, 1, 1)}

This extension table of meta-symbol can be compiled same as in the compiling process of the meta-symbol appearance information 108 shown above. This ends the fifth step of compiling symbol dictionary, and the symbol dictionary 110 is compiled, and the symbol dictionary compilation is over.

As explained herein, according to the compiling method of symbol dictionary in the first embodiment of the invention, as for the partial character string appearing at high frequency in the symbol data, by compiling a meta-symbol dictionary having meta-symbols with more number of characters, since the covering information of symbol is recorded by using this meta-symbol dictionary, the symbol dictionary can be compiled by a smaller quantity of information, and when retrieving the symbol dictionary, the symbol including the partial character string appearing at high frequency can be retrieved at high speed as compared with the conventional symbol dictionary retrieval. Moreover, this meta-symbol dictionary compilation can be executed mechanically by setting the threshold, and an appropriate symbol dictionary suited to deviation of character string distribution of symbol data can be compiled without requiring manual operation.

(Embodiment 2)

Figure 2:
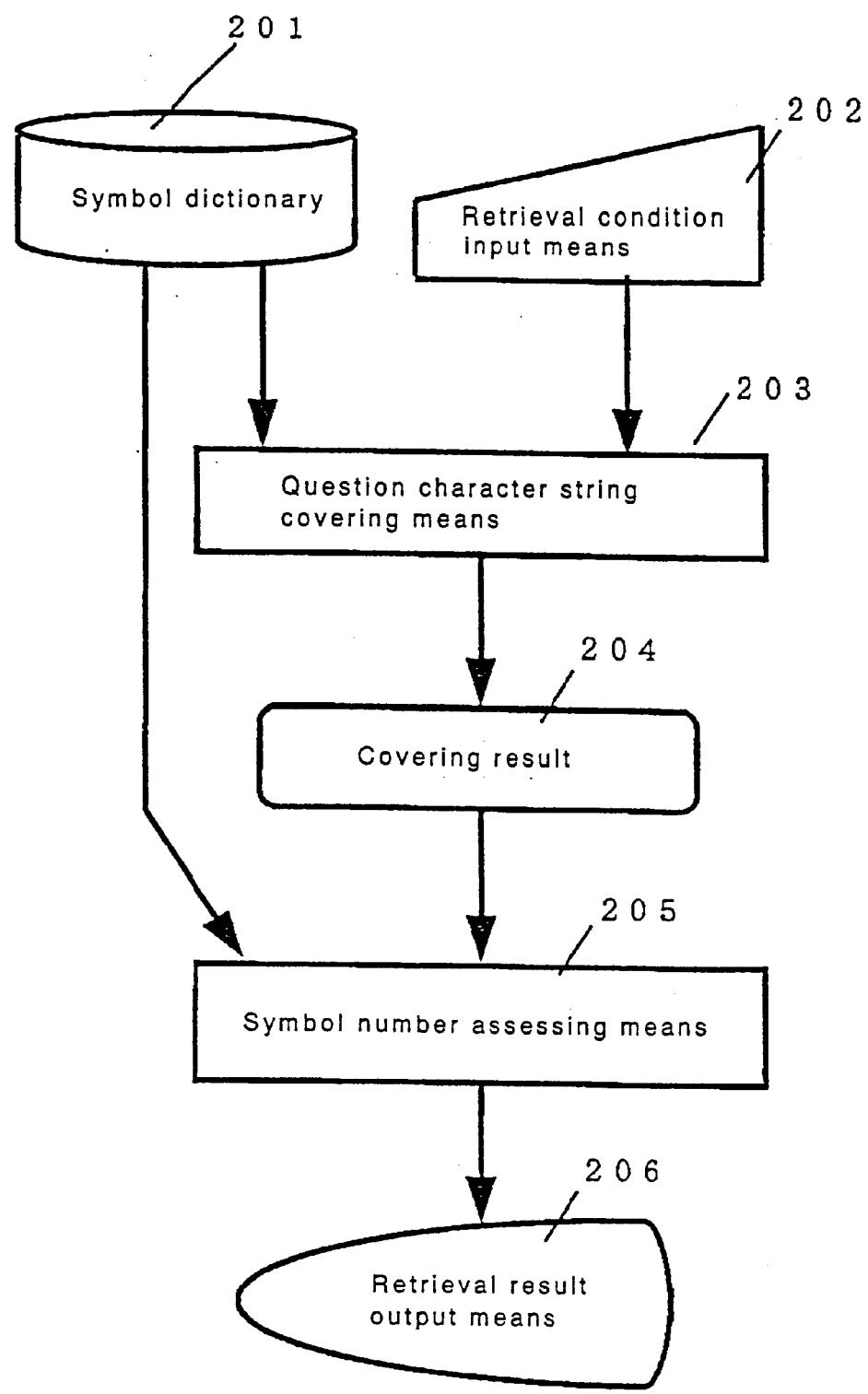
FIG. 2 is a block diagram showing a general constitution of a symbol dictionary retrieving apparatus in a second embodiment of the invention.

A second embodiment of the invention is described below while referring to the drawings. FIG. 2 is a block diagram showing a general constitution of a symbol dictionary retrieving apparatus. In FIG. 2, reference numeral 201 is a symbol dictionary storing meta-symbol information and meta-symbol appearance information, 202 is retrieval condition input means for entering character string as retrieval condition, 203 is question character string covering means for finding the covering result,by covering the question character string which is the retrieval condition entered from the retrieval condition input means 202 by the longest matchoverlapped longest match word extraction method by using the symbol dictionary 201, 204 is the covering result determined by the question character string covering means 203, 205 is symbol number assessing means for assessing the symbol number completely coinciding with the question character string, that is, identical with the question character string, from the covering result 204 and the meta-symbol appearance information of symbol dictionary 201, and 206 is retrieval result output means for issuing the symbol number assessed by the symbol number assessing means 205 and others.

Figure 7:
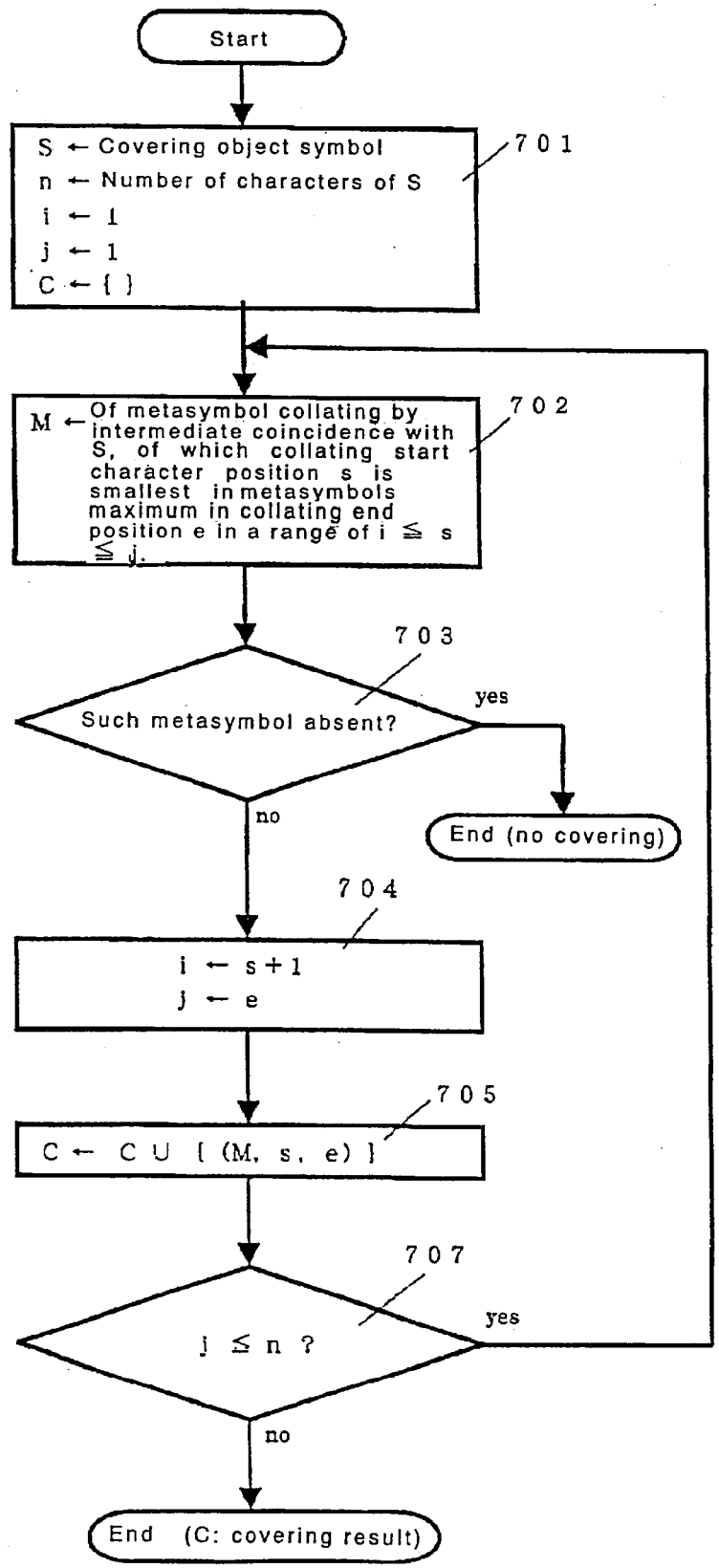
FIG. 7 is a flowchart describing the procedure of covering process by question character string covering means in the second to fifth embodiments.

In thus constituted symbol dictionary retrieving apparatus, the operation is explained below by referring to the drawings, relating to the example of symbol dictionary presented in the first embodiment and an example of simple retrieval condition. FIG. 7 is a flowchart describing the procedure of process for finding the covering result in the question character string covering means 203, FIG. 8 is a flowchart describing the procedure of assessing process of symbol number in the symbol number assessing means 205, and FIG. 34 is a conceptual diagram describing principal intermediate data in the process of symbol dictionary retrieval in the case of giving the condition of "Find the symbol number completely coinciding with the question character string 1998-NOV-01/PM1030/KAWAYASU" as the retrieval condition.

To begin with, at a first step of retrieving symbol dictionary, the question character string covering means 203 retrieves the meta-symbol information in the symbol dictionary 201, and finds the covering of the question character string 1998-NOV-01/PM1030/KAWAYASU by the longest matchoverlapped longest match word extraction method, and obtains the covering result of C of *STEP1 in FIG. 34. The longest matchoverlapped longest match word extraction method is a covering method in which the meta-symbol of longest match is searched from the left side of the covering object character string, while permitting partial duplication of meta-symbols, and if the collating character interval of a certain meta-symbol A is completely contained in the interval of sum of the collating character intervals of one or more other meta-symbol groups B, . . . , X, such meta-symbol A is not recorded as covering element. More specifically, at step 702 in FIG. 7, at the end side further from the immediate preceding extraction result, among meta-symbols having collating character interval without spacing, first a set H of meta-symbols covering up to the utmost end side is find, and the meta-symbol of which collating start position is closest to the beginning side, that is, having the most number of characters is found from H and used as covering element, and on the basis of the collating character interval of this covering element, the covering element of the next end side is further determined, and by this series of extraction process from the beginning to the end, this covering method is intended to obtain the partial set of the covering result obtained by the maximal word extraction method. In the case of this question character string, since the covering result 204 is not empty, processing at the symbol number assessing means 205 starts, but in the case of absence of covering result, the process is stopped immediately, and there is no covering result. The subsequent process conforms to FIG. 8. First, at step 801, an element (at most one in C) of which collating start character position s is 1 is searched in the covering result. In this example, "1998-NOV-0,1,11" is found out. Successively, in the meta-symbol appearance information in the symbol dictionary, all formats of (X, 0, n-e+1) (where n is the number of characters in the question character string; it is 14 in this example) in the appearance symbol information of M=1998-NOV-0 are searched, and the set of symbol number of this symbol X is recorded as A. In FIG. 34, for the ease of reading, sets A and B are described by using symbol character string instead of the symbol number. In this example, the symbol number of symbol such as 1998-NOV-01/AM0830/NODA is determined. Once A is determined, the element selected herein (1998-NOV0,1,11)

is deleted from C. As a result, C becomes as shown in C at *STEP2 in FIG. 34, and the condition judging of "Is C an empty set?" at step 802 in FIG. 8 is No, and the process advances to step 803. At step 803, in this example, the beginning element of C (1/P, 11, 14) is selected, and as B, the symbol (the number corresponding to the symbol) such as B at *STEP3 in FIG. 34 including 1998-JAN-01/PM065/ NODA or the like is obtained. Then, finding the common portion of A and B, it is stored in A. That is, the content of A is reduced only to the portion contained in B. In this example, the content of A is reduced to four symbols (their numbers). In succession, judging at step 804 in FIG. 8, since A is not empty, the process advances to step 805, and the element (1/P, 11, 14) selected at step 803 is deleted from C, and the process returns to step 802. Thereafter, up to *STEP4 to *STEP6, similarly selecting the element from C successively, B is determined from the meta-symbol appearance information, and the intermediate result A is reduced. In this period, neither A nor C is empty, and the process is not terminated on the way.

Figure 8:
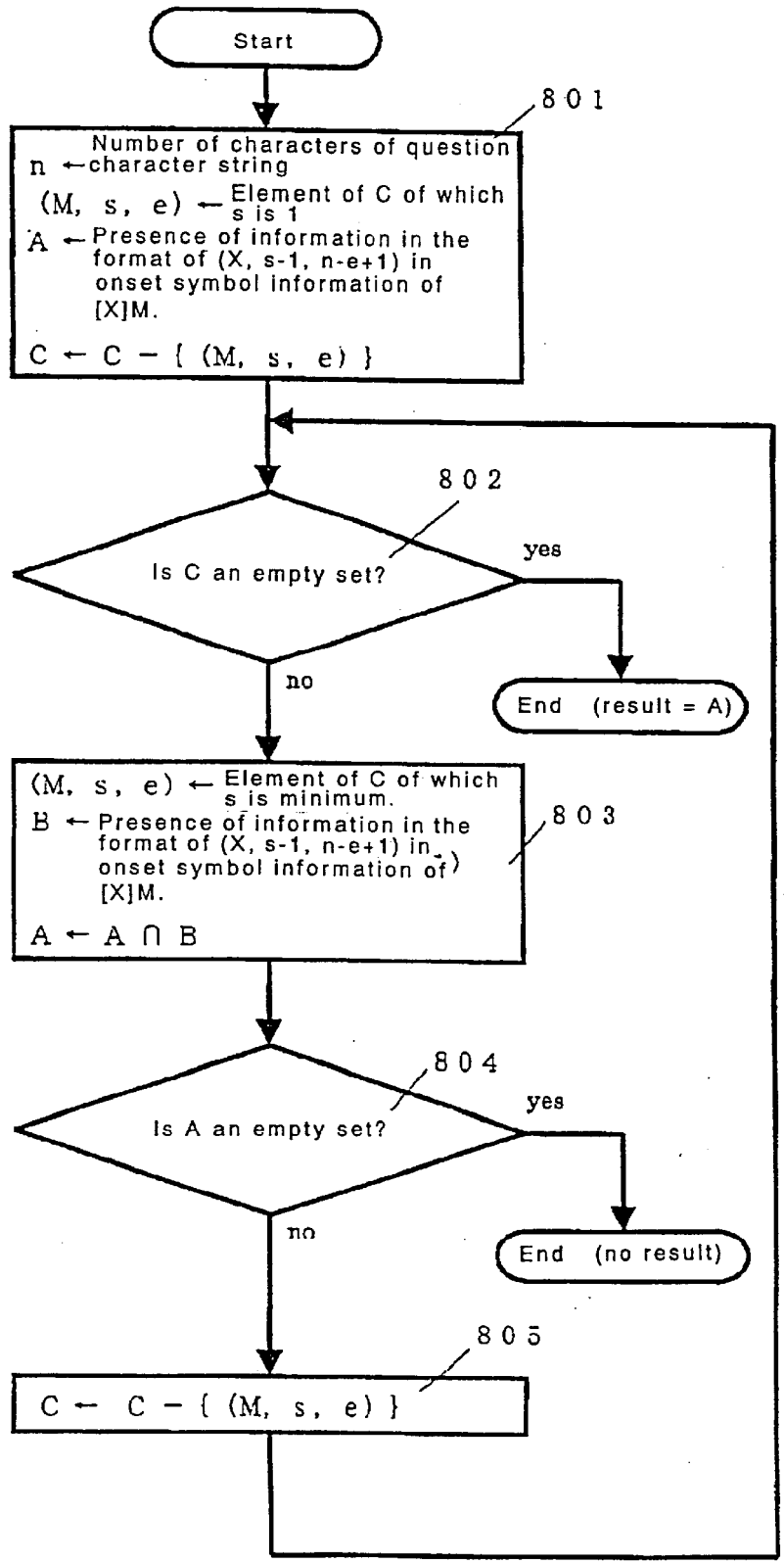
FIG. 8 is a flowchart describing the procedure of symbol number assessing process by symbol number assessing means in the second embodiment.

Finally, after the process of *STEP7, C is empty at the end of step 805 in FIG. 8, it is judged Yes at step 8 02, and the process in the symbol number assessing means 205 is terminated, and the element of A, that is, the number of symbol "1998-NOV-01/PM1030/KAWAYASU" is issued to the retrieval result display means 206, and the symbol retrieval process is terminated.

As explained herein, according to the retrieving method of symbol dictionary in the second embodiment of the invention, as for the partial character string appearing at high frequency among symbol data, meta-symbol information having meta-symbols with greater number of characters is compiled, and by using this meta-symbol information, once the covering result is composed from the question character string, and the retrieval is processed by using this covering result and the meta-symbol appearance information, therefore even the retrieval of symbol containing partial character string appearing at high frequency can be done faster than in the conventional retrieval of symbol dictionary.

(Embodiment 3)

Figure 3:
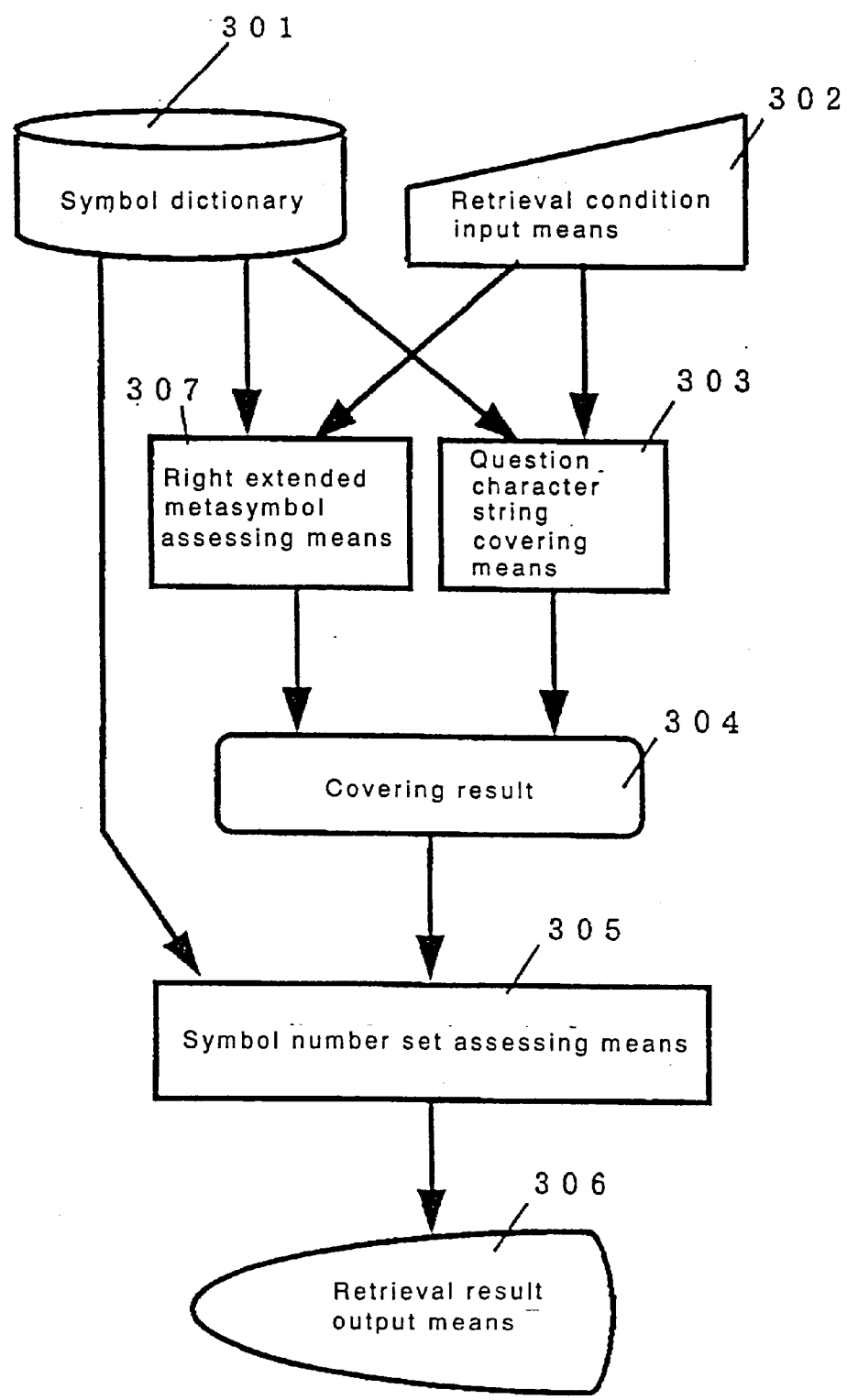
FIG. 3 is a block diagram showing a general constitution of a symbol dictionary retrieving apparatus in a third embodiment of the invention.

A third embodiment of the invention is described below while referring to the drawings. FIG. 3 is a block diagram showing a general constitution of a symbol dictionary retrieving apparatus. In FIG. 3, reference numeral 301 is a symbol dictionary storing meta-symbol information and meta-symbol appearance information, 302 is retrieval condition input means for entering character string as retrieval condition, 303 is question character string covering means for finding the covering result by covering the question character string which is the retrieval condition entered from the retrieval condition input means 302 by the maximal word extraction method by using the symbol dictionary 301, 304 is the covering result determined by the question character string covering means 303, 305 is symbol number set assessing means for assessing the set of symbol numbers coinciding forward with the question character string, that is, containing the question character string in the beginning portion, from the covering result 304 and the meta-symbol appearance information of symbol dictionary 301, 307 is right extended meta-symbol assessing means for retrieving the meta-symbol information in the symbol dictionary 301, finding all of the sets of the number of the meta-symbol and the collating position of the right extended meta-symbol (that is, the meta-symbol containing R in the beginning portion) of the rightmost partial character string R of the question character string, out of the extended meta-symbols of meta-symbol Z (that is, meta-symbols containing Z) of covering elements largest in the collating start character position among the covering result 304, and adding and storing to the covering result 304, and 306 is retrieval result output means for issuing the symbol number assessed by the symbol number assessing means 305 and others. The constituent elements 301 to 304 in FIG. 3 correspond to the constituent elements 201 to 204 in FIG. 2 which is the block diagram of the second embodiment.

Figure 9:
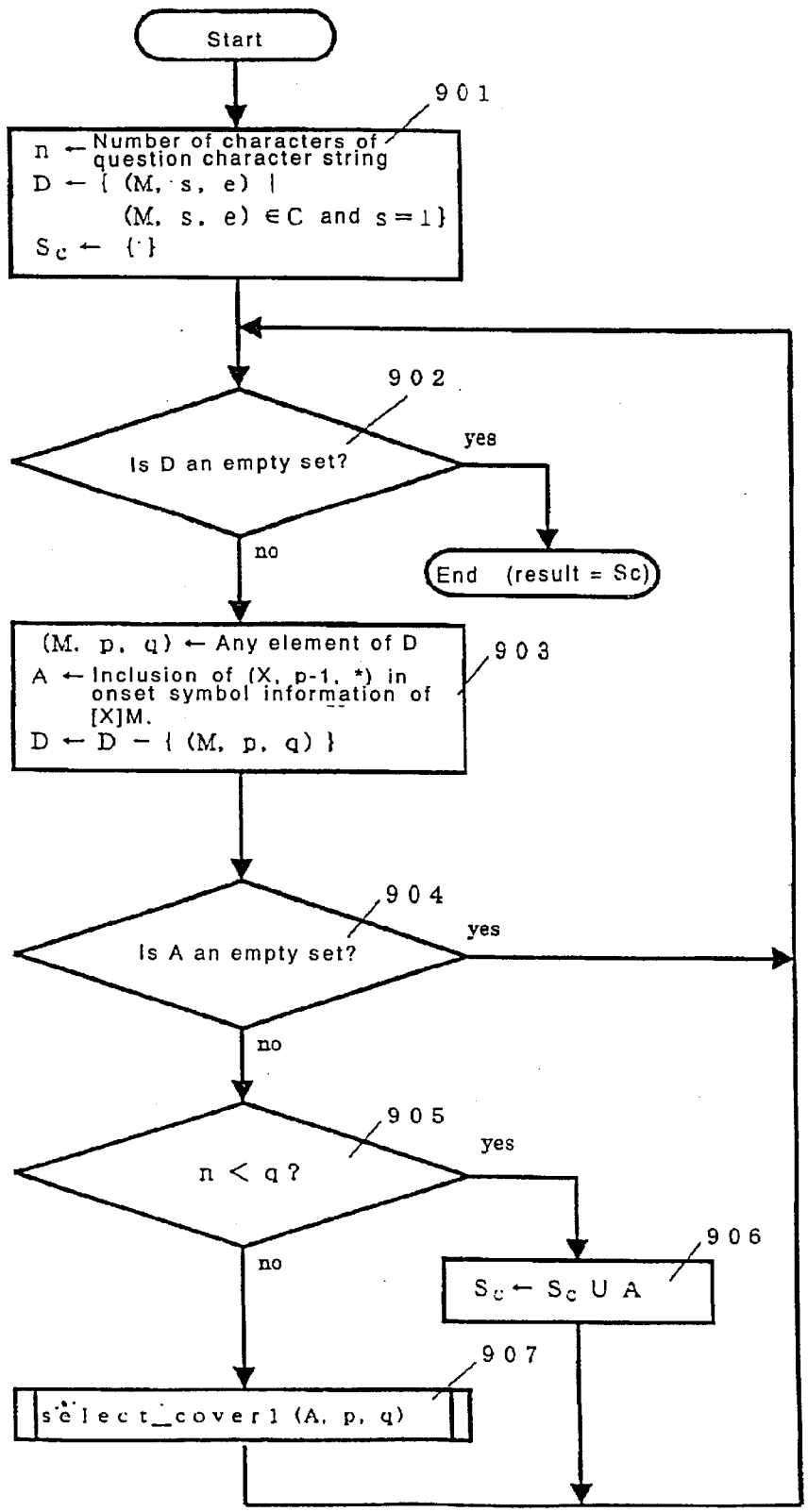
FIG. 9 is a flowchart describing the procedure of symbol number set assessing process by symbol number set assessing means in the third embodiment.
Figure 10:
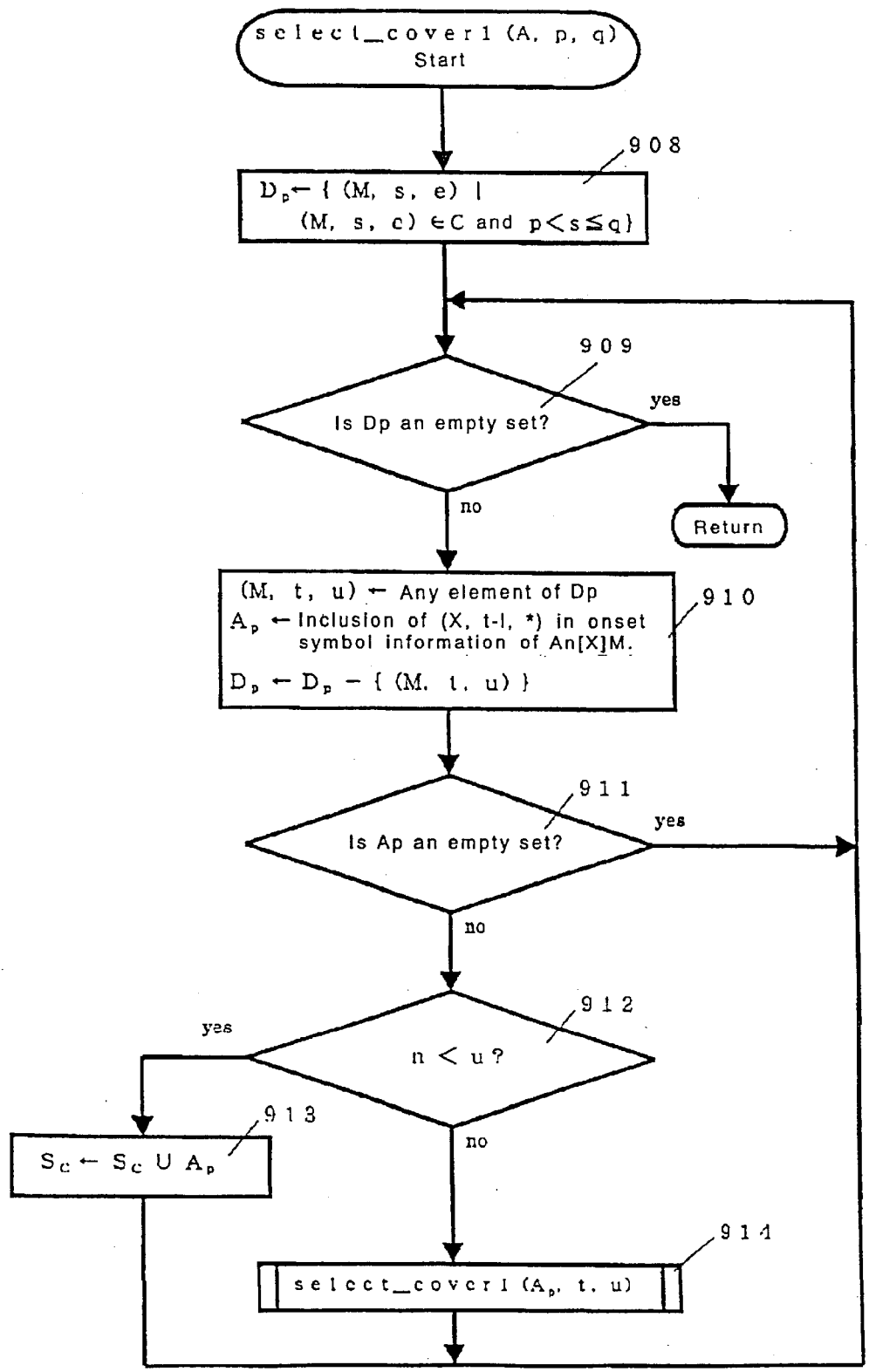
FIG. 10 is a flowchart describing the procedure of symbol number set assessing process by symbol number set assessing means in the third embodiment.

In thus constituted symbol dictionary retrieving apparatus, the operation is explained below by referring to the drawings, relating to the example of symbol dictionary presented in the first embodiment and an example of simple retrieval condition. FIG. 7 is a flowchart describing the procedure of process for finding the covering result in the question character string covering means 303, FIGS. 9 and 10 are flowcharts describing the procedure of assessing process of symbol number set in the symbol number set assessing means 305, and FIGS. 35 and 36 are conceptual diagrams describing principal intermediate data in the process of symbol dictionary retrieval in the case of giving the condition of "Find the set of symbol numbers coinciding forward with the question character string 1998-NOV01/ PM" as the retrieval condition.

To begin with, at a first step of retrieving symbol dictionary, the question character string covering means 303 retrieves the meta-symbol information in the symbol dictionary 301, and finds the covering of the question character string 1998-NOV-01/PM by the longest matchoverlapped longest match word extraction method, and obtains the covering result of C of *STEP1 in FIG. 35. The procedure of the covering process is same as the procedure of the covering process in embodiment 2. In the case of this question character string, since the covering result 304 is not empty, processing at the right extended meta-symbol assessing means 307 starts, but in the case of absence of covering result, the process is stopped immediately, and there is no covering result. Consequently, the right extended meta-symbol assessing means 307 retrieves the meta-symbol information in the symbol dictionary 301, and finds the extended meta-symbols in the meta-symbol Z of the covering element largest in the collating start position (that is, meta-symbols of character string containing Z) among the covering result 304. Of the obtained extended meta-symbols, only the meta-symbol X of the right extended meta-symbol (that is, the meta-symbol containing the character string R in the beginning portion) of the j-th rightmost partial character string R of the question character string (that is, the partial character string from the j-th character to the final character in the question character string) is selected, and (X, j, |R|+j)

is added to the covering result 304. In this example, Z=M, and as its extended meta-symbols, 26 types are determined, that is,

[/AM01], . . . , [/AM12], [/PM01], [/PM02], . . . , [/PM12], [1998-MAR], [1998-MAY]

Out of them, 12 types of meta-symbols

[/PM01], [PM02], . . . , [PM12]

as the right extended meta-symbols of the rightmost partial string of the question character string 1998-NOV-01/ PM are added to the covering result 304 by the right extended meta-symbol assessing means 307. This mode is shown in *STEP2 in FIG. 35. Thus, after covering up to the right extended meta-symbols, the symbol number set-assessing means 305 determines the symbol number set. The subsequent process conforms to FIG. 9 and FIG. 10. First, at step 901, the set D composed of elements of which collating start character position s is 1 is determined from the covering result. In this example, D={(1998-NOV-0,1,1 1)}. The set SC of the final result is initialized to be empty. Since D is not empty, the process advances to step 903, and only one element (1998-NOV-0,1,11) is selected from D, and in the meta-symbol appearance information in the symbol dictionary 301, all formats of (X, 0, *) in the appearance symbol information of M=1998-NOV-0 are searched, and the set of the symbol number of the symbol X is recorded as A. Herein, * denotes an arbitrary value (don't care). In FIG. 35 and FIG. 36, sets such as A, C, D are described by using the symbol character string, instead of symbol number, for the ease of reading. In this example, at *STEP4, the symbol number of the symbol such as 1998-NOV-01/AM0830/NODA is determined. Once A is determined, the element selected herein (1998-NOV-01,1,11) is deleted from D. As a result, the condition judging of "Is A an empty set?" at step 904 is No, and the process advances to step 905. At step 905, it is judged if q is greater than the number of characters n of the question character string, and if larger, the elements of the set A at this moment are added to the set SC of the final result, and if not larger, the procedure select_cover1 (A, p, q) in FIG. 10 is fetched. In this case, n=14 and q=11, and therefore q<n, and moving to step 907, the procedure select_cover1 (A, p, q) in FIG. 10 is fetched, and the process is advanced. At step 908 in FIG. 10, as compared with the procedure arguments of character positions p and q, in order that the collating start character position s may be larger than p and smaller than q, the set Dp composed of elements in the covering result C is determined.

In this example, p=1 and q=11, and when the element satisfying 1<s≦11 is determined from C, D1={(1/P, 11, 14)} is obtained as shown in *STEP5 in FIG. 35. Since D1 is not empty, it is No at step 909, and the process advances to step 910. From D1, the first element (1/P, 11, 14) is selected, and from the appearance meta-symbol information of meta-symbol 1/P, all elements in the format of (X, 10, *) are searched, and the intermediate result A is reduced by eliminating the portion common with A, and the result is stored in A1. Herein, * denotes an arbitrary value. In this example, as shown in *STEP6 in FIG. 35, A is reduced to three elements. Further, from D1, the element of D1 selected herein (1/P, 11, 14) is deleted. Since A1 is not empty, it is No at step 911, and the process advances to step 912. As compared with n=14, it is u=12, and it is judged No at step 912.

At step 914, with A1, t=11, u=14 as arguments, the procedure select_cover1 in FIG. 10 is fetched recursively, and the process is continued, and the intermediate result of Ap is reduced gradually as shown in FIG. 35 and FIG. 36. At *STEP18 in FIG. 36, since u=17, and n=14 or more, A11 is recorded as part of the final result SC, and the retrieval process is further continued in order to search other result. Thus, while generating the combination of covering elements systematically from the covering result 304, the meta-symbol appearance information in the symbol dictionary 301 is retrieved, and the set of the symbol numbers commonly contained in the generated sets of covering elements is determined, and recorded in the set SC of the final result. After processing all combinations of covering elements, the process is terminated at *STEP20, and the SC at this time is the retrieval result.

As explained herein, according to the retrieving method of symbol dictionary in the third embodiment of the invention, as for the partial character string appearing at high frequency among symbol data, meta-symbol information having meta-symbols with greater number of characters is compiled, and by using this meta-symbol information, once the covering result is composed from the question character string, and the retrieval is processed by using this covering result, the covering result containing the elements added by the right extended meta-symbol assessing means, and the meta-symbol appearance information, and therefore even the forward coincidence retrieval of symbol containing partial character string appearing at high frequency can be done faster than in the conventional retrieval of symbol dictionary.

(Embodiment 4)

Figure 4:
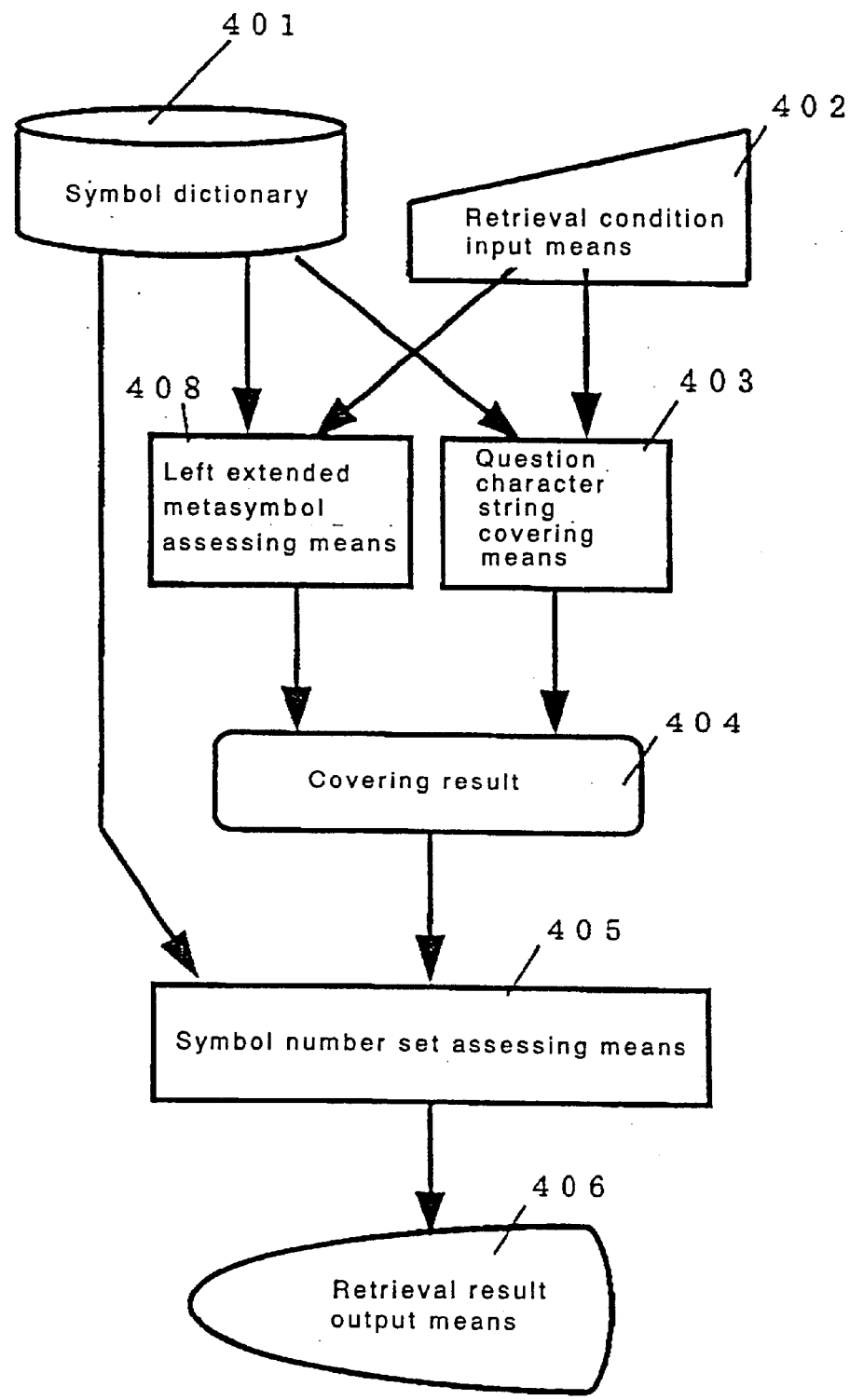
FIG. 4 is a block diagram showing a general constitution of a symbol dictionary retrieving apparatus in a fourth embodiment of the invention.

A fourth embodiment of the invention is described below while referring to the drawings. FIG. 4 is a block diagram showing a general constitution of a symbol dictionary retrieving apparatus. In FIG. 4, reference numeral 401 is a symbol dictionary storing meta-symbol information and meta-symbol appearance information, 402 is retrieval condition input means for entering character string as retrieval condition, 403 is question character string covering means for finding the covering result by covering the question character string which is the retrieval condition entered from the retrieval condition input means 402 by the longest matchoverlapped longest match word extraction method by using the symbol dictionary 401, 404 is the covering result determined by the question character string covering means 403, 408 is left extended meta-symbol assessing means for retrieving the meta-symbol information in the symbol dictionary 401, finding all of the sets of the number of the meta-symbol and the collating position of the left extended meta-symbol (that is, the meta-symbol containing L in the end portion) of the leftmost partial character string L of the question character string, out of the extended meta-symbols of meta-symbol Z (that is, meta-symbols containing Z) of covering elements of which the collating start character position is 1 among the covering result 404, and adding and storing to the covering result 404, 405 is symbol number set assessing means for assessing the set of symbol numbers coinciding backward with the question character string, that is, containing the question character string in the end portion, from the covering result 404 and the meta-symbol appearance information of symbol dictionary 401, and 406 is retrieval result output means for issuing the symbol number assessed by the symbol number assessing means 405 and others. The constituent elements 401 to 404 in FIG. 4 correspond to the constituent elements 301 to 304 in FIG. 3 which is the block diagram of the third embodiment. In thus constituted symbol dictionary retrieving apparatus, the operation is explained below by referring to the drawings, relating to the example of symbol dictionary presented in the first embodiment and an example of simple retrieval condition.

Figure 11:
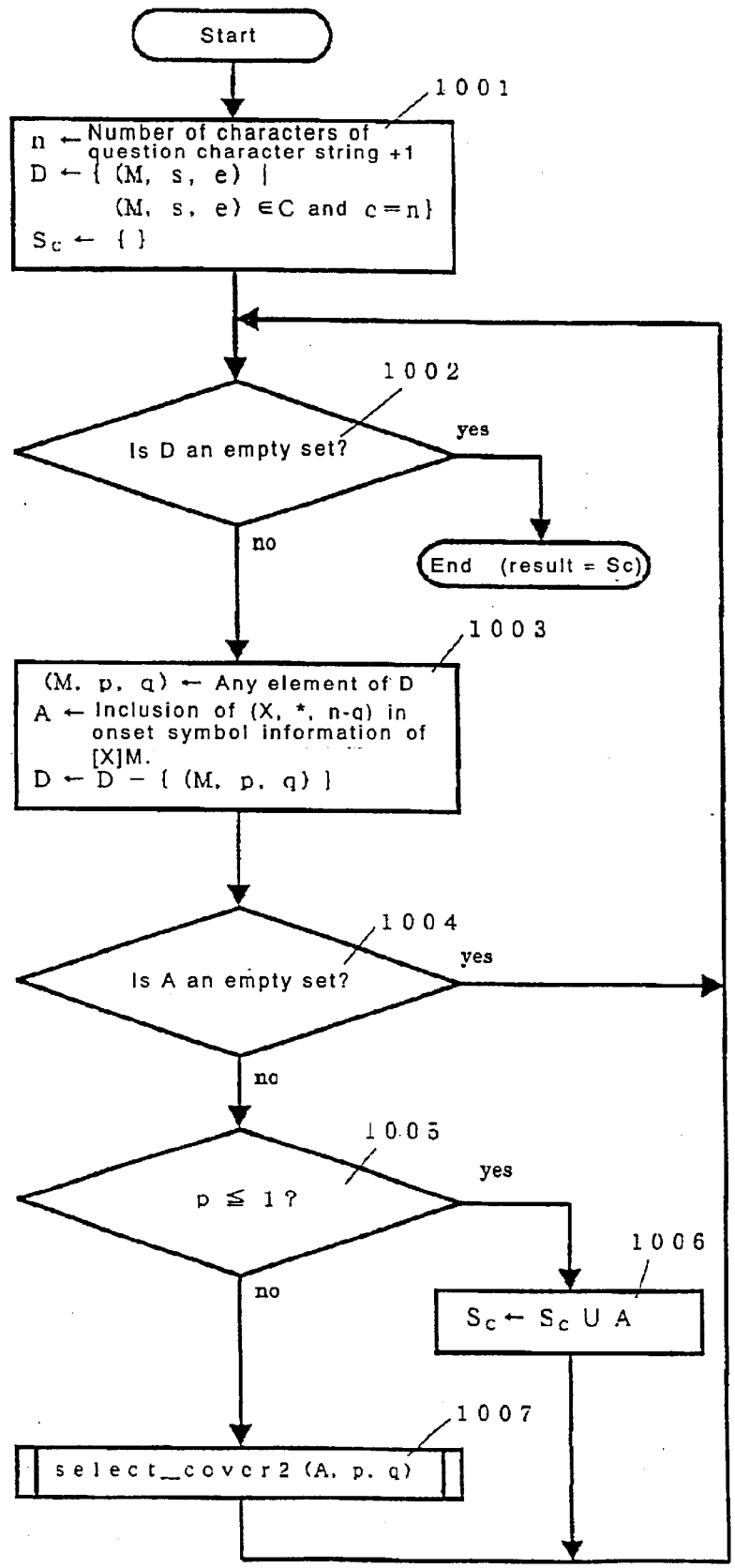
FIG. 11 is a flowchart describing the procedure of symbol number set assessing process by symbol number set assessing means in the third embodiment.
Figure 12:
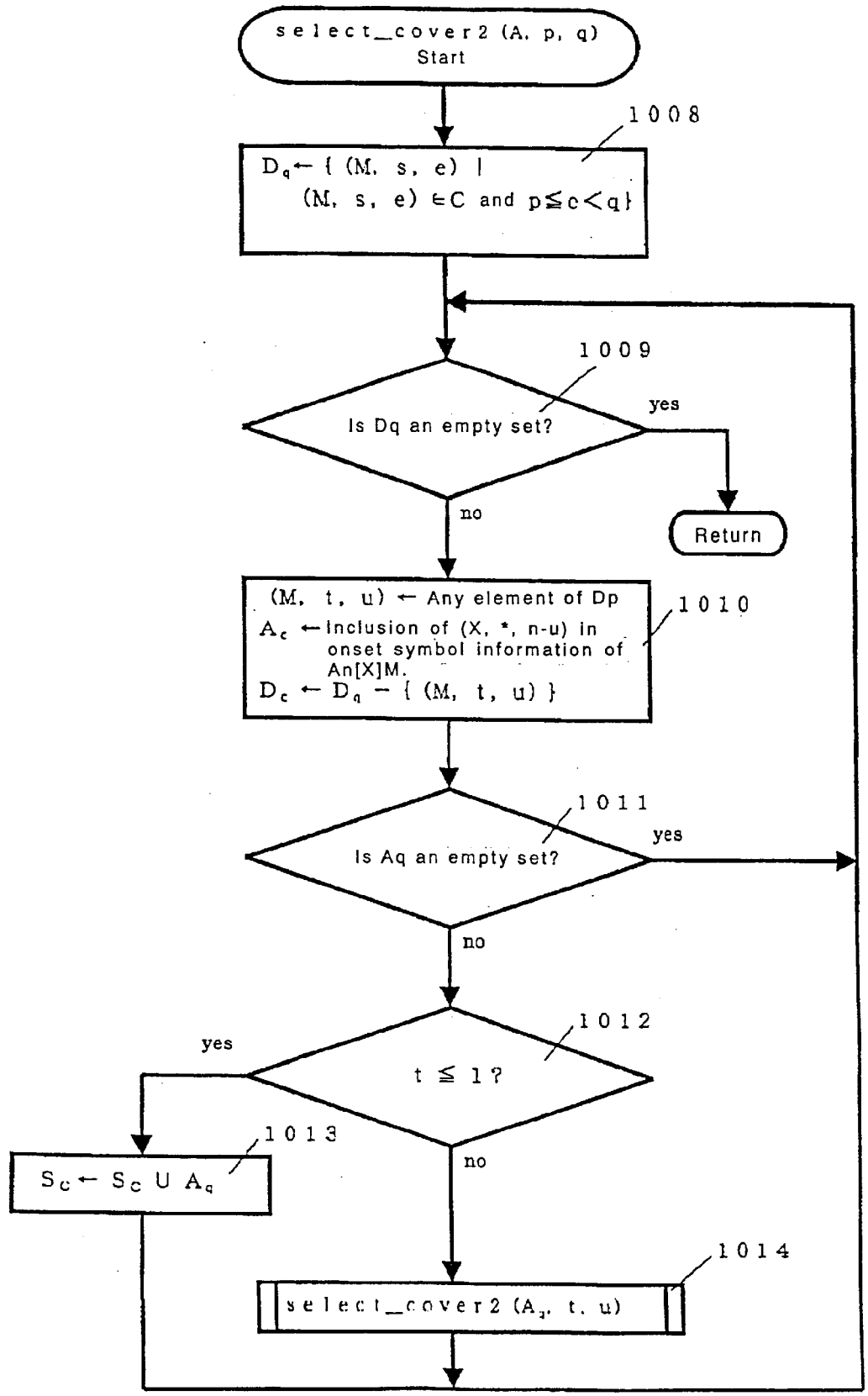
FIG. 12 is a flowchart describing the procedure of symbol number set assessing process by symbol number set assessing means in the third embodiment.

FIG. 7 is a flowchart describing the procedure of process for finding the covering result in the question character string covering means 403, FIGS. 11 and 12 are flowcharts describing the procedure of assessing process of symbol number set in the symbol number set assessing means 405, and FIG. 37 is a conceptual diagram describing principal intermediate data in the process of symbol dictionary retrieval in the case of giving the condition of "Find the set of symbol numbers coinciding backward with the question character string KAWA" as the retrieval condition. To begin with, at a first step of retrieving symbol dictionary, the question character string covering means 403 retrieves the meta-symbol information in the symbol dictionary 401, and finds the covering of the question character string 1KAWA by the longest matchoverlapped longest match word extraction method, and obtains the covering result of C of *STEP1 in FIG. 37. The procedure of the covering process is same as the procedure of the covering process in embodiment 3. In the case of this question character string, since the covering result 404 is not empty, processing at the left extended meta-symbol assessing means 408 starts, but in the case of absence of covering result, the process is stopped immediately, and there is no covering result. Consequently, the left extended meta-symbol assessing means 408 retrieves the meta-symbol information in the symbol dictionary 401, and finds the extended meta-symbols in the meta-symbol Z of the covering element of which collating start position is 1 (that is, meta-symbols of character string containing Z) among the covering result 404. Of the obtained extended meta-symbols, only the meta-symbol X of the left extended meta-symbol (that is, the meta-symbol containing the character string L in the end portion) of the j-th leftmost partial character string L of the question character string (that is, the partial character string from the first character to the j-th character in the question character string) is selected, and (X, j+1−|L|, j+1)

is added to the covering result 404. In this example, Z=KAWA, and as its extended meta-symbols, nine types are determined, that is,

[/SUKAWA], [0/KAWAD], [0/KAWAN], [0/KAWAY],
[5/KAWAD], [5/KAWAN], [5/KAWAY],[KAWA], [SUKAWA]

Out of them, two types of meta-symbols

[/SUKAWA], [/KAWA]

as the left extended meta-symbols of the leftmost partial string of the question character string KAWA are added to the covering result 404 by the left extended meta-symbol assessing means 408. This mode is shown in *STEP2 in FIG. 37. Thus, after covering up to the left extended meta-symbols, the symbol number set assessing means 405 determines the symbol number set. The subsequent process conforms to FIG. 11 and FIG. 12. First, at step 1001, the set D composed of elements of which collating end character position e is n is determined from the covering result. In this example,

D={(KAWA, 1, 5), (/SUKAWA, −2, 5), (SUKAWA, −1, 5)}

The set SC of the final result is initialized to be empty. Since D is not empty, the process advances to step 1003, and the element (KAWA, 1, 5) is selected from D, and in the meta-symbol appearance information in the symbol dictionary 401, all formats of (X, *, 0) in the appearance symbol information of M=KAWA are searched, and the set of the symbol number of the symbol X is recorded as A. In FIG. 37, sets such as A, C, D are described by using the symbol character string, instead of symbol number, for the ease of reading. In this example, at *STEP4, the symbol number of the symbol such as 1998-JAN-17/PM0930/NOKAWA is determined.

Once A is determined, the element selected herein (KAWA, 1, 5) is deleted from D. As a result, the condition judging of "Is A an empty set?" at step 1004 is No, and the process advances to step 1005. At step 1005, it is judged if the collating start position t of the selected covering element is 1 or less, and if 1 or less, the element of the set A at this moment is added to the set SC of the final result, and if 2 or more, the procedure select_cover2 (A, p, q) in FIG. 12 is fetched. In this case, since t=1, the element of the set A at this moment is added to the set SC of the final result, and to search other result, the retrieval process is continued again. Thus, while generating the combination of covering elements systematically from the covering result 404, the meta-symbol appearance information in the symbol dictionary 401 is retrieved, and the set of the symbol numbers commonly contained in the generated sets of covering elements is determined, and recorded in the set SC of the final result. After processing all combinations of covering elements, the process is terminated at *STEP6, and the SC at this time is the retrieval result. As explained herein, according to the retrieving method of symbol dictionary in the fourth embodiment of the invention, as for the partial character string appearing at high frequency among symbol data, meta-symbol information having meta-symbols with greater number of characters is compiled, and by using this meta-symbol information, once the covering result is composed from the question character string, and the retrieval is processed by using this covering result, the covering result containing the elements added by the left extended meta-symbol assessing means, and the meta-symbol appearance information, and therefore even the backward coincidence retrieval of symbol containing partial character string appearing at high frequency can be done faster than in the conventional retrieval of symbol dictionary.

(Embodiment 5)

Figure 5:
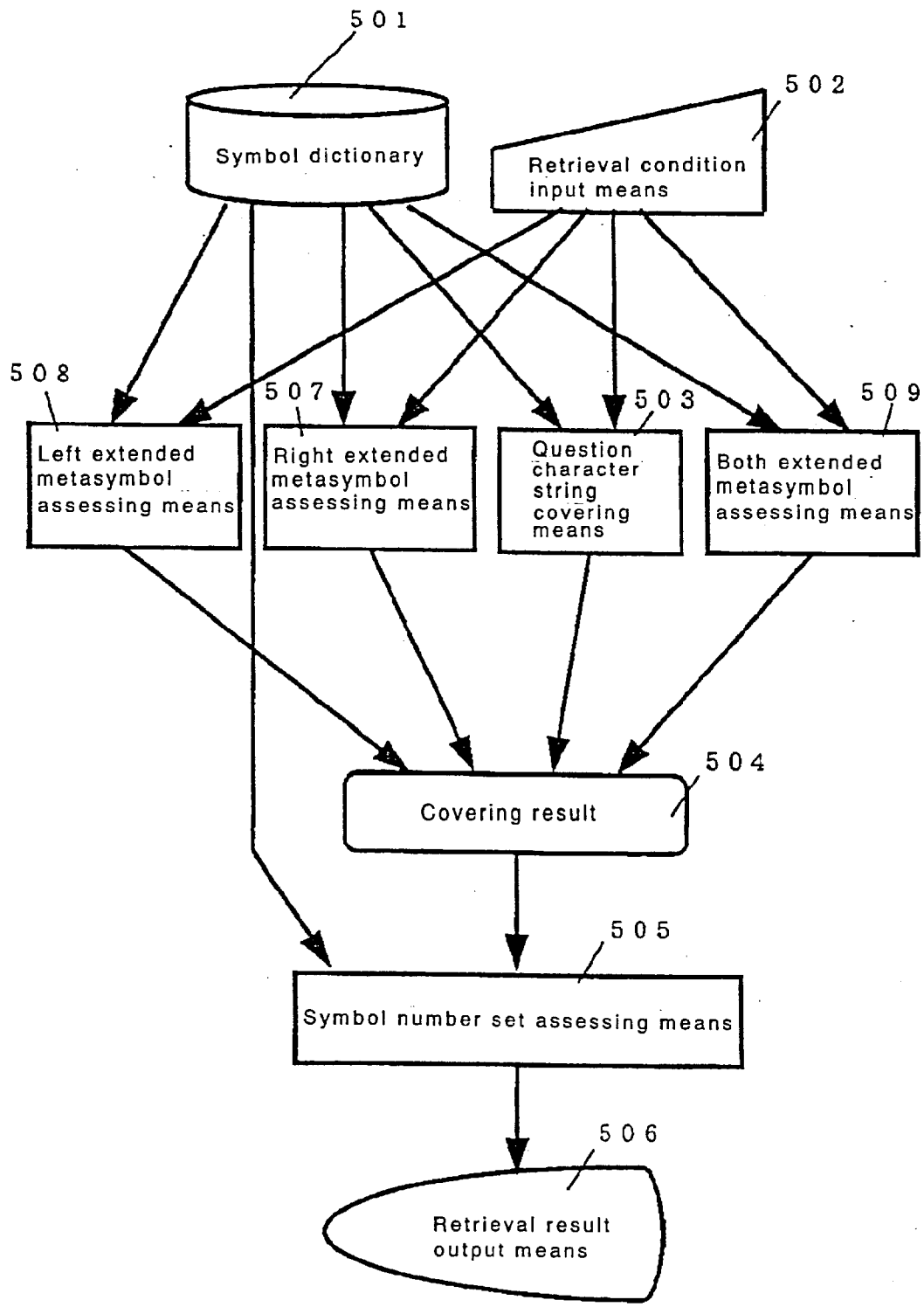
FIG. 5 is a block diagram showing a general constitution of a symbol dictionary retrieving apparatus in a fifth embodiment of the invention.

A fifth embodiment of the invention is described below while referring to the drawings. FIG. 5 is a block diagram showing a general constitution of a symbol dictionary retrieving apparatus. In FIG. 5, reference numeral 501 is a symbol dictionary storing meta-symbol information and meta-symbol appearance information, 502 is retrieval condition input means for entering character string as retrieval condition, 503 is question character string covering means for finding the covering result by covering the question character string which is the retrieval condition entered from the retrieval condition input means 502 by the longest matchoverlapped longest match word extraction method by using the symbol dictionary 501, 504 is the covering result determined by the question character string covering means 503, 507 is right extended meta-symbol assessing means for retrieving the meta-symbol information in the symbol dictionary 501, finding all of the sets of the number of the meta-symbol and the collating position of the right extended meta-symbol (that is, the meta-symbol containing R in the beginning portion) of the rightmost partial character string R of the question character string, out of the extended meta-symbols of meta-symbol Z (that is, meta-symbols containing Z) of covering elements largest in the collating start character position among the covering result 504, and adding and storing to the covering result 504, 508 is left extended meta-symbol assessing means for retrieving the meta-symbol information in the symbol dictionary 501, finding all of the sets of the number of the meta-symbol and the collating position of the left extended meta-symbol (that is, the meta-symbol containing L in the end portion) of the leftmost partial character string L of the question character string, out of the extended meta-symbols of meta-symbol Z (that is, meta-symbols containing Z) of covering elements of which the collating start character position is 1 among the covering result 504, and adding and storing to the covering result 504, 509 is both extended meta-symbol assessing means for retrieving the meta-symbol information in the symbol dictionary 501, retrieving all of both extended meta-symbols of question character string (that is, the meta-symbols containing the question character string Q in the portion from the j-th character to the j+|Q|-th character, where 1<j) X, adding and storing elements (X, 1–j, 1–j+|X|) to the covering result 504, 505 is symbol number set assessing means for assessing the set of symbol numbers coinciding intermediately with the question character string, that is, containing the question character string, from the covering result 504 and the meta-symbol appearance information of symbol dictionary 501, and 506 is retrieval result output means for issuing the symbol number assessed by the symbol number assessing means 505 and others. The constituent elements 501 to 504 and 506 in FIG. 5 correspond to the constituent elements 201 to 204 and 206 in FIG. 2 which is the block diagram of the second embodiment, the constituent element 507 in FIG. 5 corresponds to the constituent element 307 in FIG. 3 of the block diagram of the third embodiment, and the constituent element 508 in FIG. 5 corresponds to the constituent element 408 in FIG. 4 of the block diagram of the fourth embodiment. In thus constituted symbol dictionary retrieving apparatus, the operation is explained below by referring to the drawings, relating to the example of symbol dictionary presented in the first embodiment and an example of simple retrieval condition.

Figure 13:
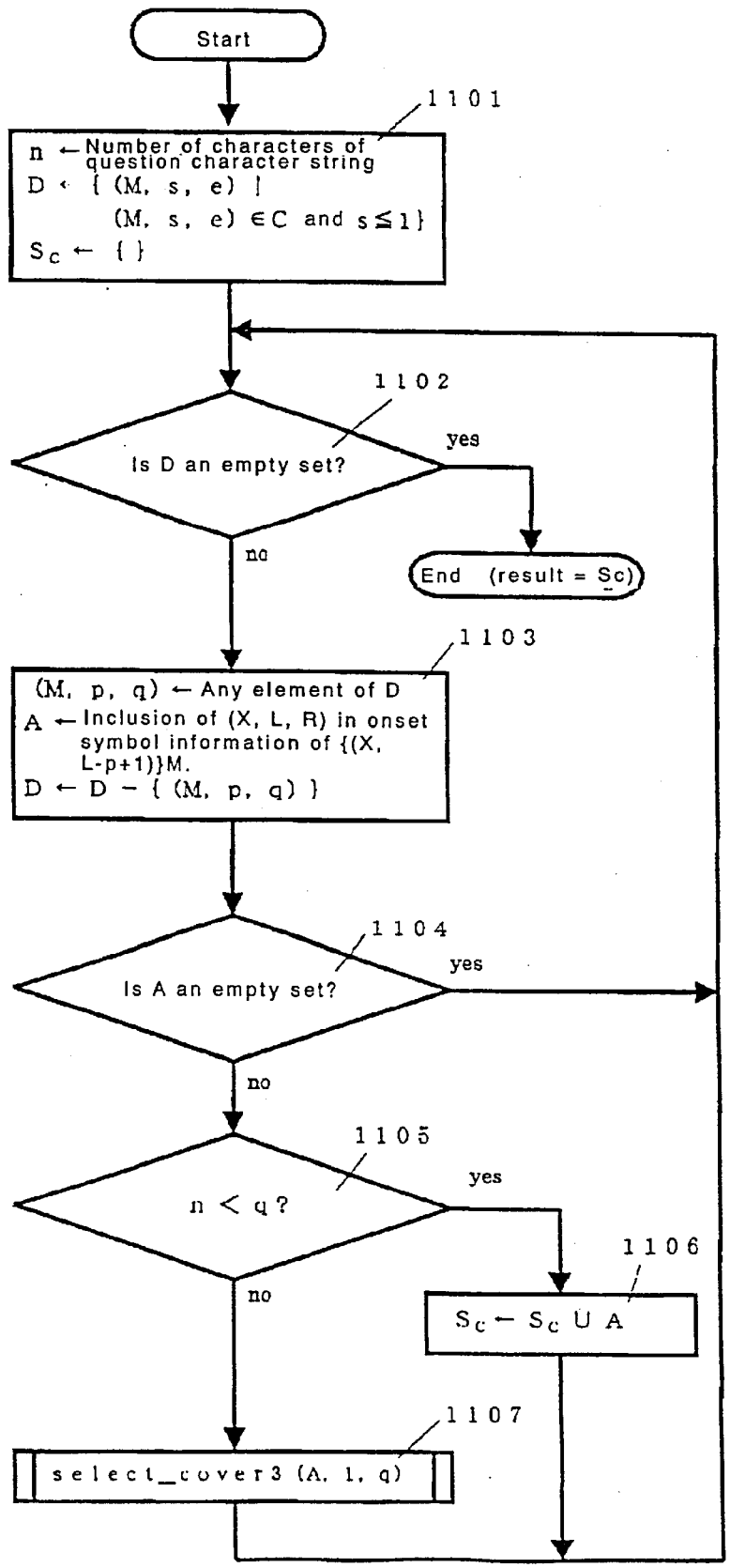
FIG. 13 is a flowchart describing the procedure of symbol number set assessing process by symbol number set assessing means in the fifth embodiment.
Figure 14:
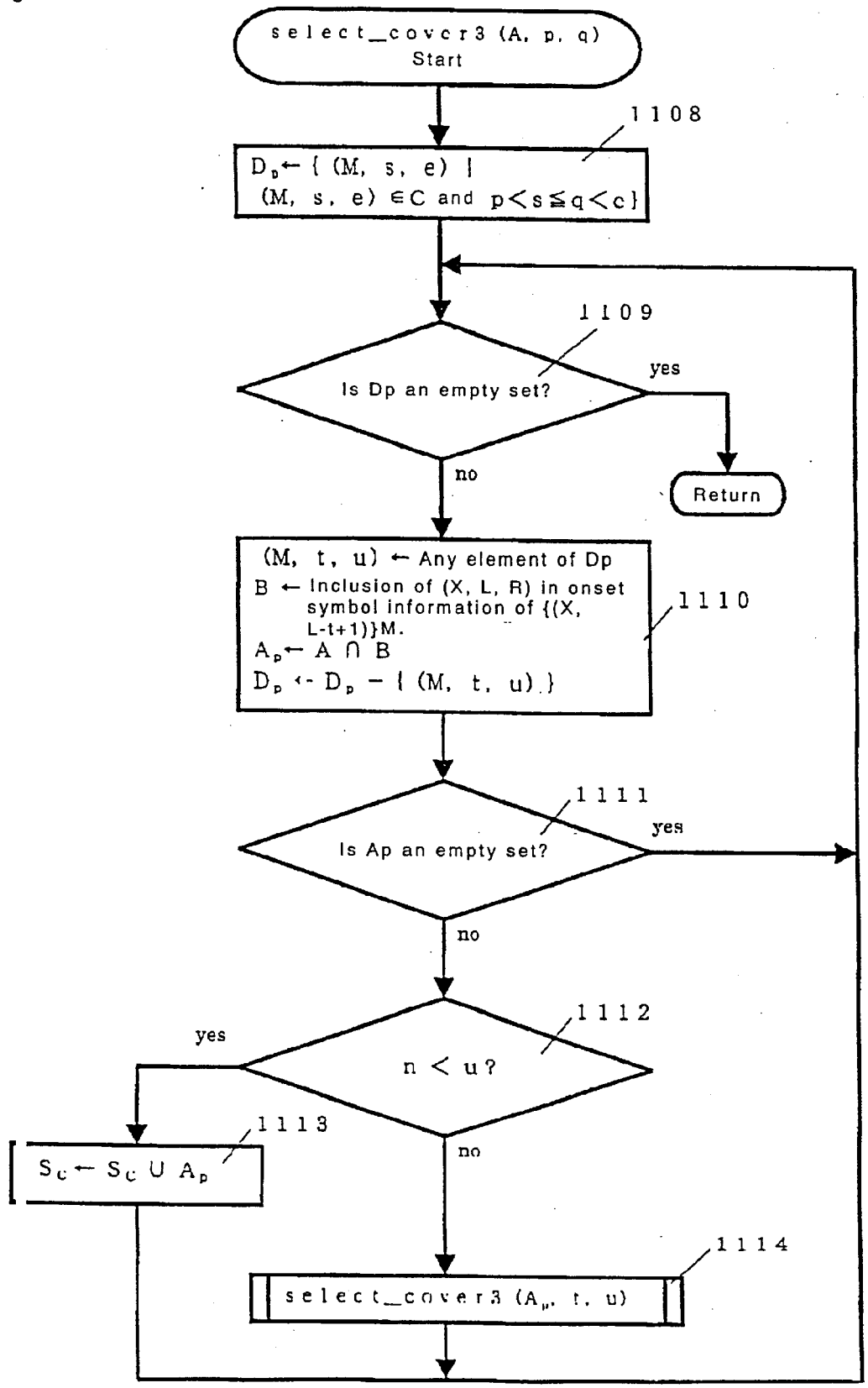
FIG. 14 is a flowchart describing the procedure of symbol number set assessing process by symbol number set assessing means in the fifth embodiment.

FIG. 7 is a flowchart describing the procedure of process for finding the covering result in the question character string covering means 503, FIGS. 13 and 14 are flowcharts describing the procedure of assessing process of symbol number set in the symbol number set assessing means 505, and FIGS. 38 and 39 are conceptual diagrams describing principal intermediate data in the process of symbol dictionary retrieval in the case of giving the condition of "Find the set of symbol numbers coinciding intermediately with the question character string KAWADA" as the retrieval condition. To begin with, at a first step of retrieving symbol dictionary, the question character string covering means 503 retrieves the meta-symbol information in the symbol dictionary 501, and finds the covering of the question character string KAWADA by the longest matchoverlapped longest match word extraction method, and obtains the covering result of C of *STEP1 in FIG. 38. The procedure of the covering process is same as the procedure of the covering process in embodiment 3. In the case of this question character string, since the covering result 504 is not empty, processing at the right extended meta-symbol assessing means 507 starts, but in the case of absence of covering result, the process is stopped immediately, and there is no covering result. Consequently, the right extended meta-symbol assessing means 507 retrieves the meta-symbol information in the symbol dictionary 501, and finds the extended meta-symbols in the meta-symbol Z of the covering element largest in the collating start position (that is, meta-symbols of character string containing Z) among the covering result 504. Of the obtained extended meta-symbols, only the meta-symbol X of the right extended meta-symbol (that is, the meta-symbol containing the character string R in the beginning portion) of the j-th rightmost partial character string R of the question character string (that is, the partial character string from the j-th character to the final character in the question character string) is selected, and (X, j, |R|+L)

is added to the covering result 504. In this example, Z=WADA, and as its extended meta-symbols, only one type is determined, that is, WADA. It is also the right extended meta-symbol of the rightmost partial string of the question character string KAWADA, the right extended meta-symbol assessing means 507 adds to the covering result 504, but since the same covering element is already contained in the covering result 504, the covering result 504 is not changed. This mode is shown in *STEP2 in FIG. 38. Consequently, the left extended meta-symbol assessing means 508 retrieves the meta-symbol information in the symbol dictionary 501, and finds the extended meta-symbols in the meta-symbol Z of the covering element of which collating start position is 1 (that is, meta-symbols of character string containing Z) among the covering result 504. Of the obtained extended meta-symbols, only the meta-symbol X of the left extended meta-symbol (that is, the meta-symbol containing the character string L in the end portion) of the j-th leftmost partial character string L of the question character string (that is, the partial character string from the first character to the j-th character in the question character string) is selected, and (X, j+1–|L|, j+1)

is added to the covering result 504. In this example, Z=KAWA, and as its extended meta-symbols, nine types are determined, that is,

[/SUKAWA], [0/KAWAD], [0/KAWAN], [0/KAWAY],
    [5/KAWAD], [5/KAWAN], [5/KAWAY],[KAWA], [SUKAWA]

Out of them, five types of meta-symbols

[/SUKAWA], [0/KAWAD], [5/KAWAD], [KAWA], [SUKAWA]

as the left extended meta-symbols of the leftmost partial string of the question character string KAWADA are added to the covering result 504 by the left extended meta-symbol assessing means 508. This mode is shown in *STEP3 in FIG. 38. Next, the both extended meta-symbol assessing means 509 retrieves the meta-symbol information in the symbol dictionary 501, retrieves all of both extended meta-symbols of question character string KAWADA (that is, the meta-symbols containing the question character string KAWADA in the portion of j+6 characters from the j-th character, where 1<j) X, and adds elements (X, 1–j, 1–j+|X|) to the covering result 504. In the case of this example, meta-symbol containing KAWADA is not present in the meta-symbol information in the symbol dictionary 501, and nothing is added to the covering result 504. This mode is shown in *STEP4 in FIG. 42. Thus, after covering up to the right extended meta-symbols, left extended meta-symbols, and both extended symbols, the symbol number set assessing means 505 determines the symbol number set. The subsequent process conforms to FIG. 13 and FIG. 14. First, at step 1101, the set D composed of elements of which collating start character position s is 1 or less is determined from the covering result. In this example, D={(KAWA, 1, 5), (/SUKAWA, -1, 5), (0/KAWAD, -1, 6),
    (5/KAWAD, -1, 6), (SUKAWA, -1, 5)}

The set SC of the final result is initialized to be empty.

This mode is shown in *STEP5 in FIG. 38. Since D is not empty, the process advances to step 1103, and the element (KAWA, 1,) is selected from D, and in the meta-symbol appearance information in the symbol dictionary 501, each appearance symbol information (X, L, R) of M=KAWA is recorded as A by collecting the sets of elements in the format of (X, L). In FIG. 38 and FIG. 39, sets such as A, C, D are described by using the symbol character string, instead of symbol number, for the ease of reading. In this example, at *STEP6, elements such as 1998-JAN17/PM0930/NOKAWA are determined. Once A is determined, the element selected herein (KAWA, 1, 5) is deleted from D. As a result, the condition judging of "Is A an empty set?" at step 1104 is No, and the process advances to step 1105. At step 1105, judging if the collating end position q of the selected covering element is greater than n or not, and if greater than n, the element of the set A at this moment is added to the set SC of the final result, and if less than n, the procedure select_cover3 (A, p, q) in FIG. 14 is fetched. In this case, since q=5, the procedure select_cover3 (A, 1, 5) is fetched. At step 1108 in FIG. 14, all elements of which collating position (s, e) is in the relation of $1<s\leq 5<e$ are selected from C, and D1 is obtained. In this example, D1={(WADA, 3, 7)}. Since D1 is not empty, judgement at step 1109 is No, and the process advances to step 1110. At step 1110, selecting the only one element (WADA, 3, 7) from D1, (X, L-2) is recorded in B for each appearance symbol information (X, L, R) of M=WADA, and the selected element is deleted from D1. Further, A∩B is calculated, but there is no common part, and A1 is empty, and the judging result at step 1111 is Yes, and the process returns to step 1109. However, since D1 is empty, the judging result at step 1109 is Yes, and it is returned from select_cover3. This mode is shown in *STEP8 in FIG. 38. At step 1102 in FIG. 13, since D is not empty, the process further advances to step 1103. At step 1103, selecting the element (/SUKAWA, 2, 5) from D, A is calculated as in *STEP9, and advancing to step 1107, the procedure select_cover3 (A, 1, 5) in FIG. 14 is fetched again. At step 1108 in FIG. 14, all elements of which collating position (s, e) is in the relation of $1<s\leq 5<e$ are selected from C, and D1 is obtained. In this example, D1={(WADA, 3, 7)}. This mode is shown in *STEP10 in FIG. 38. Since D1 is not empty, judgement at step 1109 is No, and the process advances to step 1110. At step 1110, selecting the only one element (WADA, 3, 7) from D1, (X, L-2) is recorded in B for each appearance symbol information (X, L, R) of M=WADA, and the selected element is deleted from D1. Further, A n B is calculated, but there is no common part, and A1 is empty, and the judging result at step 1111 is Yes, and the process returns to step 1109. However, since D1 is empty, the judging result at step 1109 is Yes, and it is returned from select_cover3. This mode is shown in *STEP11 in FIG. 38. At step 1102 in FIG. 13, since D is not empty, the process further advances to step 1103 again. At step 1103, selecting the element (0/KAWAD, -1, 6) from D, A is calculated as in *STEP12, and advancing to step 1107, the procedure select_cover3 (A, , 6) in FIG. 14 is fetched once more. At step 1108 in FIG. 14, all elements of which collating position (s, e) is in the relation of $1<s\leq 6<e$ are selected from C, and D1 is obtained. In this example, D1={(WADA, 3, 7)}. This mode is shown in *STEP13 in FIG. 39. Since D1 is not empty, judgement at step 1109 is No, and the process advances to step 1110.

At step 1110, selecting the only one element (WADA, 3,) from D1, (X, L-2) is recorded in B for each appearance symbol information (X, L, R) of M=WADA, and the selected element is deleted from D1. Further, A∩B is calculated. This common part A1 is not empty, and u=7 is larger than n=6, and the process advances to step 1113, and A1 is added to SC as part of the final result. Back to step 1109, since D1 is empty, it is returned from select_cover3. This mode is shown in *STEP14 in FIG. 39. At step 1102 in FIG. 13, since D is not empty, the process further advances to step 1103 again. At step 1103, selecting the element (5/KAWAD, -1, 6) from D, A is calculated as in *STEP15, and advancing to step 1107, the procedure select_cover3 (A, 1, 6) in FIG. 14 is fetched again. At step 1108 in FIG. 14, all elements of which collating position (s, e) is in the relation of $1<s\leq 6<e$ are selected from C, and D1 is obtained. In this example, D1={(WADA, 3, 7)}. This mode is shown in *STEP16 in FIG. 39. Since D1 is not empty, judgement at step 1109 is No, and the process advances to step 1110. At step 1110, selecting the only one element (WADA, 3, 7) from D1, (X, L-2) is recorded in B for each appearance symbol information (X, L, R) of M=WADA, and the selected element is deleted from D1. Further, A∩B is calculated. This common part A1 is not empty, and u=7 is larger than n=6, and the process advances to step 1113, and A1 is added to SC as part of the final result. Back to step 1109, since D1 is empty, it is returned from select_cover3. This mode is shown in *STEP17 in FIG. 39. At step 1102 in FIG. 13, since D is not empty, the process further advances to step 1103 again. At step 1103, selecting the element (SUKAWA, -1, 5) from D, A is calculated as in *STEP18, and advancing to step 1107, the procedure select_cover3 (A, 1, 5) in FIG. 14 is fetched once more. At step 1108 in FIG. 14, all elements of which collating position (s, e) is in the relation of $1<s\leq 5<e$ are selected from C, and D1 is obtained. In this example, D1={(WADA, 3, 7)}. This mode is shown in *STEP19 in FIG. 39. Since D1 is not empty, judgement at step 1109 is No, and the process advances to step 1110. At step 1110, selecting the only one element (WADA, 3, 7) from D1, (X, L-2) is recorded in B for each appearance symbol information (X, L, R) of M=WADA, and the selected element is deleted from D1. Further, A∩B is calculated, but there is no common part, and A1 is empty, and the judging result at step 1111 is Yes, and the process returns to step 1109. However, since D1 is empty, the judging result at step 1109 is Yes, and it is returned from select_cover3. This mode is shown in *STEP20 in FIG. 38. At step 1102 in FIG. 13, since D is empty, the assessing process of symbol number set is terminated. At this moment, since SC is holding all of the sets of the combinations of the infix matching symbols (their numbers) and the number of characters of the left side of the. collating portion (the beginning side of symbol), by picking up only a first element of each set, the intermediate coincidence retrieval result is obtained. Thus, by retrieving the meta-symbol appearance information in the symbol dictionary 501 while generating the combinations of the covering elements systematically from the covering result 504, the set of the symbol numbers commonly contained in the set of the generated covering element can be determined.

As explained herein, according to the retrieving method of symbol dictionary in the fifth embodiment of the invention, as for the partial character string appearing at high frequency among symbol data, meta-symbol information having meta-symbols with greater number of characters is compiled, and by using this meta-symbol information, once the covering result is composed from the question character string, and the retrieval is processed by using this covering result, and the covering result containing the elements added by three means, that is, the right extended meta-symbol assessing means, the left extended meta-symbol assessing means, and the both extended meta-symbol assessing means, and therefore even the intermediate coincidence retrieval of symbol containing partial character string appearing at high frequency can be done faster than in the conventional retrieval of symbol dictionary.

As explained in the five embodiments of the invention herein, according to the symbol dictionary compiling method and symbol dictionary retrieving method of the invention, (1) by compiling automatically a meta-symbol dictionary collecting shorter symbols called "meta-symbols" for covering symbols in symbol data, covering each symbol in the symbol data by the meta-symbols in this meta-symbol dictionary, and compiling meta-symbol appearance information recording the information showing how each symbol is covered in every meta-symbol, and (2) retrieving the question character string by using the meta-symbol dictionary contained in the symbol dictionary, covering with the meta-symbols, adding the retrieval results of left, right and both extended meta-symbols to the covering result, and determining the symbol number set contained commonly in every element set in the covering result covering the question character string, or its left, right and both extended character strings, the following problems in the conventional symbol dictionary compiling method and symbol dictionary retrieving method can be solved, that is:

1) The symbol dictionary file to be created is more than twice as much as the symbol data to be retrieved, and it is hard to realize if the usable capacity of the memory device is limited.

2) If the character string is long, and when retrieving symbols containing characters or character chain of high frequency of appearance, the quantity of data to be retrieved from the symbol dictionary is large, and the retrieval speed is lowered.

3) In the method of using character chain, if the number of character chains N is increased, the types of N character chains to appear increase suddenly, and it is hard to compile symbol dictionary, and the capacity of the compiled symbol dictionary is increased.

Thus, although difficult in the conventional symbol dictionary compiling and retrieving technology, high speed retrieval is possible including up to infix matching, and a symbol dictionary of small capacity can be compiled, and even in the application where the complete matching occupies the majority of questions, the symbol retrieval is possible without lowering the average retrieval speed, so that tremendous effects are obtained practically.

In the foregoing five embodiments, as character sets, alphanumerics and special symbols are used, but the same effects are obtained in the character sets adding Chinese characters and Greek alphabet, too. In the first embodiment, prior to compilation of symbol dictionary, a meta-symbol dictionary composed of one character only as shown in FIG. 16 is prepared, but in addition to the content in FIG. 16, a meta-symbol dictionary containing meta-symbols of two or more characters of which appearance can be predicted, such as "1998-" and "AM" can be prepared, and in this case, too, the symbol dictionary can be compiled in the same procedure as explained above. As the storing data structure of meta-symbol information, TRIE structure and table structure are shown, but if using other data structure, such as finite state machine, PATRICIA tree, or hash table, it is possible to execute in the same procedure as explained above. The storing format of the meta-symbol appearance information is not limited to the table, but by using TRIE, hash table or other data structure, it is possible to execute in the same procedure as explained above.

In symbol dictionary retrieval, for the convenience of explanation, the covering result is expressed by using the set, but by using linked list, heap, tree structure, hash table or other data structure, it is possible to execute in the same procedure as explained above.

Thus, in the symbol dictionary compiling method of the invention, for compiling a machine-retrievable symbol dictionary of symbol data by complete matching, prefix matching, postfix matching or infix matching, a meta-symbol dictionary collecting shorter symbols called "meta-symbols" for covering the symbol in the symbol data is compiled automatically, and each symbol in the symbol data is covered with the meta-symbol in this meta-symbol dictionary, and the information showing how each symbol is covered is obtained by preparing meta-symbol onset information recorded in each meta-symbol, and therefore high speed retrieval including up to infix matching is achieved, and the size of compiled symbol dictionary can be reduced, thereby bringing about outstanding effects.

Also, in the symbol dictionary retrieving method of the invention, for machine-retrieving of symbol dictionary by complete matching, prefix matching, postfix matching or infix matching, a question character string is covered with a meta-symbol by retrieving the meta-symbol dictionary contained in the symbol dictionary, retrieval results of left, right and both extended meta-symbols are added to this covering result, and high speed retrieval is possible up to infix matching by using a symbol dictionary of small capacity, by seeking the symbol number set commonly contained in every element set in the question character string or covering results covering the left, right and both extended character strings, and moreover in the application where complete matching occupies the majority of questions, symbol retrieval is possible without lowering the average retrieval speed, thereby bringing about outstanding effects.

The effects of the invention appear very clearly when. compiling and retrieving a symbol dictionary from symbol data of large scale having a deviated distribution in which the symbol data to be retrieved contain symbols of more than tens of thousands of kinds, each character has a great number of characters, and there are partial character strings commonly included in many symbols. For example, in an experiment of compiling a symbol dictionary from symbol data containing 1 million symbols in which each symbol is a 100-digit numeral, all symbols are equal in the upper 90 digits and all symbols are different in the lower 10 digits, in the conventional symbol dictionary of n-gram system, at least 100 million symbol numbers, appearance character position information, and information for character linking are needed, and the size is more than 400 megabytes, but in the symbol dictionary compiled by the symbol dictionary compiling method of the invention, it requires to record only about 50000 kinds of meta-symbol information, and about 4 million pieces of meta-symbol appearance information, and the required size is smaller than 40 megabytes, and the capacity is less than $\frac{1}{10}$ of the conventional system. Moreover, in the case of retrieval by complete matching, in the symbol dictionary of the conventional n-gram system, unless the number of links n of character linking is 41 or more, the intermediate result of the higher 40 digits is always 1 million symbols long, and the retrieval speed is substantially lowered, but in the retrieval of symbol dictionary of the invention, a meta-symbol dictionary containing meta-symbols of 40+α digits suited to deviation of distribution of symbol data is created automatically, and the symbol number is searched only by referring to the appearance information of the meta-symbol relating to the question character string, so that retrieval of an extremely high speed is realized. Thus, symbol data having deviation which was conventionally hard to handle can be retrieved at high speed including up to intermediate coincidence, and outstanding effects are obtained practically.

What is claimed is:

1. A method of compiling a machine-retrievable symbol dictionary for symbol data registering a finite number of symbols mutually different out of an array of not more than N (a specific number of) characters contained in a certain predetermined character set, comprising:

a first step of compiling said symbol dictionary wherein (a) a symbol covering means retrieves each symbol of said symbol data from a prepared meta-symbol dictionary in an initial state and searches for a covering being a set of a pair of a meta-symbol and a start character position for collating with a partial character string in the symbols to be covered having one or more extension meta-symbol pairs for each character and produces a covering result, (b) a meta-symbol accumulating means sums up said covering results, where a total appearance frequency of occurrence of each meta-symbol in said symbol data is accumulated in a meta-symbol frequency table, (c) a meta-symbol dictionary update judging means refers to the meta-symbol frequency table and after deleting a first meta-symbol from said meta-symbol dictionary according to a first predetermined condition, adds a second meta-symbol to said meta-symbol dictionary according to a second predetermined condition, a second step of compiling said symbol dictionary in which (d) the symbol covering means retrieves each symbol in said symbol data in said meta-symbol dictionary to search for the covering and produces a further covering result, (e) the meta-symbol summing means sums up the covering results, (f) the total appearance frequency in said symbol data in each meta-symbol is accumulated in the meta-symbol frequency table, (g) said meta-symbol dictionary update judging means refers to said meta-symbol frequency table, adds meta-symbols to said meta-symbol dictionary according to the first predetermined condition, judges if a predetermined stopping condition is satisfied or not, and repeats the second step until satisfying the stopping condition, a third step of compiling said symbol dictionary in which said meta-symbol dictionary update judging means refers to the meta-symbol frequency table, and deletes meta-symbols from said meta-symbol dictionary according to said second predetermined condition, a fourth step of compiling said symbol dictionary in which said symbol covering means covers said symbol data by using said meta-symbol dictionary compiled at the third step, and a meta-symbol appearance information compiling means calculates the meta-symbol appearance information recording a symbol number for containing each meta-symbol and the appearance character position from the covering result for each meta-symbol, and a fifth step of compiling said symbol dictionary in which the symbol dictionary compiling means compiles a machine-retrievable symbol dictionary storing meta-symbol information and meta-symbol appearance information from said meta-symbol dictionary and meta-symbol appearance information.

2. A compiling method of a symbol dictionary of claim 1, wherein covering of a symbol is determined by maximal word extraction method in the symbol covering means.

3. A compiling method of a symbol dictionary of claim 1, wherein a symbol composed of only one character, about each symbol in a predetermined character set, and zero or more character string known as part of the symbol in the symbol data are registered in the prepared meta-symbol dictionary in said initial state.

4. A compiling method of a symbol dictionary of claim 1, wherein the deletion of meta-symbols in the first step is done on the basis of deleting the meta-symbol of which a frequency in the meta-symbol frequency table is 0, and the addition of meta-symbol in the first step is done on the basis of adding one arbitrary character in the meta-symbol dictionary at the end, as for the meta-symbol less than N characters in the meta-symbol frequency table of which frequency is frequency C1 or more determined by the symbol data content.

5. A compiling method of a symbol dictionary of claim 1, wherein the addition of a meta-symbol in the second step is done on the basis of adding one arbitrary character in the predetermined character set at the end, as for the meta-symbol less than N characters in the meta-symbol frequency table of which frequency is frequency Ck or more determined by the symbol data content and the number of times of repetition of the second step, and the deletion of meta-symbol in the third step is done on the basis of deleting the meta-symbol of which frequency in the meta-symbol frequency table is less than E and two characters or more.

6. A compiling method of a symbol dictionary of claim 1, wherein the stopping condition in the second step is the condition of stopping when there is no addition or deletion at all of meta-symbols in the meta-symbol dictionary update judging means.

7. A compiling method of a symbol dictionary of claim 1, wherein the sequence number of the corresponding symbol in the symbol data is used as the symbol number in the third step.

* * * * *

UNITED STATES PATENT AND TRADEMARK OFFICE
CERTIFICATE OF CORRECTION

| | | |
|---|---|---|
| PATENT NO. | : 7,103,536 B1 | Page 1 of 1 |
| APPLICATION NO. | : 09/451047 | |
| DATED | : September 5, 2006 | |
| INVENTOR(S) | : Yuji Kanno | |

It is certified that error appears in the above-identified patent and that said Letters Patent is hereby corrected as shown below:

On the title page, insert item [30], Foreign Application Priority Data,
-- JP 10-340765  November 30, 1998 --.

Signed and Sealed this

Thirty-first Day of July, 2007

JON W. DUDAS
*Director of the United States Patent and Trademark Office*